US011550201B2

(12) United States Patent
Yap et al.

(10) Patent No.: US 11,550,201 B2
(45) Date of Patent: Jan. 10, 2023

(54) DIRECTIONAL PHASE MATCHING OPTICAL WAVEGUIDE

(71) Applicant: The Boeing Company, Chicago, IL (US)

(72) Inventors: Daniel Yap, Malibu, CA (US); Shuoqin Wang, Oak Park, CA (US); Ivan Alvarado, Santa Monica, CA (US); Brett Yurash, Venice, CA (US); Thaddeus Ladd, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/450,044

(22) Filed: Oct. 5, 2021

(65) Prior Publication Data
US 2022/0107547 A1 Apr. 7, 2022

Related U.S. Application Data

(60) Provisional application No. 63/088,220, filed on Oct. 6, 2020, provisional application No. 63/201,661, filed
(Continued)

(51) Int. Cl.
*G02F 1/365* (2006.01)
*G02F 1/35* (2006.01)
(Continued)

(52) U.S. Cl.
CPC ............ *G02F 1/365* (2013.01); *G02F 1/3501* (2013.01); *G02F 1/3534* (2013.01);
(Continued)

(58) Field of Classification Search
CPC .... G02F 1/3501; G02F 1/3534; G02F 1/3536; G02F 1/365; G02F 1/37; G02F 1/377; G02F 1/39; G02F 1/395
See application file for complete search history.

(56) References Cited

U.S. PATENT DOCUMENTS

| 3,842,289 A | 10/1974 | Yariv et al. |
| 5,002,349 A | 3/1991 | Cheung et al. |

(Continued)

FOREIGN PATENT DOCUMENTS

| CN | 110333637 A | 10/2019 |
| JP | H01134309 A | 5/1989 |

(Continued)

OTHER PUBLICATIONS

International Search Report and Written Opinion of the International Searching Authority dated Feb. 28, 2022, regarding application No. PCT/US2021/071725, 24 pages.
(Continued)

*Primary Examiner* — Daniel Petkovsek
(74) *Attorney, Agent, or Firm* — Yee & Associates, P.C.

(57) ABSTRACT

An optical waveguide structure comprises a nonlinear optical waveguide comprising a nonlinear optical material having a second order nonlinear coefficient that changes with a direction of light propagation. A first portion of the nonlinear optical waveguide in which a light propagating through the first portion is affected by a positive value of a second order nonlinear coefficient. A second portion of the nonlinear optical waveguide in which the light propagating through the first portion is affected by a negative value of a second order nonlinear coefficient, wherein a set of dimensions in the nonlinear optical waveguide in the first portion and the second portion is selected to cause the light to have a phase walk-off that is an odd multiple of 180 degrees.

41 Claims, 25 Drawing Sheets

Related U.S. Application Data on May 7, 2021, provisional application No. 63/201,664, filed on May 7, 2021.

(51) Int. Cl.
  *G02F 1/39* (2006.01)
  *G02F 1/377* (2006.01)
  *G02F 1/37* (2006.01)

(52) U.S. Cl.
  CPC .............. *G02F 1/3536* (2013.01); *G02F 1/37* (2013.01); *G02F 1/377* (2013.01); *G02F 1/39* (2013.01); *G02F 1/395* (2013.01); *G02F 1/392* (2021.01)

(56) References Cited

U.S. PATENT DOCUMENTS

| | | | |
|---|---|---|---|
| 5,206,868 | A | 4/1993 | Deacon |
| 5,295,218 | A | 3/1994 | Agostinelli et al. |
| 5,875,272 | A | 2/1999 | Kewitsch et al. |
| 5,999,548 | A | 2/1999 | Mori |
| 6,078,717 | A | 6/2000 | Nashimoto et al. |
| 6,081,632 | A | 6/2000 | Yoshimura et al. |
| 6,269,205 | B1 | 7/2001 | Peral et al. |
| 6,438,291 | B1 | 8/2002 | Duck et al. |
| 6,445,848 | B1 | 9/2002 | Islam et al. |
| 6,483,953 | B1 | 11/2002 | McBrien et al. |
| 6,721,481 | B2 | 4/2004 | Terahara et al. |
| 7,262,902 | B2 | 8/2007 | Burns et al. |
| 7,266,258 | B2 | 9/2007 | Liu et al. |
| 7,495,823 | B2 | 2/2009 | Kanner et al. |
| 7,995,267 | B2 * | 8/2011 | Satoh .................... G02F 1/3558 359/328 |
| 8,173,982 | B2 | 5/2012 | Edamatsu et al. |
| 9,110,219 | B1 * | 8/2015 | Zhang ................... G01J 1/0425 |
| 9,291,837 | B1 | 3/2016 | Yap |
| 9,798,219 | B2 | 10/2017 | Pant et al. |
| 10,372,014 | B1 | 8/2019 | Vidrighin et al. |
| 10,451,951 | B1 | 10/2019 | Yap et al. |
| 10,698,292 | B1 | 6/2020 | Nagano |
| 11,003,046 | B2 | 5/2021 | Liscidini et al. |
| 11,092,875 | B2 | 8/2021 | Xu et al. |
| 11,126,064 | B2 * | 9/2021 | Nagano ................... G02F 1/353 |
| 11,221,540 | B2 | 1/2022 | Srinivasan et al. |
| 2002/0108556 | A1 * | 8/2002 | Ebbers .................... C30B 33/06 117/2 |
| 2005/0047702 | A1 | 3/2005 | Parker et al. |
| 2006/0045445 | A1 * | 3/2006 | Watanabe ............. G02F 1/3515 385/11 |
| 2006/0132901 | A1 | 6/2006 | Miller |
| 2012/0093459 | A1 | 4/2012 | Mathai et al. |
| 2014/0193155 | A1 | 7/2014 | Popovic et al. |
| 2018/0031949 | A1 | 2/2018 | Mookherjea et al. |
| 2019/0361315 | A1 | 11/2019 | Zhou |
| 2020/0256722 | A1 | 8/2020 | Najafi et al. |
| 2021/0026222 | A1 | 1/2021 | Nagano |
| 2022/0107548 | A1 | 4/2022 | Yap |

FOREIGN PATENT DOCUMENTS

| | | | |
|---|---|---|---|
| JP | H01134310 | A | 5/1989 |
| JP | H05107577 | A | 4/1993 |
| JP | H05216079 | A | 8/1993 |
| JP | H10319444 | A | 12/1998 |
| JP | 2017078786 | A | 4/2017 |
| WO | WO2019208582 | A1 | 5/2021 |

OTHER PUBLICATIONS

Bosshard, "Cascading of second-order nonlinearities in polar materials," Advanced Materials, vol. 8, No. 5, May 1, 1996, pp. 385-397.
Boyd, "Nonlinear Optics," Third Edition, Academic Press, Mar. 28, 2008, pp. 69-133.
Cai et al., "Integrated optics on single-crystal lithium niobate thin film: some recent progress," 18th International Conference on Transparent Optical Networks ICTON, Jul. 2016, paper Tu.D5.5, pp. 1-4.
Chen et al., "Modal phase matched lithium niobate nanocircuits for integrated nonlinear photonics," OSA Continuum, vol. 1, No. 1, Sep. 2018, pp. 229-242.
Doerr, "Planar Lightwave Devices for WDM," Optical Fiber Telecommunications, vol. IVA, Jan. 1, 2002, pp. 405-476.
Fan et al., "290 Hz intrinsic linewidth from an integrated optical chip-based widely tunable InP-Si3N4 hybrid laser," Digest 2017 Conference on Lasers and Electro-Optics CLEO, May 2017, paper JTh5C.9, pp. 1-2.
Fejer et al., "Quasi-phase-matched second harmonic generation tuning and tolerances," IEEE Journal of Quantum Electronics, vol. 28, No. 11, Nov. 1992, pp. 2631-2654.
Gad et al., "Compound ring resonator circuit for integrated optics applications," Journal Optical Society America A, vol. 26, No. 9, Sep. 9, 2009, pp. 2023-2032.
Halir et al., "Compact High-Performance Multimode Interference Couplers in Silicon-on-Insulator," IEEE Photonics Technology Letters, vol. 21, No. 21, Nov. 1, 2009, pp. 1600-1602.
Helt et al., "How does it scale? Comparing quantum and classical nonlinear optical processes in integrated devices," Journal of the Optical Society of America B, vol. 29, No. 8, Aug. 1, 2012, pp. 2199-2212.
Lin et al., "Broadband Quasi-Phase-Matched Harmonic Generation in an On-Chip Monocrystalline Lithium Niobate Microdisk Resonator," Phys. Rev. Lett., vol. 122, No. 17, May 3, 2019, pp. 173903, 5 pages.
Lin et al., "Characterization of hybrid InP-TriPleX photonic integrate tunable lasers based on silicon nitride (Si3N4/SiO2) microring resonators for optical coherent systems," IEEE Photonics Journal, vol. 10, No. 3, Jun. 2018, pp. 1400108, 9 pages.
Luo et al., "On-chip second-harmonic generation and broadband parametric down-conversion in a lithium niobate microresonator," Optics Express, vol. 25, No. 20, Oct. 2, 2017, pp. 24531-24539.
Luo et al., "Semi-nonlinear nanophotonic waveguides for highly efficient second-harmonic generation," Sep. 17, 2018, 8 pages, accessed Mar. 30, 2022, available at https://arxiv.org/abs/1809.06476.
Lu et al., "Chip-integrated visible-telecom entangled photon pair source for quantum communication," Nature Physics, vol. 15, Jan. 21, 2019, pp. 373-381, available at https://doi.org/10.1038/s41567-018-0394-3.
Matsushita et al., "Quasi-phase-matched parametric fluorescence in a periodically inverted GaP waveguide," Applied Physics Express, vol. 2, No. 6, May 22, 2009, pp. 061101.
May et al., "Second-harmonic generation in AlGaAs-on-insulator waveguides," Optics Letters, vol. 44, No. 6, Mar. 15, 2019, pp. 1339-1342.
Pasiskevicius et al., "Quasi-phase matched nonlinear media: Progress towards nonlinear optical engineering," Optical Materials, vol. 34, No. 3, Jul. 22, 2011, pp. 513-523.
Pernice et al., "Second harmonic generation in phase matched aluminum nitride waveguides and micro-ring resonators," Applied Physics Letters, vol. 100, No. 22, May 30, 2012, pp. 223501.
Rao et al., "Second-harmonic generation in periodically-poled thin film lithium niobate wafer-bonded on silicon," Optics Express, vol. 24, No. 26, Dec. 26, 2016, pp. 29941-29947.
Rao et al., "Second-harmonic generation in single-mode integrated waveguides based on mode-shape modulation," Applied Physics Letters, vol. 110, No. 11, Jan. 19, 2017, pp. 111109.
Schunemann et al., "Optical parametric oscillation in quasi-phase-matched GaP," Proc SPIE, Nonlinear Frequency Generation and Conversion: Materials, Devices, and Applications XIV, vol. 9347, Mar. 24, 2015, pp. 93470J.
Spencer et al., "Low kappa, narrow bandwidth Si3N4 Bragg gratings," Optics Express, vol. 23, No. 23, Nov. 16, 2015, pp. 30329-30336.
Thomson et al., "Low Loss MMI Couplers for High Performance MZI Modulators," IEEE Photonics Technology Letters, vol. 22, No. 20, Oct. 15, 2010, pp. 1485-1487.

(56) References Cited

OTHER PUBLICATIONS

Tison et al., "Path to increasing the coincidence efficiency of integrated resonant photon sources," Optics Express, vol. 25, No. 26, Dec. 25, 2017, pp. 33088-33096.
Wang et al., "Ultrahigh-efficiency wavelength conversion in nanophotonic periodically poled lithium niobate waveguides," Optica, vol. 5, No. 11, Nov. 7, 2018, pp. 1438-1441.
Wang et al., "Second harmonic generation in nano-structured thin-film lithium niobate waveguides," Optics Express, vol. 25, No. 6, Mar. 2017, pp. 6963-6973.
Yang et al., "Realization of controllable photonic molecule based on three ultrahigh-Q microtoroid cavities", Laser & Photonics Reviews, vol. 11, No. 2, Jan. 16, 2017, paper 1600178, 8 pages.
Yoo et al., "Wavelength conversion by difference frequency generation in AlGaAs waveguides with periodic domain inversion achieved by wafer bonding," Applied Physics Letters, vol. 68, No. 19, May 6, 1996, pp. 2609-2611.
Yu et al., "Efficient continuous wave second harmonic generation pumped at 1.55 μm in quasi-phasematched AlGaAs waveguides," Optics Express, vol. 13, No. 26, Dec. 26, 2005, pp. 10742-10748.
International Search Report dated Jan. 11, 2022, regarding application No. PCT/US2021/071721, 4 pages.
Written Opinion of the International Searching Authority dated Jan. 11, 2022, regarding application No. PCT/US2021/071721, 7 pages.
International Search Report dated Jan. 14, 2022, regarding application No. PCT/US2021/071722, 5 pages.
Written Opinion of the International Searching Authority dated Jan. 14, 2022, regarding application No. PCT/US2021/071722, 6 pages.
International Search Report dated Feb. 8, 2022, regarding application No. PCT/US2021/071723, 5 pages.
Written Opinion of the International Searching Authority dated Feb. 8, 2022, regarding application No. PCT/US2021/071723, 8 pages.
International Search Report and Written Opinion of the International Searching Authority dated Feb. 9, 2022, regarding application No. PCT/US2021/071725, 24 pages.
Non-Final Office Action dated Jul. 8, 2022, regarding U.S. Appl. No. 17/450,046, 23 pages.
Clark et al., "Depositing Light in a Photonic Stop Gap by Use of Kerr Nonlinear Microresonators," Optics Letters, vol. 28, No. 10, 2003, pp. 1966-1968.
Non-Final Office Action dated Aug. 10, 2022, regarding U.S. Appl. No. 17/450,031, 29 pages.
Lumerical, "Lithium Niobate Nonlinear Thermal Waveguide," ANSYS, available at https://optics.ansys.com/hc/en-us/articles/360047509134-Lithium-Niobate-Nonlinear-Thermal-Waveguide, last accessed on Dec. 5, 2022, 19 pages.
Notice of Allowance, dated Nov. 23, 2022, regarding U.S. Appl. No. 17/450,046, 10 pages.

* cited by examiner

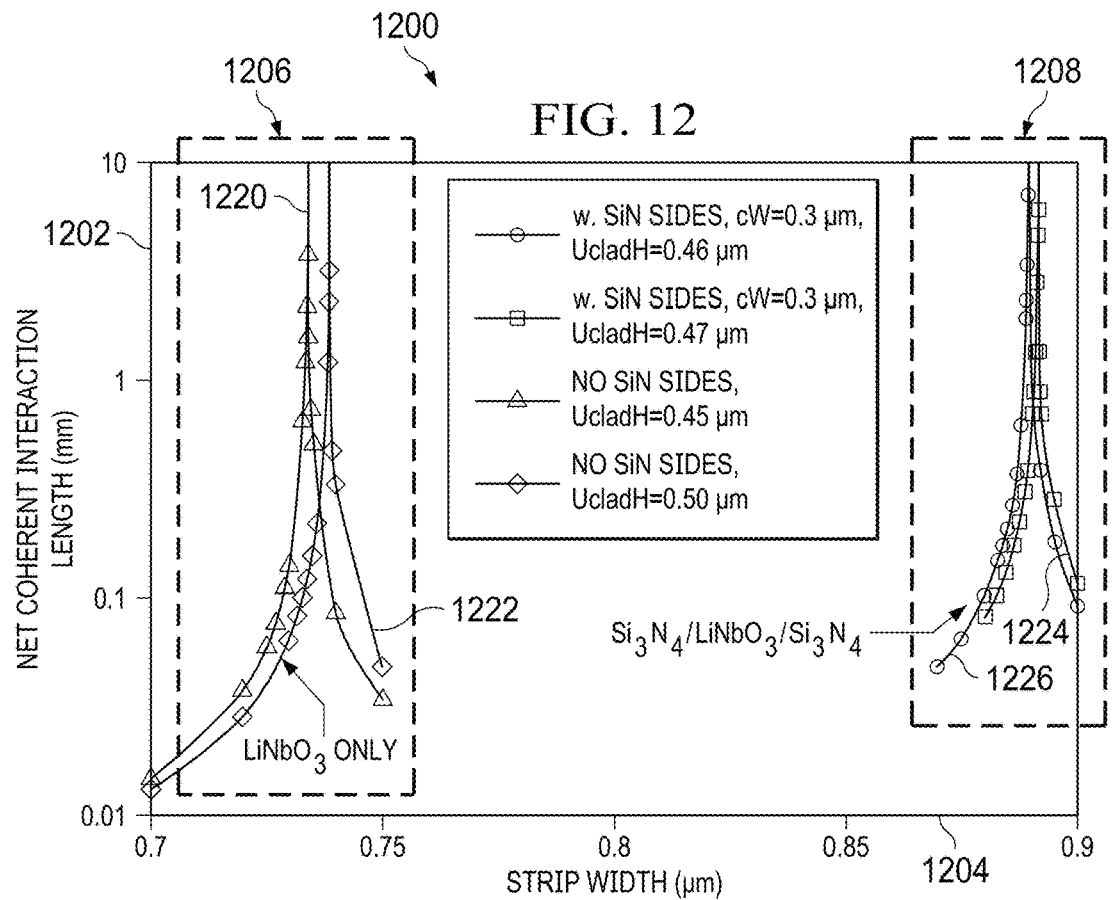
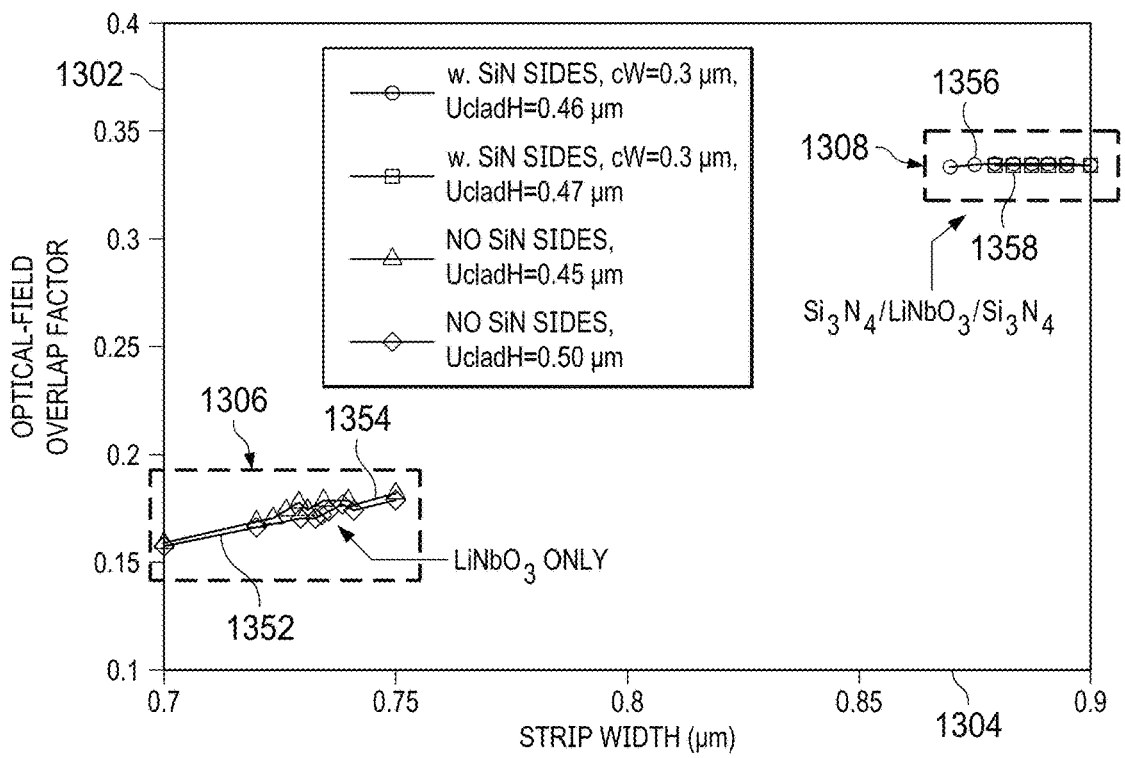

FIG. 18
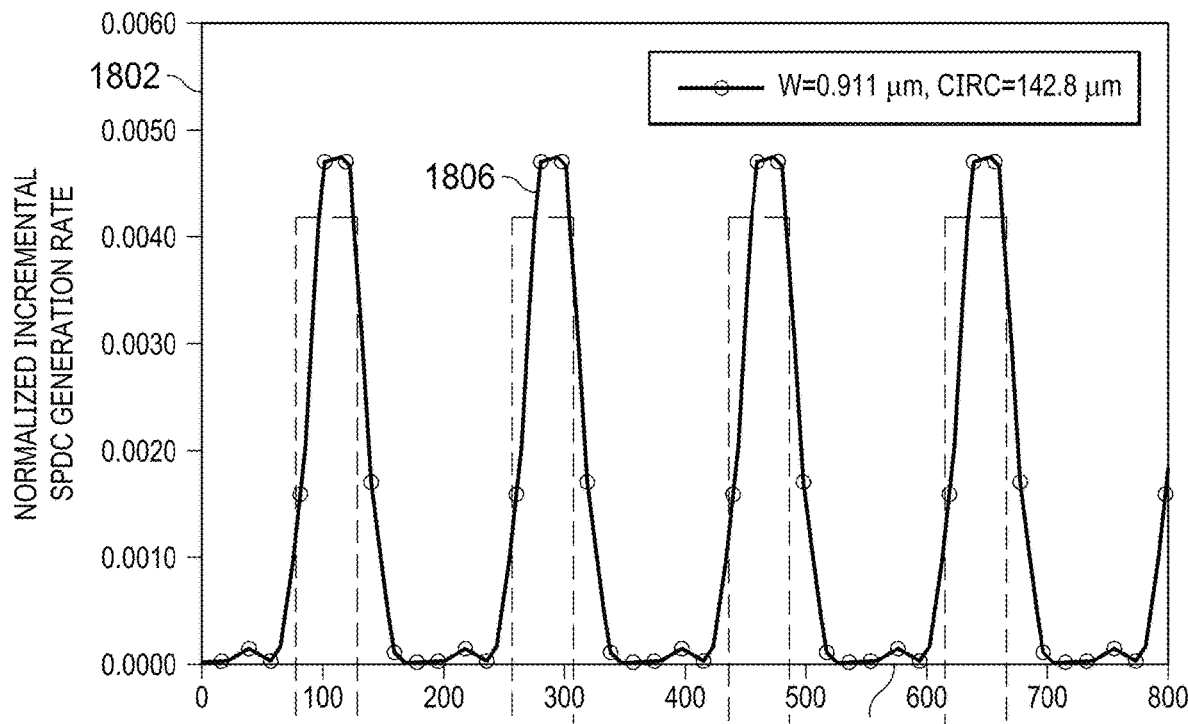
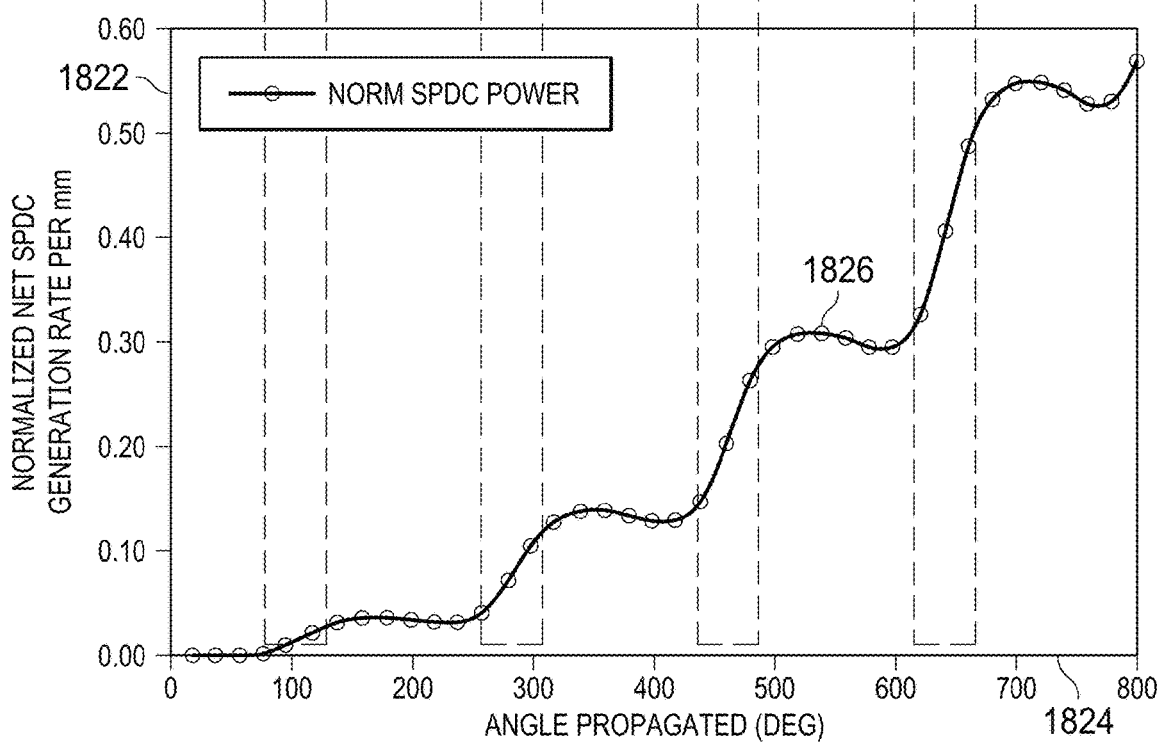

FIG. 24
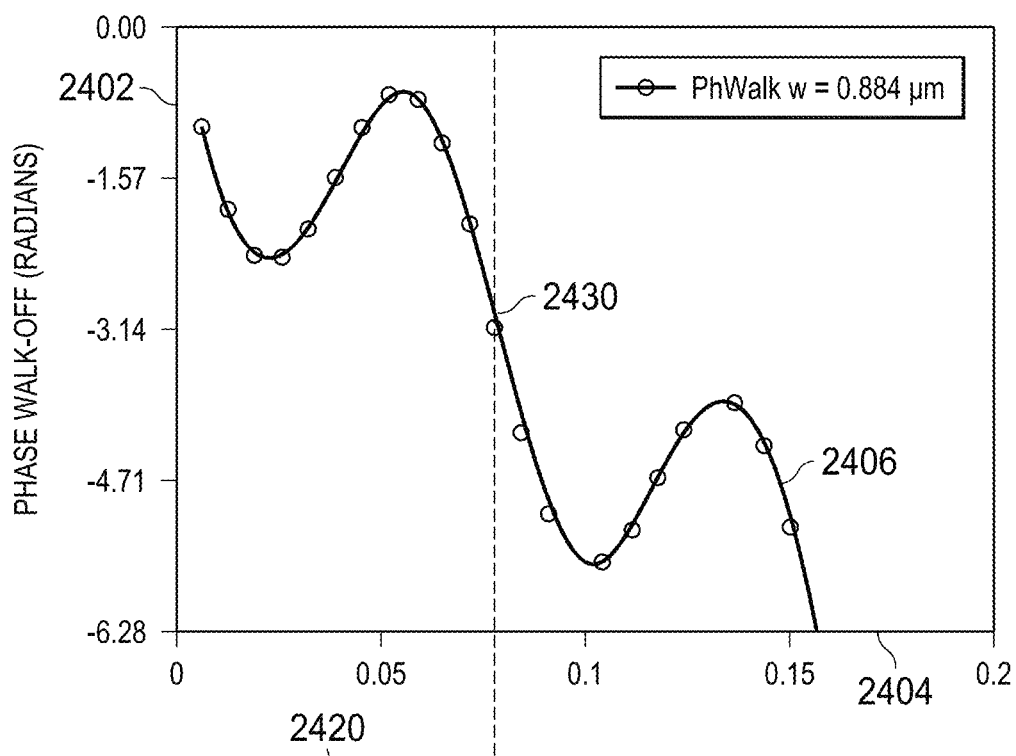
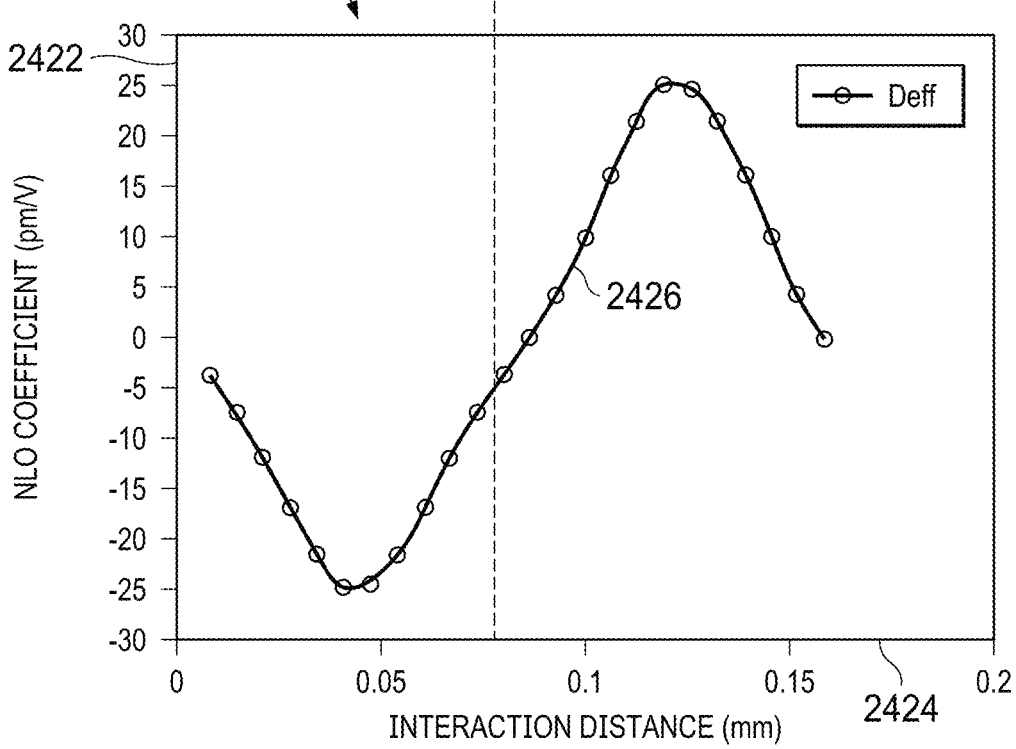

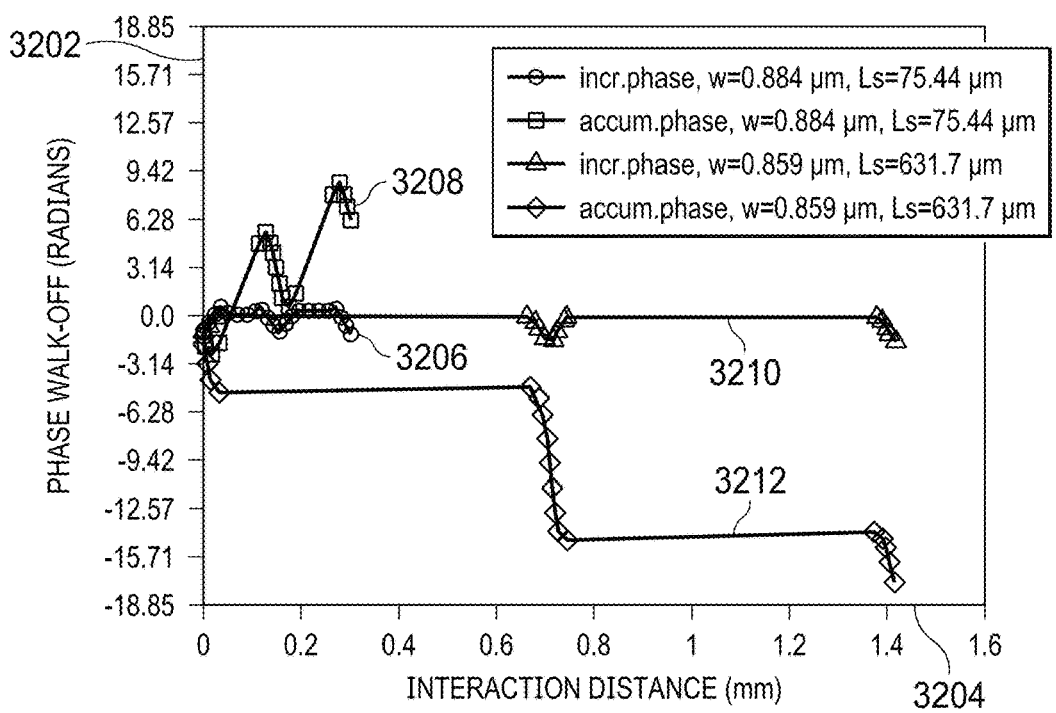
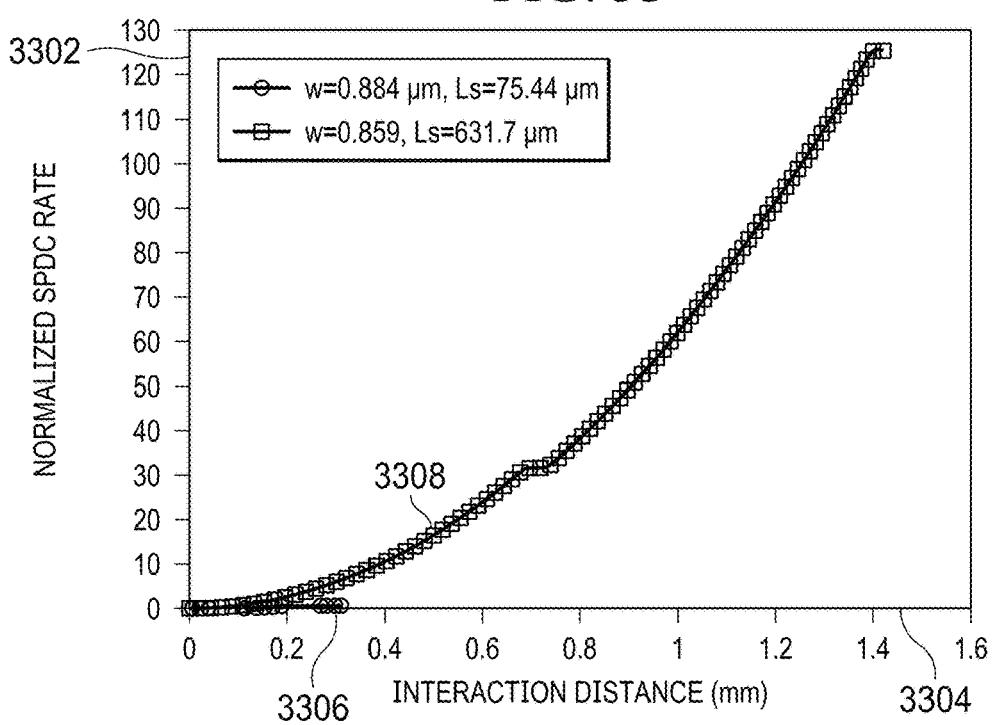

DIRECTIONAL PHASE MATCHING OPTICAL WAVEGUIDE

CROSS-REFERENCE TO RELATED APPLICATIONS

This application is related to and claims the benefit of priority of provisional U.S. Patent Application Ser. No. 63/088,220, entitled "Directional Phase Matching (DPM) Optical Waveguide", filed on Oct. 6, 2020; provisional U.S. Patent Application Ser. No. 63/201,661, entitled "Directional Phase Matching Optical Waveguide", filed on May 7, 2021; and provisional U.S. Patent Application Ser. No. 63/201,664, entitled "Nonlinear Optical Waveguide Structures for Light Generation and Conversion", filed on May 7, 2021, all of which are hereby incorporated by reference.

BACKGROUND INFORMATION

1. Field

The present disclosure relates generally to optical waveguide structures and, in particular, to directional phase matching optical waveguide structures.

2. Background

Optical waveguides are physical structures that guide electromagnetic waves in an optical spectrum. Optical waveguides can be used as components in integrated optical circuits. With respect to quantum communications and processing, nonlinear optical material structures can be used to create photon transmitters, repeaters, and other quantum devices for communications. Nonlinear optical structures can be used to change the light passing through them depending on factors such as orientation, temperature, wavelength of light, polarization of light, and other factors. For example, a waveguide with light of a blue wavelength passing through the waveguide can generate one or more photons of light that has a longer wavelength, such as green or red, and a correspondingly lower photon energy. This type of conversion can be performed using waveguides that incorporate a material having a second order nonlinear optical susceptibility.

Currently, second order nonlinear optical frequency conversion is used. However, current waveguides and structures that implement second order nonlinear optical processes are not as efficient as desired.

Therefore, it would be desirable to have a method and apparatus that take into account at least some of the issues discussed above, as well as other possible issues. For example, it would be desirable to have a method and apparatus that overcome a technical problem with increasing the efficiency of second order nonlinear optical processes using waveguides.

SUMMARY

An embodiment of the present disclosure provides an optical waveguide structure comprising a nonlinear optical waveguide. The nonlinear optical waveguide comprises a nonlinear optical material having a second order nonlinear coefficient for a second order nonlinear susceptibility in which the second order nonlinear coefficient changes with a direction of light propagation. A light propagating in a first direction through a first portion of the nonlinear optical waveguide has a first sign of the second order nonlinear coefficient for a nonlinear optical interaction of the light with the nonlinear optical material in the first portion of the nonlinear optical waveguide, and the light propagating in a second direction through a second portion of the nonlinear optical waveguide has a second sign of the second order nonlinear coefficient for the nonlinear optical interaction of the light with the nonlinear optical material in the second portion of the nonlinear optical waveguide. The light propagates through the nonlinear optical waveguide. The light generated in a first location in a nonlinear optical interaction occurring in the first portion of the nonlinear optical waveguide propagates to a second location in the second portion of the nonlinear optical waveguide and has a phase walk-off between the first location and the second location that is an odd multiple of 180 degrees.

Another embodiment of the present disclosure provides an optical waveguide structure comprising a nonlinear optical waveguide comprising a nonlinear optical material having a second order nonlinear coefficient that changes with a direction of light propagation. A first portion of the nonlinear optical waveguide in which a light propagating through the first portion is affected by a positive value of a second order nonlinear coefficient. A second portion of the nonlinear optical waveguide in which the light propagating through the first portion is affected by a negative value of a second order nonlinear coefficient, wherein a set of dimensions in the nonlinear optical waveguide in the first portion and the second portion is selected to cause the light in a first location in the first portion and a second location in the second portion to have a relative phase walk-off that is an odd multiple of 180 degrees.

Yet another embodiment of the present disclosure provides a method for moving a light through an optical waveguide structure. A light at a pump wavelength is input into the optical waveguide structure comprising a nonlinear optical material having a second order nonlinear coefficient that changes with a direction of light propagation. The light is propagated along a path in the optical waveguide structure from a first location in a first portion of the nonlinear optical waveguide having a first sign of a second order nonlinear coefficient for a nonlinear optical interaction of the light with the nonlinear optical material in the first portion of the nonlinear optical waveguide. The light propagate along the path in the optical waveguide structure to a second location in a second portion of the nonlinear optical waveguide having a second sign of the second order nonlinear coefficient for the nonlinear optical interaction of the light with the nonlinear optical material in the second portion of the nonlinear optical waveguide. The light generated in a first location in a nonlinear optical interaction occurring in the first portion of the nonlinear optical waveguide propagates to the second location in the second portion of the nonlinear optical waveguide and has a phase walk-off between the first location and the second location that is an odd multiple of 180 degrees.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of a graph of a net coherent interaction length for different configurations of nonlinear optical waveguides in accordance with an illustrative embodiment;

FIG. 13 is an illustration of a graph of an optical field overlap factor for different configurations of nonlinear optical waveguides in accordance with an illustrative embodiment;

FIG. 18 is an illustration of graphs illustrating normalized incremental spontaneous parametric down conversion generation rates relative to a normalized net spontaneous parametric down conversion generation rates in accordance with an illustrative embodiment;

FIG. 24 is an illustration of graphs illustrating a phase walk-off relative to a nonlinear optical coefficient in accordance with an illustrative embodiment;

FIG. 32 is an illustration of a graph of a phase walk-off in accordance with an illustrative embodiment;

FIG. 33 is an illustration of a graph of a normalized spontaneous parametric down conversion rate in accordance with an illustrative embodiment;

DETAILED DESCRIPTION

Figure 1:
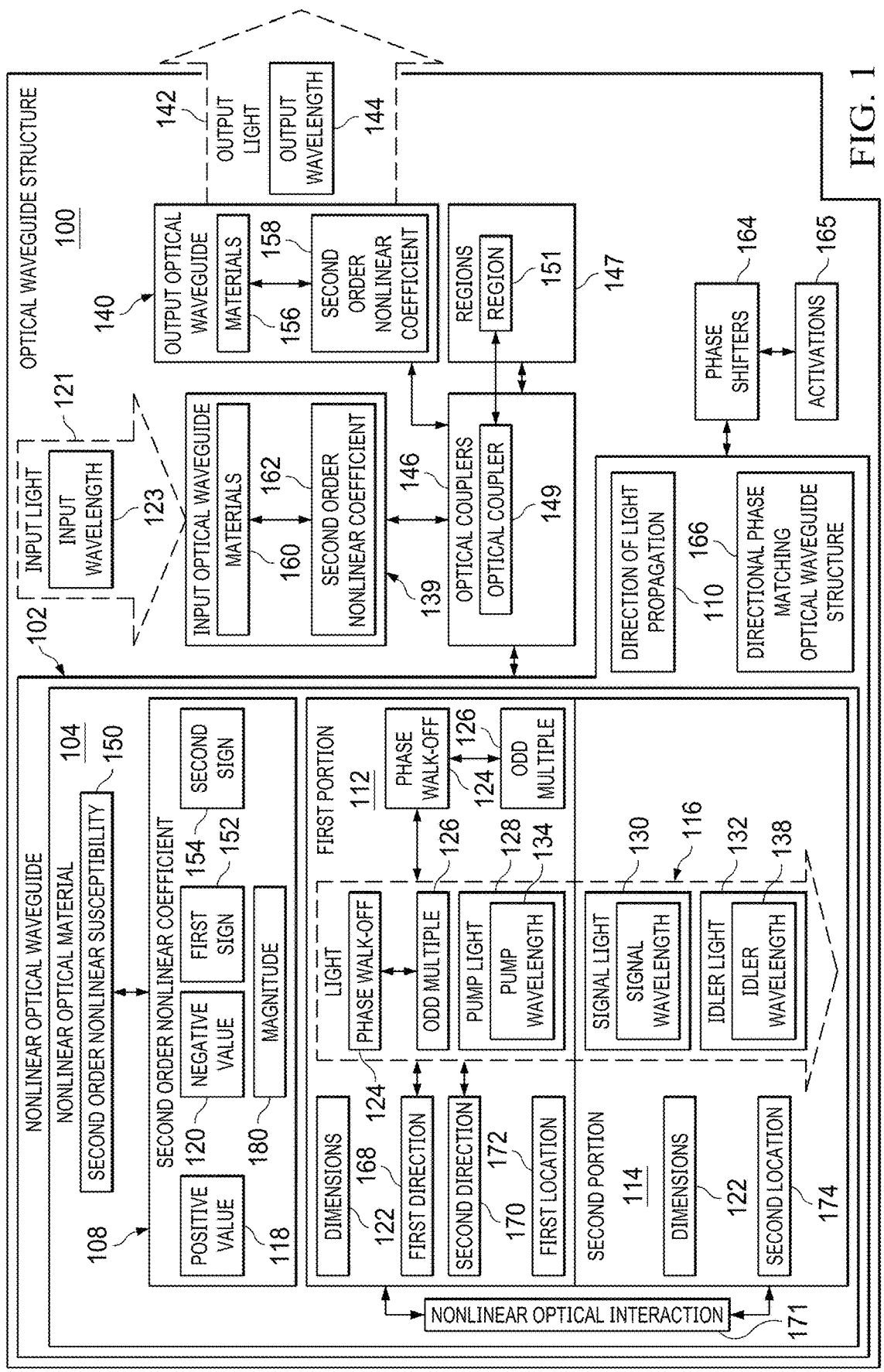
FIG. 1 is an illustration of a block diagram of an optical waveguide structure in accordance with an illustrative embodiment.

Example embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, as some features may be exaggerated to show details of particular components. Therefore, specific structural and functional details disclosed herein are not to be interpreted as limiting, but merely as a representative basis for teaching one skilled in the art to variously employ the methods and structures of the present disclosure.

For purposes of the description hereinafter, the terms "upper," "lower," "right," "left," "vertical," "horizontal," "top," "bottom," and derivatives thereof shall relate to the illustrative examples in the disclosure, as it is oriented in the drawing figures. The terms "positioned on" means that a first element, such as a first structure, is present on a second element, such as a second structure, wherein intervening elements, such as an interface structure, e.g., interface layer, may be present between the first element and the second element.

In this disclosure, when an element, such as a layer, a region, or a substrate, is referred to as being "on" or "over" another element, the element can be directly on the other element or intervening elements can also be present. In contrast, when an element is referred to as being "directly on," "directly over," or "on and in direct contact with" another element, no intervening elements are present, and the element is in contact with the other element.

Any processes, steps, and structures described below do not form a complete process flow for manufacturing integrated circuits. The disclosure can be practiced in conjunction with integrated circuit fabrication techniques currently used in the art, and only so much of the commonly practiced process steps are included as necessary for an understanding of the different examples of the present disclosure. The figures represent cross-sections of a portion of an integrated circuit during fabrication and are not drawn to scale, but instead are drawn so as to illustrate different illustrative features of the disclosure.

The illustrative examples pertain to a nonlinear optical interaction and a nonlinear optical process in which one or two input photons can generate one or two output photons from those input photons. A nonlinear optical process involves not only the generation of those photons but also the material in which those photons propagate or travel. Nonlinear optical material can be described by its nonlinear optical susceptibility or nonlinear optical coefficient. A wavelength, frequency, or energy of at least one of the output photons is different from the wavelength, frequency, or energy of at least one of the input photons.

A second order nonlinear optical process involves 3 types of photons. These 3 types of photons can be referred to as the photons of a first light, a second light, and a third light. Many second order nonlinear optical processes involve the interaction of 2 input photons to produce 1 output photon.

In the illustrative examples, one of the input photons involved in the nonlinear optical interaction is referred to as the pump photon or a photon of the pump light. The second input photon is referred to as the signal photon or a photon of a signal light. The output photon is referred to as the idler photon or a photon of the idler light. Alternatively, the second input photon can be referred to as the idler photon or a photon of the idler light. The output photon can be referred to as the signal photon or a photon of the signal light.

Examples of these types of nonlinear optical processes include difference frequency generation (DFG) and sum frequency generation (SFG). In difference frequency generation, the frequency of the output third light (or the energy of the output third photon) is equal to the difference between the frequencies of the input first light and the input second light (or the difference between the energies of the two input photons). In SFG, the frequency of the output third light (or the energy of the output third photon) is equal to the sum of the frequencies of the input first light and the input second light (or the sum of the energies of the two input photons). The energy of a photon is related to the frequency of the light comprising that photon by the Planck constant. Since the frequency (or frequencies) of the output light is different from the frequency (or frequencies) of the input light, these processes can be considered as producing nonlinear optical frequency conversion.

For the second order nonlinear optical process in some of the illustrative examples given below, the nonlinear optical process involves 1 input photon (the pump photon) that produces 2 output photons (the signal photon and the idler photon). This nonlinear optical process is called spontaneous parametric down-conversion (SPDC). Spontaneous parametric down-conversion is a form of difference frequency generation in which either the signal photon or the idler photon is not supplied externally as input light but rather can be generated spontaneously due to a noise process or to processes such as Raman scattering. This signal photon or idler photon can act as an internally produced second input to the nonlinear optical process.

In an illustrative example, a second order nonlinear optical process involves 3 types of photons in a material. These photons can be referred to as photons of the pump light, photons of the signal light, and photons of the idler light. Among these 3 types of photons, pump photons have the highest energy (and the pump light has the shortest wavelength and highest frequency), idler photons have the lowest energy (and the idler light has the longest wavelength and lowest frequency), and signal photons have an intermediate energy (and the signal light has an intermediate wavelength and intermediate frequency). For light, or a light wave, propagating in vacuum, the frequency of that light is related to the inverse of the wavelength of that light by the speed of light, which is a known constant.

The propagation constant or wave vector can be used to describe the change in the phase of the light wave for a given distance of travel in a given material. The value of the propagation constant or wave vector typically is different for different wavelengths of light and can depend on the refractive index of the material through which the light propagates, and depend inversely on the value of the wavelength of the light. Thus, $k_P$, $k_S$, and $k_I$ can be defined as the propagation constants or wave vectors for the pump light, the signal light, and the idler light, respectively.

The refractive indices of the materials comprising a waveguide structure and also a geometric construction of the waveguide structure can affect the propagation constant of the light at each wavelength of light propagating in the waveguide structure. Light wave-guided by an optical waveguide and propagating in that optical waveguide can be described as comprising a set of guided modes. The propagation constant for a given guided mode (e.g., mode m) of the pump light propagating in the waveguide structure can be defined by the following expression:

$$k_{Pm} = 2\pi\, n_{eff,Pm}/\lambda_P$$

where $\lambda_P$ is the free-space wavelength of the pump light and $n_{eff,Pm}$ is an effective refractive index of wave-guided mode m of the pump light propagating in the waveguide structure, and $\lambda_P$ is the wavelength of the pump light.

Similar expressions can be given for the signal light and the idler light. The pump light, signal light, and idler light have different wavelengths.

For a second order nonlinear optical process that occurs at a given location, such as involving difference frequency generation, both the frequencies of the pump, signal, and idler light and the energies of the pump, signal, and idler photons are constrained by an energy conservation relation and the propagation constants of the pump, signal, and idler light are constrained by a momentum conservation relation, such as:

$$1/\lambda_p = 1/\lambda_s + 1/\lambda_i \text{ and } k_p = k_s + k_i, \text{ respectively.}$$

For a difference frequency generation process that occurs over some travel distance, perfect phase matching is achieved when $k_P L_P = k_S L_S + k_I L_I$, where $L_P$, $L_S$, and $L_I$ are the distances traveled by the pump light, the signal light, and the idler light, respectively, as they participate in the nonlinear optical process. The phase shift of the pump light is $k_P L_P$, the phase shift of the signal light is $k_s L_s$, and the phase shift of the idler light is $k_I L_I$.

In this illustrative example, distance-separated nonlinear optical processes are nonlinear optical processes that occur at two different locations or points in which the two different locations are separated by some distance. The locations can be along a path in an optical waveguide.

If the phase matching is not an exact match, a phase walk-off ($\Delta\phi$) for the distance-separated nonlinear optical processes can be defined as:

$$\Delta\phi = k_P L_P - k_S L_S - k_I L_I$$

If all 3 wavelengths of light travel the same distance over which they interact in the nonlinear optical process, a propagation-constant mismatch or wave vector mismatch ($\Delta k$) for the nonlinear optical process can be defined by the relation:

$$\Delta k = k_P - k_S - k_I$$

This propagation-constant mismatch leads to a phase mismatch between the light generated at a first location and then propagated to a second location and the light generated at the second location.

In the illustrative example, the phase walk-off is between the light produced by the nonlinear optical interaction that occurs in a nonlinear optical material between two locations.

A phase walk-off is a phase walk-off between the light produced at two locations, a first location and a second location, on a path in an optical waveguide. For example, the relative phase walk-off can be for light, such as an idler light, at those two locations, where the idler light is generated by a difference frequency generation process involving the signal light and the pump light. More specifically, the relative phase walk-can be the difference between the phase of the idler light generated at the first location and propagated to the second location and the idler light newly generated at the second location. The phase of the newly generated idler light is determined by the phases of the pump light and the signal light at that location, according to the momentum conservation condition of the nonlinear optical process.

A relative phase walk-off is a phase walk-off between a first location and a second location on the path and between the first location and additional locations between the first location and the second location on the path in an optical waveguide. A cumulative phase walk-off as defined at a given location in a path is the relative phase walk-off between the starting point of a nonlinear optical process and that given location. In one illustrative example, the starting point of the nonlinear optical process can be the beginning of the nonlinear optical waveguide structure. In another illustrative example, the starting point can be the location of the pump input coupler that couples an input pump light into the nonlinear optical waveguide. The given location can be a second location within the nonlinear optical waveguide. A cumulative phase walk-off can also be referred to as an accumulated phase walk-off.

For example, the light propagating in a nonlinear optical waveguide structure can start at location 0 and then progress onto location A and then progress further onto location B and then finally exit the nonlinear optical waveguide structure after passing location C. The relative phase walk-off can be the amount of phase walk-off associated with the light traveling between locations A and B. A different value for the "relative phase walk-off" can be obtained for the light travel between locations B and C.

This light can be, for example, a pump light, a signal light, and an idler light. The phase walk-off can be determined for any of all of the types of light.

The relative phase shifts and relative phase walk-off can be defined with respect to a particular interaction distance and to the length of a particular segment, section, or portion of the nonlinear optical waveguide. The relative phase shifts and the relative phase walk-off also can be defined with respect to a particular structure and material composition of the nonlinear optical waveguide, which determine the effective refractive index of the waveguided light, as well as to the direction of propagation of light in that waveguide. For some materials, the refractive index varies with the direction of propagation of the light through that material.

As an illustrative example, if location A and location B are the two ends of a "first straight segment" of an optical waveguide, the relative phase walk-off could have a first value. However, if location A and location B are the two ends of a "second curved segment" of an optical waveguide, the direction of propagation in at least a portion of the curved segment is different from the direction of propagation in the straight segment. In this case, the relative phase walk-off for that "second curved segment" can have a second value that is different from the first value for the "first straight segment".

The effective index of the waveguided pump, signal and idler light can vary with the location in a waveguide. Other factors such as the nonlinear optical coefficient deff and the amplitudes of the contributing optical waves A1 and A2 also can vary with the location. Consider the illustrative example of difference frequency generation of idler light from pump light and signal light. The phase walk-off obtained after the source pump and signal light and the generated idler light travel in a waveguide with longitudinal axis 1 can be described as follows:

$$\Delta\phi = \text{integral}\,[k_P(l) - k_S(l) - k_I(l)]\,dl,$$

where l is a value of a point location on the longitudinal axis, $k_P(l)$ is the propagation constant for the pump light at location l, $k_S(l)$ is the propagation constant for the signal light at location l, $k_I(l)$ is the propagation constant for the idler light at location l, and dl is the increment value of distance along the longitudinal axis used in the integral. The start and end points of the integral are the two locations (such as location A and location B discussed above) that determine the portion of nonlinear optical waveguide between which the relative phase walk-off is obtained.

The expression above can be rewritten as:

$$\Delta\phi = \text{integral}[kP(l) - kS(l)]dl - \text{integral}[kI(l)]dl$$

The first integral represents the phase of the newly generated idler light, which is determined from the phases of the pump and signal light that have propagated to the location l. The second integral represents the phase of the previously generated idler light that has propagated to the location l.

An integral can be approximated as a sum of successive incremental distances and the values of the integrand for those successive locations. The integral accounts for the variation in the value for the propagation constant or effective refractive index for different locations along the longitudinal axis. This axis can be straight or curved.

In the illustrative example, efficiency in generating output photons from input photons can be increased. For example, an increase in the efficiency can be described by (i) an increase in the probability of generating a photon for every photon coming in, (ii) an increase in the number of photons produced (or power of the light produced) for a given number of photons coming in (or power of the light coming in), and (iii) an increase in the rate of photons produced for a given rate of photons coming in.

The illustrative examples recognize and take into account that with current techniques, second order nonlinear optical frequency conversion is performed using either modal phase matching or quasi phase matching, but not both together. The illustrative examples recognize and take into account that current waveguides and structures that implement second order nonlinear optical processes are not as efficient as desired.

The illustrative embodiments recognize and take into account that a nonlinear optical process can be constructive or destructive. The illustrative embodiments recognize and take into account that constructive or destructive nonlinear optical interaction between the light generated at a first location and the light generation can occur at a second location. In other words, the interaction is the light generated in the first location that propagates to the second location and how that generated light at the second location interacts or affects the light generation occurring in the second location.

The illustrative embodiments recognize and take into account that the effect on light generation at the second location can also occur because of the light that is already propagating in addition to the light generated at the first location. The illustrative embodiments recognize and take into account that when the power from the generated light at the second location goes back into the source light, the nonlinear optical interaction is destructive. The illustrative embodiments recognize and take into account that the nonlinear optical interaction is constructive when the power in the light generated increases and the power in the source light decreases. In the illustrative example, the source light can be the pump light or other light input into the nonlinear optical waveguide.

The illustrative examples recognize and take into account that with current techniques for nonlinear optical frequency conversion producing light of a second wavelength (or wavelengths) from light of a first wavelength (or wavelengths), a phase matching condition can be maintained such that a relative phase walk-off between a light generated at a first location of the waveguide and a light generation occurring at a second location of the waveguide is less than 180 degrees. The illustrative examples recognize and take into account that these two locations can be, for example, the start locations and end locations of a waveguide or waveguide segment. The illustrative embodiments recognize and take into account that relative phase walk-off for the light generation at these two locations should remain less than 180 degrees for the nonlinear optical frequency conversion to be constructive and thus for the optical power at the second wavelength (or wavelengths) to continue to build up, with current techniques.

The illustrative embodiments recognize and take into account that when the relative phase walk-off has a value between 180 degrees and 360 degrees, the nonlinear optical interaction of the light at the second location of these two locations is destructive and the optical power at the second wavelength is reduced as compared to the optical power that can be obtained when the relative phase walk-off has a value of 180 degrees. The illustrative embodiments recognize and take into account that when the relative phase walk-off has a value between 360 degrees and 540 degrees, the nonlinear optical interaction again becomes constructive and the optical power at the second wavelength is increased as compared to the optical power that can be obtained when the relative phase walk-off has a value of 360 degrees. The illustrative embodiments recognize and take into account that a constructive condition can apply to light generation at a specific location on a path in an optical waveguide. However, that light generation is affected by the light generated at preceding locations on the path in the optical waveguide.

The illustrative embodiments also recognize and take into account that when the relative phase walk-off between these two locations has a value between 180 degrees and 360 degrees, the nonlinear optical interaction of the light generation at the first of these two locations and the light generation occurring at the second of these two locations is destructive. As a result, the illustrative embodiments recognize and take into account that the optical power at the second wavelength is reduced compared to the optical power that can be obtained if the nonlinear optical interaction were constructive.

The illustrative embodiments also recognize and take into account that the relative phase walk-off between the second location and a third location on the path in the optical waveguide can have a value between 360 degrees and 540 degrees. In this case, the nonlinear optical interaction of the light becomes constructive.

The illustrative examples recognize and take into account that the phase walk-off maintained should be no greater than 180 degrees for the nonlinear optical interaction that produces the light of the second wavelength (or wavelengths) to continue to be a constructive or coherent process that progressively increases the amount of light at the second wavelength (or wavelengths). The illustrative examples recognize and take into account that when the phase walk-off exceeds 180 degrees and until that phase walk-off reaches 360 degrees, the nonlinear optical process in currently used waveguides is a destructive process, decreasing the amount of light at the second wavelength (or wavelengths) and thereby increasing the amount of light at the first wavelength (or wavelengths).

The illustrative embodiments recognize and take into account that an accumulated phase walk-off can be determined for two locations. The accumulated phase walk-off can be the phase walk-off determined between A and location B on a path in an optical waveguide and for locations between location A and location B on the path.

The illustrative examples recognize and take into account that with current waveguides, an accumulated amount of nonlinear optical frequency conversion or a net efficiency of that nonlinear optical frequency conversion does not exceed the value reached when the phase walk-off is 180 degrees. Instead, the illustrative examples recognize and take into account that a net amount of power in the second wavelength (or wavelengths) oscillates between this maximum value and zero when the nonlinear optical interaction distance is made larger and larger.

In contrast, the illustrative examples recognize and take into account that for the structures that implement direction-reversal enhanced coherent interaction in the illustrative examples, the accumulated amount of nonlinear optical frequency conversion can continue to increase and be much greater than the amount achieved when the phase walk-off is at 180 degrees. In the illustrative examples, despite the large, accumulated phase walk-off, the nonlinear optical interaction continues to be coherent and thus continues to increase the optical power at the second wavelength (or wavelengths).

In one illustrative example, a directional phase matching waveguide structure can have a central region with strong nonlinear optical susceptibility or a large nonlinear optical coefficient and side regions comprising a material with weak nonlinear optical susceptibility or a small nonlinear optical coefficient (in comparison to the material of the central region). The efficiency of the second order nonlinear optical process depends on the net overlap between optical fields at the 3 wavelengths and the nonlinear optical material in the waveguide. The optical-field overlap factor, which is the normalized integral of these 3 optical fields within the cross-sectional area of the nonlinear optical material, can be 2 to 10 times larger for this illustrative example of the directional phase matching waveguide structure when compared to a prior-art waveguide structure. Since the efficiency of the optical-frequency conversion is proportional to the square of the optical-field overlap factor, the improvement afforded by this illustrative example of the directional phase matching waveguide structure can result in a 4 to 100 times higher optical-frequency conversion efficiency.

In an illustrative example, the directional phase matching waveguide structure can have at least one of input optical waveguides or output optical waveguides containing only material with weak or negligible nonlinear optical susceptibility or a nonlinear optical coefficient. This structure is beneficial because the nonlinear optical frequency conversion is constrained to occur within the nonlinear optical waveguide portion of the directional phase matching waveguide structure, and the nonlinear optical frequency conversion does not occur in other portions of the directional phase matching waveguide structure. In this illustrative example, the nonlinear optical waveguide portion of the directional phase matching waveguide structure can be designed to produce specific wavelengths of output light and at specific instances in time. Such control can be especially useful when the direction-reversal enhanced coherent interaction in this waveguide structure can be used to produce entangled photon pairs and when production of additional, non-entangled photons is not desired.

In the illustrative example, the second order nonlinear optical process of parametric down conversion can be operated with the higher frequency (shorter wavelength) pump light supplied as input to the waveguide and without any lower frequency (longer wavelength) signal light and idler light supplied. Some of the signal light and/or the idler light can be generated "spontaneously". The spontaneous generation of the signal light and/or the idler light can be due to a noise process or other processes such as Raman scattering. The spontaneous parametric down conversion (SPDC) process can be used to produce entangled photon pairs for quantum optical applications.

When using second order nonlinear optical processes such as sum frequency generation and difference frequency generation in the illustrative example, the direction-reversal enhanced coherent interaction structure can produce an output photon of a second optical frequency or wavelength from an input photon of a first optical frequency or wavelength. Thus, this illustrative example can be used as an optical-frequency converter for single photons. The optical-frequency converter in the illustrative example enables both generation of the entangled photon pairs and frequency conversion of the single photons, which are useful for quantum networks and quantum processors.

In the illustrative example, second harmonic generation (SHG) can be used to generate optical wavelengths for which an optical emitter is not readily available. For example, second harmonic generation can be used to produce blue/green and yellow/green light. Second harmonic generation can be used to generate wavelengths of light useful for through-water optical communication. In the illustrative example, second harmonic generation can be used to produce deep ultraviolet light for solar-blind optical communication, and second harmonic generation can be used to generate ultraviolet light also for disinfection. For example, the second harmonic generation can be used to generate ultraviolet light in categories such as far UV, UVC, UVB, or UVA. The wavelengths can be from about 100 nm to 400 nm depending on the category of the ultraviolet light generated.

In the illustrative example, the processes of sum frequency generation and difference frequency generation can be used to produce light of mid-wave infrared (MWIR) and long-wave infrared (LWIR) wavelengths. For example, such processes can be used to produce the mid-wave infrared light used for laser infrared countermeasures (IRCM) sources that protect aircraft.

The directional phase matching waveguide structures in the illustrative example can result in optical sources that are more compact as compared to current systems. For example, these optical sources can have a chip-scale size. Further, these optical sources can also be manufactured with a lower cost. For example, optical sources including directional phase matching waveguide structures in the illustrative example can be fabricated using wafer-scale processes.

The illustrative examples recognize and take into account that waveguides that accomplish second order nonlinear optical frequency conversion can use techniques such as "modal phase matching" and "quasi phase matching" to accomplish the phase matching that is needed to have a long coherent interaction distance over which the nonlinear optical process can occur.

The illustrative examples recognize and take into account that to accommodate the large variation in the material refractive index for a large spectral span of the optical wavelengths involved in a nonlinear optical frequency conversion process occurring in a waveguide, some current techniques use modal phase matching, for which a higher-order transverse mode of the shorter wavelength light is involved in that nonlinear optical frequency conversion. The illustrative examples recognize and take into account that modal phase matching suffers from requiring very precise control of the dimensions of the fabricated waveguide. For example, the 3 wavelengths involved in the second order nonlinear optical process may not be adjustable to compensate for departures of those waveguide dimensions from their as-designed values. Thus, the illustrative examples recognize and take into account that modal phase matching alone cannot sustain desired distances for the coherent nonlinear optical interaction, such as distances of several millimeters and greater.

The illustrative examples recognize and take into account that quasi phase matching is a technique that can be used for phase matching nonlinear optical interactions in which the relative phase walk-off is corrected at regular intervals using a structural periodicity built into the nonlinear optical waveguide or into the nonlinear optical medium. Quasi phase matching (QPM) can be used when the phase mismatch $\Delta k$ of the nonlinear optical process exceeds 180 degrees for a desired nonlinear optical interaction distance.

The illustrative examples recognize and take into account that quasi phase matching can be achieved by a periodic modulation of the effective dielectric constant of the waveguide. The illustrative examples recognize and take into account that this modulation can be accomplished by changing the width of the waveguide. The primary feature of quasi phase matching is that a Fourier component of the periodic modulation, $mK_i$, where i is the $i^{th}$ Fourier component and m is an integer. In this example, the periodic modulation $mK_i$ is equal to the phase mismatch between the input light and the output light of the nonlinear optical process. The following expression is for the case of second harmonic generation in which two photons of input light at a "fundamental" frequency generate one photon of the output light at the second harmonic frequency:

$$\Delta k = 2k_F - k_{SHG} = mK_i$$

However, the illustrative examples recognize and take into account that the corrugations in the waveguide, due to the changes in waveguide width, result in substantial optical loss from scattering of the light.

The illustrative examples recognize and take into account that other mechanisms can be used in addition to or in place of a periodic modulation in the effective refractive index of the wave-guided light. For example, the illustrative examples recognize and take into account that quasi phase matching also can be achieved using a periodic modulation of the nonlinear optical coefficient. The illustrative examples recognize and take into account that this periodic modulation of the nonlinear optical coefficient can occur using waveguides that have reversals in the material polarizability.

To achieve a desired level of efficiency in efficient optical frequency conversion, the illustrative examples recognize and take into account that waveguides that have very strong confinement of the wave-guided light can be used. For example, the transverse spatial extent of the wave-guided light can be on the order of the size of the wavelength of the light in the material comprising the waveguide. In the illustrative examples, the cross-sectional dimensions of such waveguides are small compared to the wavelength of the light guided by the waveguide.

The illustrative examples recognize and take into account that one manner for causing these reversals in material polarizability can include periodic poling of a material such as lithium niobate ($LiNbO_3$) and thereby producing periodically poled lithium niobate (PPLN) and potassium titanyl phosphate ($KTiOPO_4$ or PPKTP). Waveguide structures fabricated in periodically poled lithium niobate (or fabricated in PPKTP) can provide second harmonic generation. For example, the periodic poling can be accomplished by fabricating two sets of phase shifters, such as tuning electrodes, that are located at the sides of a straight waveguide. In this example, the waveguide can be oriented perpendicular to the crystalline Z-axis of an x-cut layer of lithium niobate. A direct current (DC) electric field can be applied for the poling when the material is heated to a high temperature above room temperature. The illustrative examples recognize and take into account that a deficiency of this process is the difficulty in achieving a 50:50 duty factor of the periodic reversals in the material polarizability. Thus, the illustrative examples recognize and take into account that the enhancement in the nonlinear optical frequency conversion achieved by the quasi phase matching can be degraded using this technique.

The illustrative examples recognize and take into account that optical waveguides for quasi phase matching periodic reversals in material polarizability also have been achieved in gallium arsenide (GaAs) and gallium phosphide (GaP). For these materials, the illustrative examples recognize and take into account that the crystallographic orientation can be reversed in a periodic pattern. This periodic pattern can be generated using a material growth process and also can be generated by stacking alternate layers of material that have opposite crystallographic orientation. For the growth process, a "seed" layer that has the periodic orientation pattern can be formed. Then, additional materials are grown to form the layers of a waveguide structure. This process can be performed in GaAs and GaP. However, the illustrative examples recognize and take into account that GaAs and GaP are not suitable for nonlinear optical frequency conversion that involves shorter wavelengths of light, which are above the bandgap of and thus can be absorbed by the GaAs or GaP.

The illustrative examples recognize and take into account that a waveguide making use of quasi phase matching alone can have a period for the reversals in material nonlinear optical polarizability that ranges from 2 µm to 10 µm when each of the 3 wavelengths has a value shorter than 2 µm. The illustrative examples recognize and take into account that this small period makes the quasi phase matching waveguides more difficult to fabricate and to accurately control the duty factor for nonlinear optical processes involving wavelengths in the visible range of 0.4-0.7 µm and the near-infrared (NIR) to short-wave infrared (SWIR) range of 0.7-3 µm.

Further, the illustrative examples recognize and take into account that nonlinear optical waveguides can have cross-sectional structures that comprise the nonlinear optical material as the high-refractive-index core of the waveguide. Examples of a nonlinear optical material include lithium niobate, aluminum nitride, silicon carbide and gallium aluminum arsenide. The illustrative examples recognize and take into account that a nonlinear optical waveguide can have a nonlinear optical core surrounded by another material that has a lower refractive index and that acts as a waveguide cladding. Examples of this cladding material can include silicon dioxide or air. The illustrative examples recognize and take into account that these cladding materials do not have a desired level of nonlinear optical susceptibility.

The illustrative examples recognize and take into account that a nonlinear optical waveguide core region can have a slab of lithium niobate nonlinear optical material and a ridge of silicon nitride, located above the laterally continuous lithium niobate slab, which is then surrounded by the cladding materials. The illustrative examples recognize and take into account that this waveguide is used for a second order nonlinear optical process, but the silicon nitride does not have a desired level of nonlinear optical order susceptibility. Thus, the illustrative examples recognize and take into account that only the slab portion of this ridge waveguide comprises a nonlinear optical material.

The illustrative examples recognize and take into account that the optical-field overlap factor for waveguide designs is quite low when modal phase matching is used, especially when that phase matching involves certain higher-order transverse modes. For example, the optical-field overlap factor can be less than 0.2.

The illustrative examples recognize and take into account that for some nonlinear optical waveguides in which the pump light and the output light in the waveguide are both in the fundamental transverse mode, the nonlinear optical process involves birefringent phase matching and thus a much weaker nonlinear optical coefficient is used. Alternatively, the illustrative examples recognize and take into account that some nonlinear optical waveguides have rib-waveguide structures with a nonlinear optical slab and a nonlinear optical rib region above that laterally continuous slab. The illustrative examples recognize and take into account that these rib-waveguide structures can be used for quasi phase matching accomplished by periodic reversals of the material polarizability and involve pump and output light in the fundamental transverse mode. The fabrication of such periodic reversal in material polarizability can be more complicated than desired.

In the illustrative example, a direction-reversal enhancement of the coherent interaction approach implemented in directional phase matching waveguide structures can implement a quasi phase matching approach without needing to change the nonlinear optical material. As a result, the directional phase matching waveguide structure in the illustrative examples can be much easier to fabricate and can have lower loss as compared to other approaches for achieving quasi phase matching.

Furthermore, the period of the reversals in propagation direction of the directional phase matching (DPM) waveguide structure can be large in comparison to the wavelengths of the light. For example, a typical cycle length used for a directional phase matching waveguide structure ranges from 100 μm to 1,000 μm for light of wavelengths shorter than 2 μm. Thus, the period and the duty factor of this periodic change in waveguide propagation direction can be controlled precisely, relative to the optical wavelength. In comparison, many common fabrication processes can achieve control that is better than 0.01 μm in the waveguide transverse dimensions and the lengths of the waveguide sections. The illustrative examples recognize and take into account that to obtain a given desired value for the phase walk-off after completing one full cycle through a closed-loop ring or racetrack waveguide, or one full zig-zag cycle of a serpentine waveguide, a directional phase matching waveguide structure can make use of a higher-order transverse mode for the shortest wavelength light involved in the nonlinear optical process. A higher-order transverse mode has a smaller effective refractive index.

The illustrative examples recognize and take into account that modal phase matching allows the 3 wavelengths of the second order nonlinear optical process to be farther apart. The cross-section of the nonlinear optical waveguide structure in this illustrative example has a combination of a central region comprising a nonlinear optical material that is located between two side regions comprising materials that have weak nonlinear optical susceptibility, as compared to the nonlinear optical susceptibility of the material in the central region. Thus, compared to the current waveguide structures for modal phase matching, the nonlinear optical waveguide structure in this illustrative example can achieve much larger net overlap of the optical fields with the nonlinear optical material.

In the illustrative example, placing the nonlinear optical material at the center of the waveguide structure allows the maximum optical fields for the 3 wavelengths to overlap the nonlinear optical material when the optical field of the wave-guided light at a first wavelength of these 3 wavelengths has 3 peaks separated by 2 zeros, with the sign of the central peak being opposite from the sign of the two outer peaks. The cross-sectional structure of the waveguide in this illustrative example has 3 regions, and places these 3 regions laterally side-by-side of each other, with the region of nonlinear material located at the center. The central region is aligned with the central peak of the optical field of the light at the first wavelength and the two side regions are aligned with the two outer peaks of that optical field.

One illustrative example comprises an apparatus that comprises multiple parts and performs specific functions. In the illustrative example, the combination of parts together with the functions they perform can increase performance as compared to current techniques.

In the illustrative example, a system can include nonlinear optical frequency conversion for which a change in the sign of the nonlinear optical coefficient is aligned with a walk-off of $\pi$ radians (or, equivalently, 180 degrees) in the phase match associated with that nonlinear optical process. This phase walk-off is defined with respect to the specific wavelengths or frequencies of the light involved in the nonlinear optical process.

Thus, the illustrative embodiments provide an optical waveguide structure that comprises a nonlinear optical waveguide comprising a nonlinear optical material having a second order nonlinear coefficient that changes with a direction of light propagation. A light propagating through a first portion of the nonlinear optical waveguide is affected by a positive value of a second order nonlinear coefficient. A light propagating through a second portion of the nonlinear optical waveguide is affected by a negative value of a second order nonlinear coefficient, wherein a set of dimensions in the nonlinear optical waveguide in the first portion and the second portion is selected to cause the light to have a relative phase walk-off occurring at a location in the first waveguide portion and a location in the second waveguide portion that is an odd multiple of 180 degrees.

With reference now to the figures and, in particular, with reference to FIG. 1, an illustration of a block diagram of an optical waveguide structure is depicted in accordance with an illustrative embodiment. In this illustrative example, optical waveguide structure 100 comprises nonlinear optical waveguide 102 that comprises nonlinear optical material 104. In the illustrative example, nonlinear optical waveguide 102 can operate as directional phase matching (DPM) optical waveguide structure 166. In this example, directional phase matching (DPM) optical waveguide structure 166 can also be referred to as a direction-reversal enhancement of a coherent interaction (DRECI) waveguide structure.

Nonlinear optical waveguide 102 can have a shape that is selected from one of a closed path, an open path, a ring, a circular ring, an elliptical ring, a racetrack, a square, a rectangle path, a serpentine path, a zig-zag path, or some other suitable shape.

In this illustrative example, nonlinear optical material 104 has second order nonlinear coefficient 108 that changes with direction of light propagation 110.

In this illustrative example, the value of second order nonlinear coefficient 108 depends on the direction of electric-field vectors of the light, typically with respect to the crystallographic orientation of nonlinear optical material 104. In this example, second order nonlinear coefficient 108 is determined from second order nonlinear susceptibility 150. Second order nonlinear susceptibility 150 can be a dimensionless proportionality constant $\chi^{(2)}_{ijk}$ that indicates a degree of polarizability of a dielectric material. In this example, i, j, and k are the vector directions of the electric field components of a first light, second light, and third light involved in a second order nonlinear optical process. In this particular example, the first light, the second light, and the third light refer to a pump light, a signal light, and an idler light, but not necessarily in any particular order. For example, the first light can also refer to a signal light.

Nonlinear polarization can occur in nonlinear optical material 104 in which the material polarization no longer varies linearly with the electric field amplitude for the light wave which is an electromagnetic field. In other words, both an electric field and a magnetic field are present. This nonlinear relationship can be expressed as follows:

$$P = \chi^{(1)}E + \chi^{(2)}EE + \chi^{(3)}EEE + \ldots$$

where E is the electric field, $\chi^{(1)}$ is the linear optical susceptibility, $\chi^{(2)}$ is the second-order nonlinear optical susceptibility, etc. The nonlinear susceptibilities, $\chi^{(2)}$ and $\chi^{(3)}$, represent the nonlinear parts of the material dipolar characteristics.

In this example, the electric field amplitude is the electric field amplitude of the light wave, which is an electromagnetic field. An electromagnetic field has a traveling (or propagating) electric field and a traveling (or propagating) magnetic field.

In this example, second order nonlinear susceptibility 150 represents a nonlinear part of the dipolar characteristics for nonlinear optical material 104.

As depicted, nonlinear optical waveguide 102 has first portion 112 and second portion 114. Light 116 propagating in first direction 168 in direction of light propagation 110 through first portion 112 of nonlinear optical waveguide 102 can have first sign 152 of second order nonlinear coefficient 108 for nonlinear optical interaction 171 of light 116 with nonlinear optical material 104. In this example, first sign 152 of second order nonlinear coefficient 108 is second order nonlinear coefficient 108 with positive value 118. In other words, light 116 propagating through first portion 112 in first direction 168 can be affected by positive value 118 of second order nonlinear coefficient 108.

In this illustrative example, nonlinear optical waveguide 102 has second portion 114. Light 116 propagating in second direction 170 in direction of light propagation 110 through second portion 114 of nonlinear optical waveguide 102 can have second sign 154 of second order nonlinear coefficient 108 for nonlinear optical interaction 171 of light 116 with nonlinear optical material 104. In this example, second sign 154 of second order nonlinear coefficient 108 is second order nonlinear coefficient 108 with negative value 120. In other words, light 116 propagating through second portion 114 is affected by negative value 120 of second order nonlinear coefficient 108.

In this example, second sign 154 is negative when first sign 152 is positive and second sign 154 is positive when first sign 152 is negative. Also, in this example, second direction 170 is a direction that is opposite of first direction 168.

As depicted, a set of dimensions 122 in nonlinear optical waveguide 102 in first portion 112 and second portion 114 can be selected to cause light 116 to have phase walk-off 124 that is an odd multiple 126 of 180 degrees or π radians. In this illustrative example, nonlinear optical interaction 171 occurring in first portion 112 of nonlinear optical waveguide 102 can produce light 116 that has phase walk-off 124 that is odd multiple 126 of 180 degrees for nonlinear optical interaction 171 occurring in second portion 114 of nonlinear optical waveguide 102.

In this illustrative example, nonlinear optical interaction 171 is a type of nonlinear optical interaction that can occur at multiple locations. For example, nonlinear optical interaction 171 can occur at first location 172 in first portion 112 of nonlinear optical waveguide 102, and nonlinear optical interaction 171 can occur at second location 174 in second portion 114 of nonlinear optical waveguide 102.

Additionally, phase walk-off 124 at second location 174 can be for previously generated light in light 116 generated at first location 172, traveling to second location 174, and affecting the generation of light 116 at second location 174. Phase walk-off 124 can be between previously generated light in nonlinear optical waveguide 102 and newly generated light in nonlinear optical waveguide 102. Phase walk-off 124 can have odd multiple 126 of 180 degrees that occurs with a change in a sign of second order nonlinear coefficient 108. Also, successive sign changes occur in alignment with corresponding successive increments of odd multiples of 180 degrees in phase walk-off 124.

In illustrative example, phase walk-off 124 has odd multiple 126 of 180 degrees in which odd multiple 126 of 180 degrees can occur at a location where a change in a sign of second order nonlinear coefficient 108 occurs. In the illustrative example, the location where phase walk-off 124 reaches 180 degrees can be about the same location where second order nonlinear coefficient 108 changes its sign. In the illustrative example, it can be desirable for second order nonlinear coefficient 108 to have a different sign where phase walk-off 124 is between 180 degrees and 360 degrees. With this situation, the change in sign due to phase walk-off 124 can be compensated by the change in the sign of second order nonlinear coefficient 108, resulting in a higher level of light generation than would occur if second order nonlinear coefficient 108 does not have a change in its sign. In other words, the sign of second order nonlinear coefficient 108 changes. In this example, second order nonlinear coefficient 108 has one sign where the value of the phase walk-off is between 0 and 180 degrees. Second order nonlinear coefficient 108 has an opposite sign where the value of the phase walk-off is between 180 and 360 degrees.

In the illustrative example, phase walk-off 124 has odd multiple 126 of 180 degrees in which odd multiple 126 of 180 degrees is aligned with a change in the sign of second order nonlinear coefficient 108. In this example, a change in the sign of a nonlinear optical interaction associated with phase walk-off 124 and a change in the sign of second order nonlinear coefficient 108 can occur at the same location, as close as possible to the same location, or at a location that results in a constructive generation of light.

In this illustrative example, the design of nonlinear optical waveguide 102 is such that the desired generation of light 116 occurs in second order nonlinear coefficient 108. In the illustrative example, it can be desirable to have the location where phase walk-off 124 reaches 180 degrees to be about the same place where the sign of second order nonlinear coefficient 108 changes. Further, it is desirable for second order nonlinear coefficient 108 to have a first sign where phase walk-off 124 is between 0 degrees and 180 degrees and to have a second sign, opposite from the first sign, where phase walk-off 124 is between 180 degrees and 360 degrees. In this manner, the change in sign due to phase walk-off 124 can be compensated by the change in sign of second order nonlinear coefficient 108.

In another illustrative example, nonlinear optical waveguide 102 can be designed such that wherein a peak in magnitude 180 of second order nonlinear coefficient 108 is aligned with phase walk-off 124 having a value of odd multiple 126 of 90 degrees. This type of alignment can also increase the generation of light in nonlinear optical waveguide 102. In one illustrative example, the alignment of a peak in magnitude 180 of second order nonlinear coefficient 108 with phase walk-off 124 for value of odd multiple 126 of π/2 radians can be within π/4 radians. In the illustrative example, the generation can also be produced at desired levels even without this alignment in some illustrative examples.

As depicted, light 116 can have a number of different components. Light 116 can include pump light 128, signal light 130, and idler light 132. In this illustrative example, pump light 128 has pump wavelength 134; signal light 130 has signal wavelength 136; and idler light 132 has idler wavelength 138. In other words, light 116 can propagate through nonlinear optical waveguide 102 as pump light 128 having pump wavelength 134; signal light 130 having signal wavelength 136; and idler light 132 having idler wavelength 138. In this example, pump light 128 can comprise one or more pump photons; signal light 130 can comprise one or more signal photons; and idler light 132 can comprise one or more idler photons.

In this example, a nonlinear optical interaction can occur between light 116 and nonlinear optical material 104 as light 116 propagates through nonlinear optical material 104. This nonlinear optical interaction can be one in which phase walk-off 124, associated with the phases of pump light 128, signal light 130, and idler light 132 traveling through a length of nonlinear optical waveguide 102 is odd multiple 126 of 180 degrees or π radians. In other words, phase walk-off 124 is with respect to the light generation at two different locations. Phase walk-off 124 also can be with respect to the phases of the pump, signal, or idler light present at two different locations in the illustrative example. For example, with spontaneous parametric down conversion, the phase of the pump light at each location determines the phases of the signal and idler light generated at that those locations.

Optical waveguide structure 100 can also include other components such as, for example, output optical waveguide 140 and input optical waveguide 139. Output optical waveguide 140 can comprise a set of materials 156 having second order nonlinear coefficient 158. In this depicted example, second order nonlinear coefficient 158 can be the same or different from second order nonlinear coefficient 108.

In this illustrative example, output optical waveguide 140 is configured to emit output light 142 as an output from nonlinear optical waveguide 102. In this example, output light 142 has output wavelength 144 that is different from pump light 128 at pump wavelength 134 input into nonlinear optical waveguide 102.

As depicted, a set of optical couplers 146 can be in a set of regions 147 of nonlinear optical waveguide 102 and output optical waveguide 140. As used herein, a "set of," when used with reference to items, means one or more items. For example, a "set of optical couplers 146" is one or more optical couplers.

In this illustrative example, the set of regions 147 comprises portions of 2 waveguides that are sufficiently close to each other to enable the transmission of light 116 from one optical waveguide to another optical waveguide. For example, optical coupler 149 in the set of optical couplers 146 can be in region 151 in the set of regions 147. In this example, region 151 can be a portion of nonlinear optical waveguide 102 and input optical waveguide 139 that are sufficiently close to each other such that input light 121 can be transmitted from input optical waveguide 139 to nonlinear optical waveguide 102. As another example, optical coupler 149 can be formed from portions of nonlinear optical waveguide 102 and output optical waveguide 140 that are sufficiently close to each other such that some or all of light 116 can be transmitted from nonlinear optical waveguide 102 to output optical waveguide 140 in which the output is output light 142.

In this depicted example, an optical coupler in the set of optical couplers 146 can be configured to couple light 116 at pump wavelength 134 from nonlinear optical waveguide 102 to output optical waveguide 140 and to couple light 116 at signal wavelength 136 and light 116 at idler wavelength 138 at a level with a desired level of transmission from nonlinear optical waveguide 102 to output optical waveguide 140.

In this illustrative example, input optical waveguide 139 comprises a set of materials 160 having second order nonlinear coefficient 162. Second order nonlinear coefficient 162 can be the same or different from second order nonlinear coefficient 158 and second order nonlinear coefficient 108.

Input optical waveguide 139 can provide input light 121 having input wavelength 123 to nonlinear optical waveguide 102. For example, input light 121 can be pump light 128 at pump wavelength 134. As depicted, input optical waveguide 139 can be coupled to nonlinear optical waveguide 102 by a set of optical couplers 146. An optical coupler in the set of optical couplers 146 can be configured to couple light 116 at pump wavelength 134 from input optical waveguide 139 to nonlinear optical waveguide 102 and couple light 116 at pump wavelength 134 at a desired level of intensity or power from input optical waveguide 139 to nonlinear optical waveguide 102.

In some illustrative examples, optical waveguide structure 100 can also include a set of phase shifters 164. The set of phase shifters 164 can apply activations 165 to nonlinear optical waveguide 102. The set of phase shifters 164 can be selected from at least one of a tuning electrode, a thermal element, shape memory alloy element, Piezo electric element, or some other element that can emit energy to change the phase of a light particular wavelength propagating through an optical waveguide such as nonlinear optical waveguide 102.

The set of activations 165 can take a number of different forms. For example, the set of activations 165 can be selected from at least one of a voltage, a current, a thermal energy, an electrically induced strain, or some other type of energy that can be applied to an optical waveguide to affect the manner in which light propagates through the optical waveguide. In particular, the energy can be used to affect the phase of a light of the particular wavelength propagating through an optical waveguide such as nonlinear optical waveguide 102.

For example, the set of phase shifters 164 can be located adjacent to nonlinear optical waveguide 102. Phase shifters 164 can be configured as groups of phase shifters 164 in which the phase shifters can be implemented using tuning electrodes. In this example, the tuning electrode comprise positive tuning electrodes and negative tuning electrodes forming one more groups of tuning electrodes for phase shifters 164.

In one illustrative example, phase shifters 164 can comprise a first set of phase shifters 164 located adjacent to first portion 112 of nonlinear optical waveguide 102 and a second set of phase shifters 164 located adjacent to second portion 114 of nonlinear optical waveguide 102. The first set of phase shifters 164 can be a first set tuning electrodes that can operate to apply activations such as a first voltage and the second set of phase shifters 164 can be a second set of tuning electrodes can operate to apply activations such as a second voltage.

In this example, the first voltage and the second voltage can be selected such that phases shift in the wavelengths of at least one of pump light 128, signal light 130, or idler light 132 in nonlinear optical waveguide 102 occur in a manner such that a value of phase walk-off 124 changes.

As depicted, the configuration of nonlinear optical waveguide 102 can be selected to accomplish an increase in the efficiency in the generating of at least one of signal light 130 or idler light 132 within nonlinear optical waveguide 102. This configuration can include a selection of parameters selected from at least one of a number of portions, a set of dimensions 122 of the portions, a shape of nonlinear optical waveguide 102, nonlinear optical material 104, or other suitable parameters.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
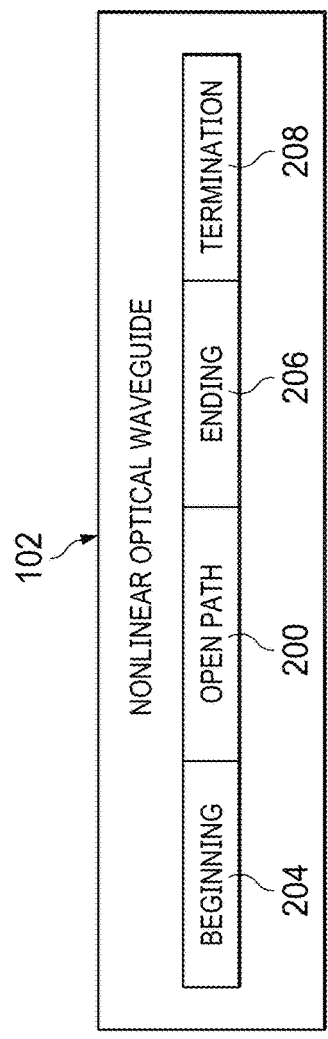
FIG. 2 is an illustration of a block diagram of an optical waveguide structure in accordance with an illustrative embodiment.

With reference next to FIG. 2, an illustration of a block diagram of an optical waveguide structure is depicted in accordance with an illustrative embodiment. In the illustrative examples, the same reference numeral may be used in more than one figure. This reuse of a reference numeral in different figures represents the same element in the different figures.

In this depicted example, nonlinear optical waveguide 102 has open path 200. As depicted, open path 200 has end locations in the form of beginning 204 and ending 206. In this illustrative example, open path 200 can have configurations selected from at least one of a serpentine path, a zig-zag path, a straight path, or some other type of open path.

In this illustrative example, open path 200 has ending 206 in nonlinear optical waveguide 102. In this example, termination 208 is located at ending 206. Examples of termination 208 include optical grating couplers, cleaved waveguide end faces, and etched waveguide end faces. Light can be coupled to and from terminations by mechanisms selected from at least one of an optical fiber, a free-space optical beam, or other suitable coupling mechanism. In other illustrative examples, termination 208 can be located in another nonlinear optical waveguide.

Figure 3:
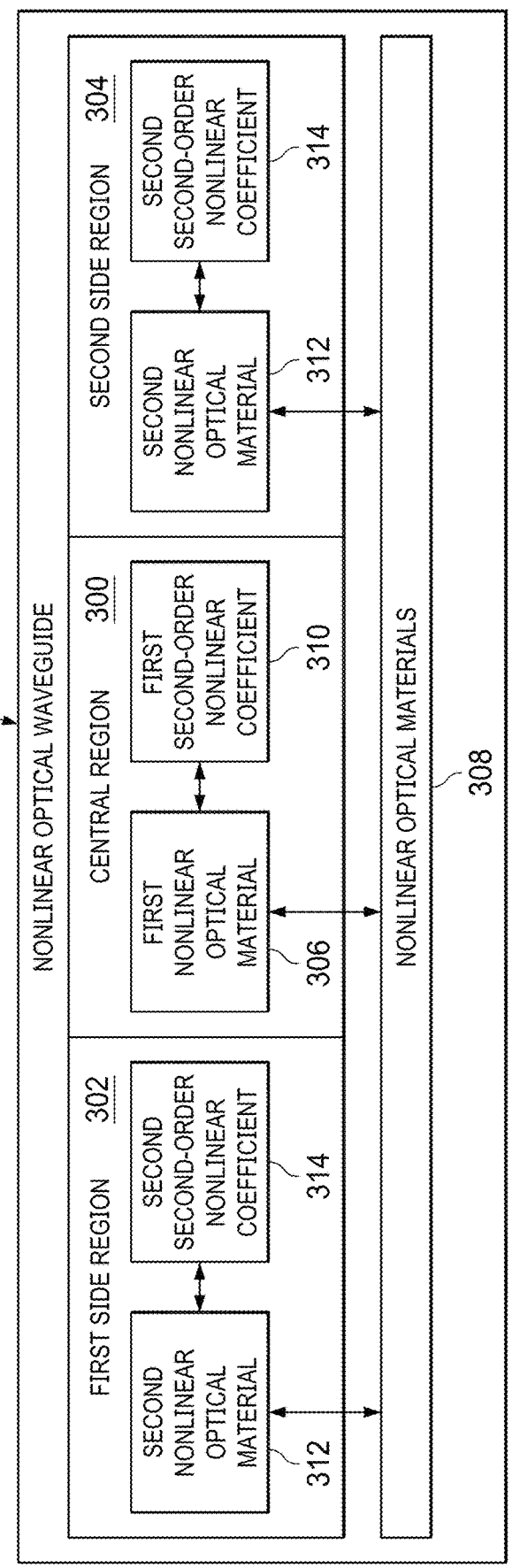
FIG. 3 is an illustration of a block diagram of a configuration for an optical waveguide structure in accordance with an illustrative embodiment.

With reference next to FIG. 3, an illustration of a block diagram of a configuration for an optical waveguide structure is depicted in accordance with an illustrative embodiment. As depicted in this example, nonlinear optical waveguide 102 has central region 300 and two side regions, first side region 302 and second side region 304, located on each side of central region 300.

In this illustrative example, central region 300 comprises first nonlinear optical material 306 in a set of nonlinear optical materials 308 that has first second-order nonlinear coefficient 310 with a magnitude that is at least one picometer/volt. The two side regions, first side region 302 and second side region 304, have second nonlinear optical material 312 in the set of nonlinear optical materials 308 that has second second-order nonlinear coefficient 314 whose magnitude is equal to or less than one tenth the magnitude of first second-order nonlinear coefficient 310 for first nonlinear optical material 306.

Figure 4:
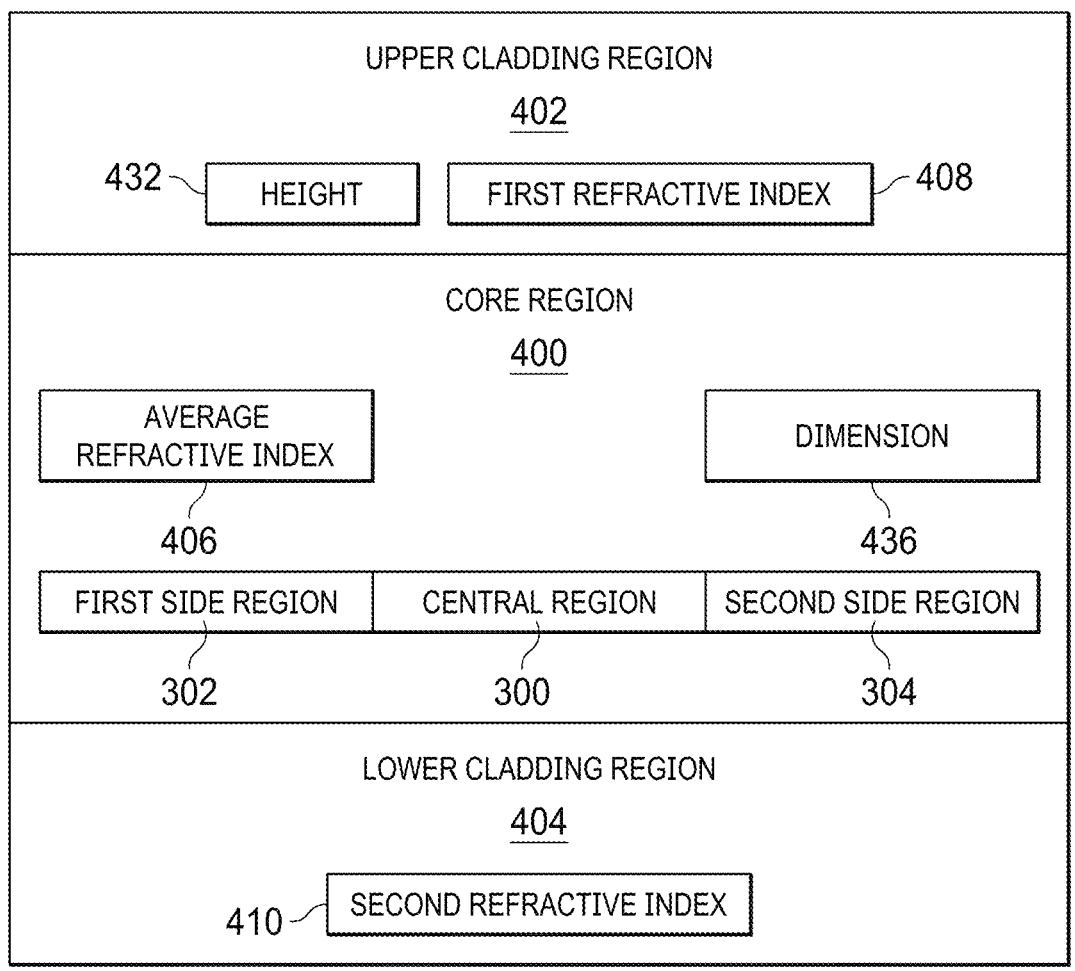
FIG. 4 is an illustration of a block diagram of a configuration for an optical waveguide structure in accordance with an illustrative embodiment.

Turning to FIG. 4, an illustration of a block diagram of a configuration for an optical waveguide structure is depicted in accordance with an illustrative embodiment. As depicted in this example, nonlinear optical waveguide 102 in FIG. 1-3 has core region 400, lower cladding region 404, and upper cladding region 402. As depicted, core region 400 is located between lower cladding region 404 and upper cladding region 402. In this depicted example, the terms "upper" and "lower" are used to indicate relative locations of components with respect to each other. In this example, "upper" and "lower" can be relative locations on a structure in a vertical position. In a cross-sectional configuration, upper and lower are relative vertical positions. Left side and right side are relative horizontal positions.

Core region 400 can comprise a single spatially-uniform material and have a single value of its refractive index for a given wavelength of light. Core region 400 also can comprise a spatially non-uniform material that is better described by a "net refractive index" whose value can be determined by the spatially varied refractive index distribution of that material. Core region 400 also can comprise an arrangement of multiple, different materials of different refractive indexes. In this case, a determination can be made for the "net refractive index" of that core region.

In this illustrative example, core region 400 can have a number of different configurations. For example, core region 400 can be implemented using central region 300 and side regions, first side region 302 and second side region 304.

In this illustrative example, core region 400 has average refractive index 406, and upper cladding region 402 has first refractive index 408 that is lower than average refractive index 406. As depicted, lower cladding region 404 has second refractive index 410 that is lower than average refractive index 406.

In another illustrative example, upper cladding region 402 has height 432 that can be selected to compensate for a variation of the phase walk-off in the nonlinear optical waveguide. In this illustrative example, upper cladding region 402 can have height 432 selected to compensate for a variation in dimension 436 in core region 400 which can be one cause in the variation of the phase walk-off in the nonlinear optical waveguide.

For example, height 432 for upper cladding region 402 can be adjusted during fabrication to compensate for a variation in dimension 436 for core region 400 from an as-designed value for dimension 436. In this illustrative example, dimension 436 can be, for example, a width or a height of core region 400, a width or height of central region 300, or a width or height of first side region 302 or second side region 304. As depicted, height 432 of upper cladding region 402 can be sufficiently small that adjustments of height 432 can affect the effective refractive indices of the nonlinear waveguide modes.

Figure 5:
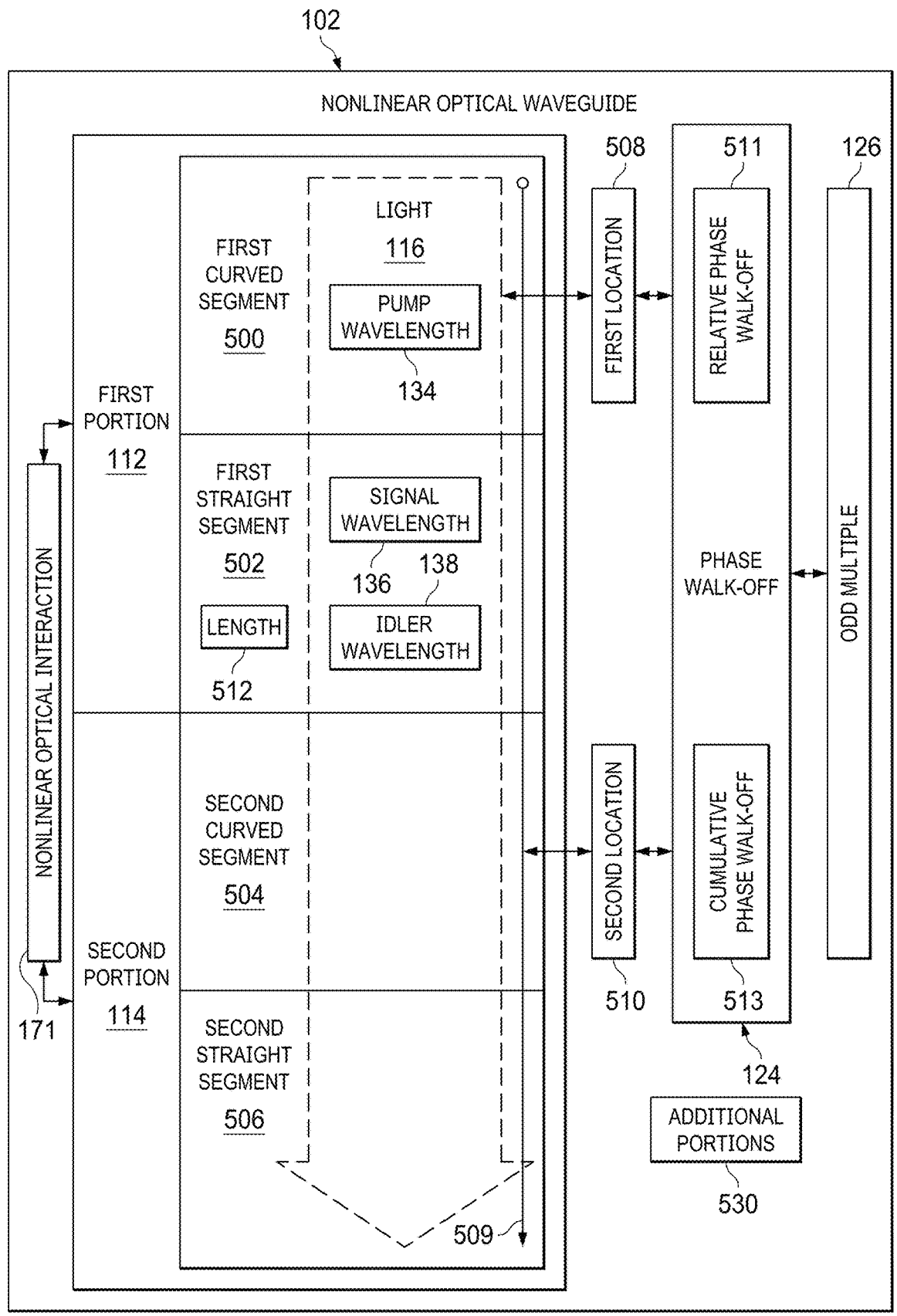
FIG. 5 is an illustration of a block diagram of another configuration for an optical waveguide structure in accordance with an illustrative embodiment.

With reference now to FIG. 5, an illustration of a block diagram of another configuration for an optical waveguide structure is depicted in accordance with an illustrative embodiment. This depicted example illustrates configurations for first portion 112 and second portion 114 in nonlinear optical waveguide 102.

As depicted, first portion 112 of nonlinear optical 102 has first curved segment 500 and first straight segment 502. These two segments can be a "zig" in first portion 112 in nonlinear optical waveguide 102. In this example, second portion 114 of nonlinear optical waveguide 102 has second curved segment 504 and second straight segment 506. These two segments can be a "zag" in second portion 114 in nonlinear optical waveguide 102.

With this configuration, wherein a nonlinear optical interaction in first curved segment 500 has phase walk-off 124 for light 116 between first location 172 and second location 174 along path 509 traveled by light 116 in nonlinear optical waveguide 102. In this example, phase walk-off 124 can be determined for a combination of pump wavelength 134, signal wavelength 136, and idler wavelength 138 between first location 172 and second location 174.

When phase walk-off 124 is determined considering just light 116 from first location 172 in first portion 112 within nonlinear optical waveguide 102 and light 116 at second location 174 in second portion 114 within nonlinear optical waveguide 102, phase walk-off 124 is relative phase walk-off 511. In this illustrative example, phase walk-off 124 for the nonlinear optical interaction 171 can be due to the accumulated phases of the pump light, signal light, and idler light occurring from travel of the pump light, signal light, and idler light between the two locations within nonlinear optical waveguide 102.

Phase walk-off 124 can be associated with light 116 in a portion of nonlinear optical waveguide 102 instead of with light 116 in the entire length of nonlinear optical waveguide 102. In this case, relative phase walk-off 511 is for the two endpoints of the portion of nonlinear optical waveguide 102 being considered. The two endpoints can be first location 508 and second location 510 within nonlinear optical waveguide 102.

When phase walk-off 124 occurs for light 116 from the beginning of nonlinear optical waveguide 102 and light 116 at another location in nonlinear optical waveguide 102 after the beginning of nonlinear optical waveguide 102, phase walk-off 124 is cumulative phase walk-off 513. In this illustrative example, cumulative phase walk-off 513 is relative phase walk-off 511 between light 116 from the start of nonlinear optical waveguide 102 and light 116 at the location within nonlinear optical waveguide 102 being considered. In other words, first location 508 is the start of nonlinear optical waveguide 102 and second location 510 is a location within nonlinear optical waveguide 102 at which cumulative phase walk-off 513 is measured or observed.

Characteristics of nonlinear optical waveguide 102 such that light 116 generated in first location 508 in a nonlinear optical interaction occurring in first portion 112 of nonlinear optical waveguide 102 propagates to second location 510 in second portion 114 of nonlinear optical waveguide 102 and has phase walk-off 124 for nonlinear optical interaction 171 occurring at second location 510 that is an odd multiple of 180 degrees.

In this example, phase walk-off 124 is for light 116 generated in nonlinear optical interaction 171 at first location 508 that then propagates to second location 510. In these illustrative examples, phase walk-off 124 is for the components of the light 116 that are present at second location 510. This phase walk-off is due to both the previously generated idler light that has propagated to second location 510 as well as pump light 128 and signal light 130 that also have propagated to second location 510.

In this depicted example, length 512 of first straight segment 502 can be selected such that phase walk-off 124 equals at least one of odd multiple 126 of 180 degrees or π radians. Although this example describes first portion 112 and second portion 114 as both having a curved segment and a straight segment, phase walk-off 124 can be determined for other first and second portions and other combinations of at least one of curved or straight segments. For example, first portion 112 and second portion 114 can be comprised of only curved segments in other illustrative examples. Phase walk-off 124 can be determined for first location 508 in a curved segment in first portion 112 and second location 510 in a curved segment in second portion 114.

The illustration of optical waveguide structure 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although two portions, first portion 112 and second portion 114, are shown in nonlinear optical waveguide 102, nonlinear optical waveguide 102 can include any number of additional portions 530 in which nonlinear optical material 104 is also present in the number of additional portions 530. As used herein, a "number of," when used with reference to items, means one or more items. For example, a "number of additional portions 530" is one or more additional portions.

As another example, the set of phase shifters 164 can apply activations 165 to other optical waveguides in addition to or in place of nonlinear optical waveguide 102. For example, the set of phase shifters can be used to apply activations 165 to at least one of input optical waveguide 139, output optical waveguide 140, optical couplers 146, or other optical waveguides or structures that may be used within optical waveguide structure 100.

In the illustrative examples, directional phase matching (DPM) optical waveguide structure 166 in FIG. 1 can receive input light of one or more frequencies or wavelengths (first wavelengths) and produce output light of one or more different frequencies or wavelengths (second wavelengths). These waveguide structures can comprise a nonlinear optical (NLO) material, such as lithium niobate. The optical-frequency conversion that produces the output light, of a different frequency from the input light, can be a result of the nonlinear optical interaction of the input light with the nonlinear optical material.

In the depicted example, the light propagating through the optical waveguide structure travels first in one direction (a first direction) and then travels in an opposite direction (a second direction) for which the light encounters a first sign of the nonlinear optical coefficient of the material when traveling in the first direction and encounters the opposite (second) sign of the nonlinear optical coefficient when traveling in the opposite direction. Also, the phase walk-off caused by a phase mismatch for the nonlinear optical process reaches 180 degrees (or π radians) at a location where the light reverses direction of propagation. A change in sign of the nonlinear optical coefficient counteracts the change in sign associated with the 180-degree phase walk-off.

In this illustrative example, the change in the sign of the nonlinear optical coefficient does not need to occur exactly at the same location as where the phase walk-off reaches 180 degrees. The illustrative embodiments recognize and take into account that it is desirable for the change in sign of the nonlinear optical coefficient to counteract the change in the sign associated with the phase walk-off having a value between 180 degrees and 360 degrees for most of the travel of light in the second direction.

When the phase walk-off reaches 360 degrees, the light reverses its direction of travel again, and thus encounters again the first sign of the nonlinear optical coefficient. The reversals in propagation direction and the reversals in the nonlinear optical interaction associated with the net phase walk-off continue in a periodic manner as the light travels in the waveguide. As a result of this direction-reversal enhancement of the coherent interaction (DRECI), the nonlinear optical process can continue to be a coherent interaction and continue to increase the amount of light at the second wavelengths, even though the accumulated phase walk-off has greatly exceeded 180 degrees and even has greatly exceeded 360 degrees.

This periodic reversal of the propagation direction for the light can be accomplished by constructing nonlinear optical waveguide 102 in FIGS. 1-3 and FIG. 5 in a configuration selected from one of a circular ring, an elliptical ring, a racetrack-shaped ring, a square or rectangular ring, a serpentine path, a zig-zag path, and other suitable configurations.

In an illustrative example, a second-order nonlinear optical effect is involved in the optical frequency conversion process. In the illustrative example, nonlinear optical waveguide 102 can comprise nonlinear optical material 104 having relatively large second order nonlinear optical susceptibility $\chi^{(2)}$ or second order nonlinear optical coefficient $d_{ij}$. For example, the values for second order nonlinear coefficient 108 of nonlinear optical material 104 can be at least 1 picometer/Volt.

In the illustrative example, nonlinear optical waveguide 102 can also comprise additional materials that have much smaller nonlinear optical susceptibility, or nonlinear optical coefficient, than the nonlinear optical susceptibility of the nonlinear optical material. For example, the values for the second order nonlinear optical coefficient of the additional materials can be no greater than one tenth the value for the second order nonlinear optical coefficient of nonlinear optical material 104. Nonlinear optical waveguide 102 functioning as directional phase matching (DPM) optical waveguide structure 166 can be located on a substrate.

In the illustrative example, second order nonlinear susceptibility 150 or second order nonlinear coefficient 108 of nonlinear optical material 104 in FIG. 1 can be largest for light 116 propagating in directional phase matching (DPM) optical waveguide structure 166 whose polarization is oriented parallel to the plane of the substrate. An example of nonlinear optical material 104 is x-cut lithium niobate. Examples of the additional materials include silicon nitride, silicon dioxide, titanium dioxide, aluminum oxide, and a polymer, such as bis-benzo-cyclo-butene and polyimide. Examples of the material of the substrate include lithium niobate, silicon carbide, quartz, alumina, and silicon.

In some illustrative examples, nonlinear optical waveguide 102 of optical waveguide structure 100 in FIG. 1 can have central region 300 in FIGS. 3-4 comprising nonlinear optical material 104 and two outer regions comprising one of the additional materials. These two outer regions are located at the two sides of central region 300 and can be, for example, first side region 302 and second side region 304 in FIGS. 3-4. As an illustrative example of this configuration, the nonlinear optical material of central region 300 can be x-cut lithium niobate and the additional material of the side regions, first side region 302 and second side region 304, can be silicon nitride.

Additionally, nonlinear optical waveguide 102 can further comprise lower cladding region 404 in FIG. 4 that is formed from silicon dioxide. This lower cladding region can be located on a silicon substrate. In some variations of this illustrative example, the nonlinear optical waveguide can also comprise upper cladding region 402 in FIG. 4 of silicon dioxide. In this illustrative example, air is above upper cladding region 402.

In the illustrative example, the second order nonlinear optical process in nonlinear optical waveguide 102 involves 3 wavelengths of light 116 that are different from each other, with that difference in the wavelengths being greater than 10% of the wavelength values. The wave-guided light of the shortest wavelength in light 116 propagates in a higher-order transverse mode that is, in particular, the $TE_{yz}=TE_{31}$ mode. In this example, y and z subscripts in $TE_{yz}$ indicate the optical field components parallel to the Y axis and the Z axis, respectively, of the x-cut lithium niobate crystal.

The optical field profile of this TE31 mode has a peak of one sign located near the center of the waveguide and two peaks of the opposite sign from the center peak that are located at the sides, with one of these opposite-sign peaks located at each side of the central peak. In the illustrative example, the optical field designates the electric field component E of an electromagnetic wave such as light.

In this illustrative example, the wave-guided light of the other two wavelengths in light 116 propagate in the fundamental transverse mode, i.e., the $TE_{yz}=TE_{11}$ mode, and have a single peak that is maximum near the center of the waveguide. The width of the central region of the waveguide can be selected such that a majority (>50% in one illustrative example and >80% in another illustrative example) of the central peak of the $TE_{31}$ optical-field profile overlaps the waveguide central region having the nonlinear optical material and also such that a minority (<50% in one illustrative example and <30% in another illustrative example) of the two side peaks of the $TE_{31}$ optical-field profile overlaps the waveguide central region having the nonlinear optical material.

Furthermore, in some illustrative examples, directional phase matching (DPM) optical waveguide structure 166 can also include optical waveguide components that comprise the additional materials and do not include a nonlinear optical material. The waveguide sections that do not comprise the nonlinear optical material can function as input optical waveguides and output optical waveguides that supply input light to the nonlinear optical waveguide, which contains the nonlinear optical material, or that selectively extract output light or input light from the nonlinear optical waveguide. The directional phase matching waveguide structure can also comprise wavelength-selective optical coupling regions between the nonlinear optical waveguide and the input and output optical waveguides.

In the depicted example, optical waveguide structure 100 can provide direction-reversal enhanced coherent interaction (DRECI) of the nonlinear optical process occurring in nonlinear optical waveguide 102. The second order nonlinear optical frequency conversion process facilitated by the direction-reversal enhanced coherent interaction waveguide structures can accomplish functions such as a second-harmonic generation (SHG), a difference frequency generation (DFG), a parametric down conversion (PDC), a spontaneous parametric down conversion (SPDC), a sum frequency generation (SFG), and a parametric up conversion (PUC).

Figure 6:
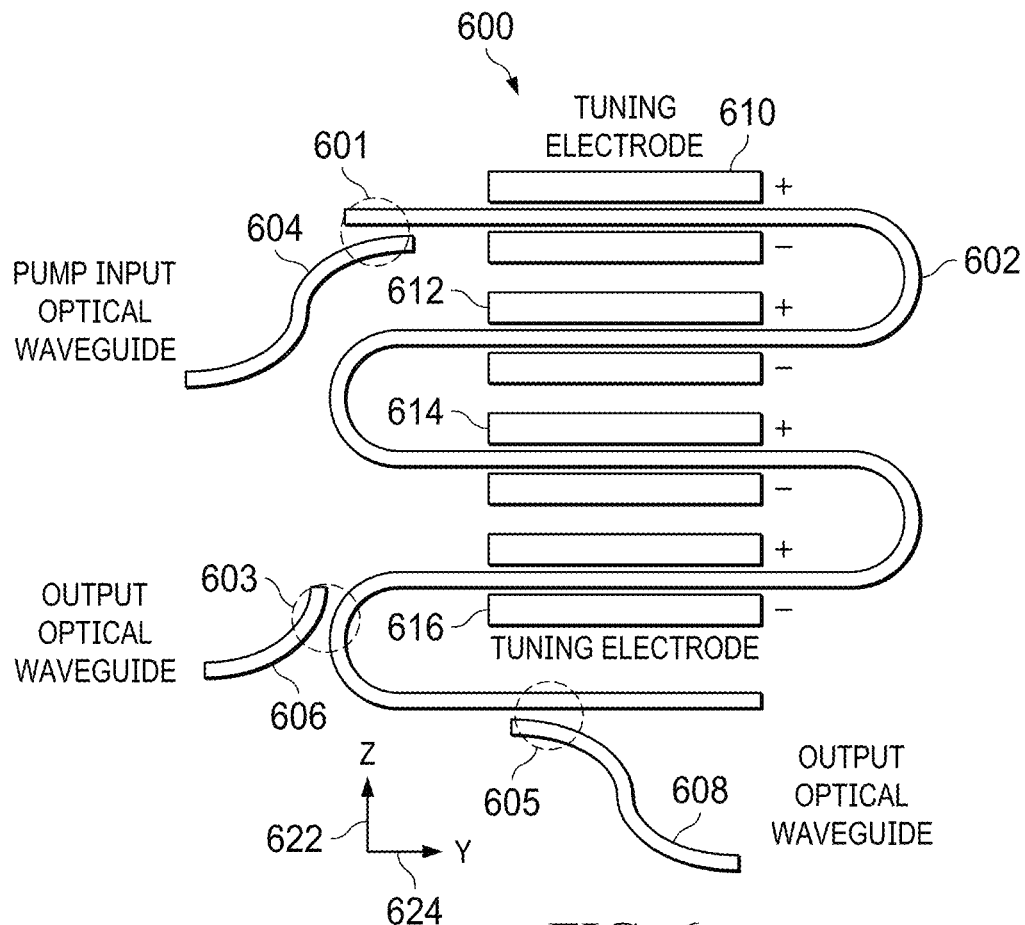
FIG. 6 is an illustration of an optical waveguide structure having nonlinear optical waveguide with a serpentine path that achieves direction-reversal enhanced coherent interaction (DRECI) in accordance with an illustrative embodiment.

Turning now to FIG. 6, an illustration of an optical waveguide structure having a nonlinear optical waveguide with a serpentine path that achieves direction-reversal enhanced coherent interaction (DRECI) is depicted in accordance with an illustrative embodiment. As depicted, optical waveguide structure 600 is an example of one implementation for optical waveguide structure 100 shown in block form in FIG. 1.

In this illustrative example, optical waveguide structure 600 comprises nonlinear optical waveguide 602 with a serpentine shape in which light travels in a serpentine path. Further, nonlinear optical waveguide 602 also includes pump input optical waveguide 604, output optical waveguide 606, and output optical waveguide 608. In this example, optical waveguide structure 600 also includes sets of phase shifters in the form of tuning electrodes. In the depicted example, the sets of tuning electrodes are tuning electrodes 610, tuning electrodes 612, tuning electrodes 614, and tuning electrodes 616.

As depicted, pump input optical waveguide 604 is depicted as a separate waveguide from nonlinear optical waveguide 602. In some illustrative examples, pump input optical waveguide 604 can be an extension of nonlinear optical waveguide 602. Further, optical waveguide structure 600 can also include additional input optical waveguides and output optical waveguides.

In the illustrative example, optical couplers can be used to couple light into and out of nonlinear optical waveguide 602. In this illustrative example, input optical coupler 601 couples light from pump input optical waveguide 604 to nonlinear optical waveguide 602; output optical coupler 603 couples light to output optical waveguide 606 from nonlinear optical waveguide 602; and output optical coupler 605 couples light to output optical waveguide 608 from nonlinear optical waveguide 602.

In this depicted example, the light travels in a zig-zag path within nonlinear optical waveguide 602. Further, the polarization of the light traveling through nonlinear optical waveguide 602 is aligned parallel to the yz plane of nonlinear optical waveguide 602, which is defined by z-axis 622 and y-axis 624.

The polarization of the light in nonlinear optical waveguide 602 is transverse to the direction of propagation of the light. In nonlinear optical waveguide 602, the optical-field polarization can be predominantly aligned parallel to the plane of the structure. For waveguides fabricated from a thin-film material such as thin-film lithium niobate, this optical-field polarization is considered to be transverse electric (TE) polarization.

In an illustrative example, the nonlinear optical waveguides can be fabricated from x-cut lithium niobate, such that the material X-axis is perpendicular to the plane of the structure. For lithium niobate, the strongest nonlinear optical coefficient is for light whose polarization is aligned parallel to the material Z-axis. The strongest nonlinear optical coefficient is the $d_{33}$ coefficient for lithium niobate. The nonlinear optical coefficient $d_{ijk}$ is equal to one half the second order nonlinear optical susceptibility $\chi^{(2)}_{ijk}$.

The $d_{33}$ nonlinear optical coefficient can be strongest when the light travels in the upper straight waveguide segment between the 11 o-clock position and the 1 o-clock position and again in the lower straight waveguide segment between the 5 o-clock position and the 7 o-clock position.

The sign of the nonlinear optical coefficient depends on the direction of propagation of the light with respect to the crystal +Z-axis. For example, the nonlinear optical coefficient has one sign for light traveling from the 11 o-clock position to the 1 o-clock position and has the opposite sign for light traveling from the 5 o-clock position to the 7 o-clock position along that serpentine path for nonlinear optical waveguide 602.

The optical field amplitude, or the amplitude of the electric-field component, of the light generated in a nonlinear optical waveguide can increase as the pump light (and the additional input light when that input light also is supplied) propagates in the nonlinear optical waveguide. In the illustrative examples, additional input light, when supplied, is an idler light and the nonlinear optical generated light is a signal light. An increase in the signal field amplitude, or the electric-field amplitude of the signal light, depends on the relative phases of the pump field (the electric field component of the pump light), the signal field (the electric field component of the signal light), and the idler field (the electric field component of the idler light).

In the illustrative example, the nonlinear optical process is a cumulative effect which also depends on interaction of the optical fields with each other and with the nonlinear optical material. Thus, the net nonlinear optical generation rate (and nonlinear optical generation efficiency) and, equivalently, the optical-frequency conversion efficiency can depend on the interaction between the photons present at a given location in the nonlinear optical waveguide and includes the photons generated at all of the locations between that given location and the start of the nonlinear optical waveguide.

The nonlinear optical interaction associated with photons for two different sets of locations (the given location "B" and a previous location "A") can depend on the relative phase walk-off for the photons at and/or generated at those two locations. The nonlinear optical process for generating a photon at the given location "B" is determined by the phase of the input pump photon (and also the phase of the input idler photon if an input idler photon is supplied) that has traveled to that given location "B". The nonlinear optical process for generating a photon at the given location "B" also is determined by the phase of the previously generated photon (idler photon and/or signal photon) that is determined by the phase of the input pump photon (and also the phase of the input idler photon if the input idler photon is supplied) that has traveled to previous location "A" plus the additional phase shift of the photon (the idler photon, the signal photon, or both) previously generated at location "A" that has traveled from location "A" to location "B".

The effect of this interaction can be described as follows:

$$\frac{dA_3}{dz} = \frac{2id_{eff}\omega_3^2}{k_3 c^2} A_1 A_2 e^{i\Delta kz} \quad (1)$$

where dz is an incremental distance along the path taken by the photons from location "A" to location "B", $d_{eff}$ is the nonlinear optical coefficient, $A_1$ is the first wavelength of the light (producing the generated light), $A_2$ is the second wavelength of the light (involved in the NLO generation process), $A_3$ is the third wavelength of light (which is of the generated light), $k_3$ is the wave vector for the light at the third wavelength, $\omega_3$ is the frequency of light at the third wavelength, c is the speed of light, and i is an index value. The factor $\Delta kz$ is the phase walk-off from some starting point to the point z on the path. As depicted, the phase is the product of the wave vector k and the distance traveled to reach point z.

In this example, phase walk-off affects the generation of light, and equation (1) describes the generation of light. This equation describes the generation of light over the incremental distance dz.

In this example, $\Delta k$ is the wave vector mismatch for the light generated at the location at point z. The phase walk-off incurred between two locations, location A and location B, is described by $\Delta kz$, which is the difference between the phase of newly generated light at location B and the phase of the light generated at A that travels to location B.

This expression describes the change in the amplitude of the optical field of the light at the third wavelength $A_3$ as generated by the nonlinear optical process occurring over an incremental distance dz. This generation depends on the amplitudes of the optical fields of the light at the first wavelength $A_1$ and at the second wavelength $A_2$. The generation also depends on the frequency of the light at the third wavelength $\omega_3$ (given as radians per second in this expression) and on the wave vector for the light at the third wavelength $k_3$. The generation also depends on the nonlinear optical coefficient $d_{eff}$. In this expression, the phase walk-off is given by $\Delta kz$ and has a sinusoidal variation with changes in the z location along the path.

The nonlinear optical generation that occurs at a given location, such as location "B", is the result of integrating the sinusoidal variation of the net phase walk-off from location "A" to location "B" where the overall distance between those two locations is L:

$$A_3(L) = \frac{\omega_3^2}{k_3 c^2} \int_A^B \frac{2id_{eff} A_1 A_2}{1} e^{i\Delta kz} dz \sim \frac{2id_{eff} \omega_3^2 A_1 A_2}{k_3 c^2} \left( \frac{e^{i\Delta kL} - 1}{i\Delta k} \right) \quad (2)$$

where dz is an incremental distance, $d_{eff}$ is the nonlinear optical coefficient, $A_1$ is the optical field amplitude at the first wavelength, $A_2$ is the optical field amplitude at the second wavelength, $A_3$ is the optical field amplitude at the third wavelength of light, $k_3$ is the wave vector for the light at the third wavelength, $\omega_3$ is the frequency of light at the third wavelength, c is the speed of light, i is an index value, L is a distance between the 2 locations, $\Delta k$ is the mismatch between the wave vectors for the light at the three wavelengths, and $\Delta kL$ is the accumulated phase walk-off affecting the nonlinear optical generation that occurs at the second location z=B assuming the nonlinear optical generation process begins at the first location z=A. In this example, the right-most expression in equation (2) assumes the various factors remain constant in the portion of a nonlinear optical waveguide between those two locations.

In some subsequent examples, the value for $\Delta k$ can change from one location to another location. Also, the value for $d_{eff}$ can change from one location to another.

The intensity of the generated light (such as the power of the generated signal photons traveling in the waveguide or exiting the waveguide) is related to the square of the optical field amplitude, such as described below. The intensity of an electromagnetic wave, such as light, is given by the magnitude of the time-averaged Poynting vector which for our definition of field amplitude is given by:

$$I_i = 2n_i \epsilon_0 c |A_i|^2, \, i = 1, 2, 3 \quad (3)$$

where $n_i$ is the refractive index of a wavelength of light, $A_i$ is the ith wavelength of light, $\epsilon_0$ is vacuum permittivity, and i is an index value.

The net refractive index of the waveguide for light of the first, second, or third wavelength is given by $n_i$ where i=1, 2, 3. In these expressions, the speed of light is designated by c and the vacuum permittivity is designated by $\epsilon_0$.

Thus, using equation (3) and right-most expression in equation (2), the intensity of the light at the third wavelength can be expressed as follows:

$$I_3 = \frac{8n_3 \epsilon_0 d_{eff}^2 \omega_3^4 |A_1|^2 |A_2|^2}{k_3^2 c^3} \left| \frac{e^{i\Delta kL} - 1}{\Delta k} \right|^2 \quad (4)$$

The squared modulus that appears in this equation can be expressed as:

$$\left| \frac{e^{i\Delta kL} - 1}{\Delta k} \right|^2 = L^2 \left( \frac{e^{i\Delta kL} - 1}{\Delta kL} \right) \left( \frac{e^{-i\Delta kL} - 1}{\Delta kL} \right) = 2L^2 \frac{(1 - \cos\Delta kL)}{(\Delta kL)^2} \quad (5)$$

Finally, the expression for 13 can be written in terms of the intensities of the incident fields by using equation (3) to express $|A_i|^2$ in terms of the intensities, yielding the result:

$$I_3 = \frac{8d_{eff}^2 \omega_3^2 I_1 I_2}{n_1 n_2 n_3 \epsilon_0 c^2} L^2 \left( \frac{\Delta kL}{2} \right) \quad (6)$$

Note that the effect of wave vector mismatch is included entirely in the factor $\text{sinc}^2(\Delta kL/2)$. This factor is also known as the phase mismatch factor.

The term $$L^2 \text{sinc}^2 \left( \frac{\Delta kL}{2} \right)$$

indicates that the phase mismatch limits the improvement in nonlinear optical generation efficiency (or generation rate) that can be achieved by increasing the overall length L of the nonlinear optical waveguide (assuming locations "A" and "B" are the start and end points of the nonlinear optical waveguide). This term has a maximum value of 1 when $\Delta kL = \pi$. A coherent interaction length or coherent interaction distance can be defined as the value for the distance or length L at which the phase walk-off (e.g., $\Delta kL$) equals n radians.

When the wave vector match is not perfect and thus the phase match is not perfect, an increasing walk-off can be present between the phases of the generated optical fields for longer distances of the nonlinear optical interaction. As a result, the net phase walk-off becomes larger and larger, and the nonlinear optical generation of the signal can be degraded. The accumulated phase walk-off is equal to the difference in the wave vectors, as given for each location, multiplied by the incremental distance traveled and integrated over an overall distance traveled, as indicated by the mathematical expressions above. In other words, the accumulated phase walk-off covers all portions of a path from the starting point on the path where the nonlinear optical interaction begins to occur to the location on the path where the accumulated phase walk-off is evaluated, while a relative phase walk-off covers the phase walk-off from between two locations on the path.

Figure 7:
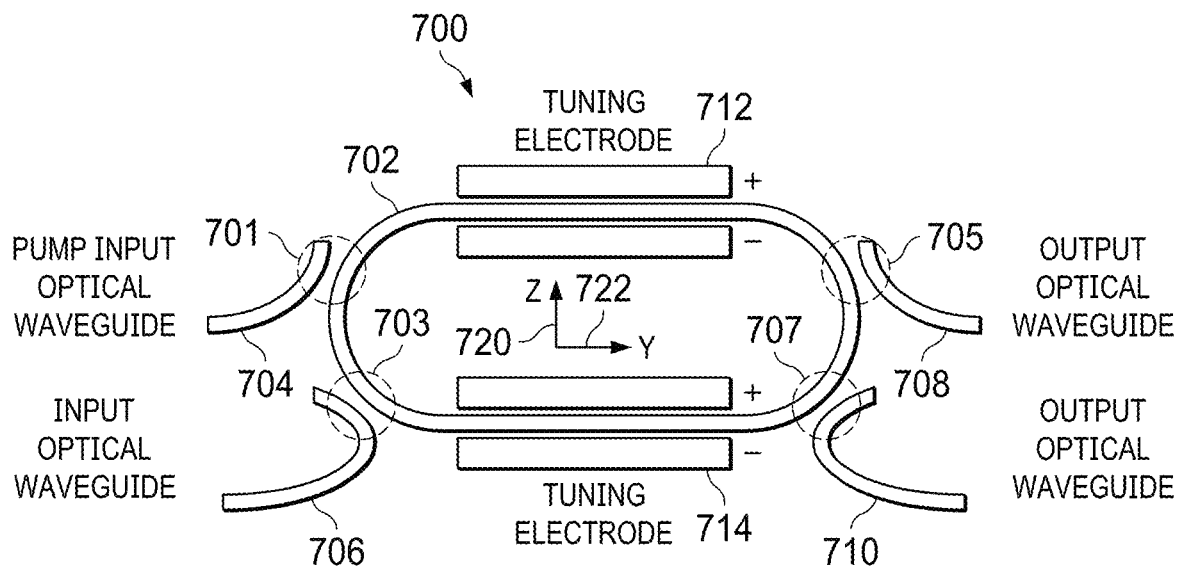
FIG. 7 is an illustration of an optical waveguide structure having nonlinear optical waveguide with a racetrack shape that achieves direction-reversal enhanced coherent interaction (DRECI) in accordance with an illustrative embodiment.

When the phase match is not perfect and as the lengths of the nonlinear optical waveguide increase, as well as for an increasing number of cycles of travel around a closed-loop nonlinear optical waveguide, such as nonlinear optical waveguide 702 in FIG. 7, the efficiency of the nonlinear optical generation process in these nonlinear optical waveguides decreases. This decrease in efficiency can occur because when the interaction length is greater than approximately the inverse of the net difference in the wave vectors of the generated signal light and the contributing pump light and the contributing idler light (for an example in which both the pump light and idler light are supplied as inputs), the output signal light can become out of phase with its driving polarization. In this example, the driving polarization can be determined by the phases of the pump light and the idler light. Thus, power can flow from the signal light back into the pump light and the idler light.

Essentially, the phases of the participating optical fields of the pump light, the signal light, and the idler light can contribute a factor to the nonlinear optical generation efficiency, whose sign can change. This change in sign can occur when the net phase walk-off equals a multiple of $\pi$, as indicated by the mathematical expressions above.

In this illustrative example, the sign associated with the phase mismatch can reverse each time the net phase walk-off equals a multiple of $\pi$ radians. In the illustrative example, a coherent interaction length or distance is defined as being the length of travel in the nonlinear optical waveguide at which the net phase walk-off equals $\pi$ radians.

For the directional phase matching (DPM) optical waveguide structure, the phase match can be such that the sign change associated with a phase mismatch (or wave vector mismatch) occurs when a reversal is present in the direction of propagation of the light that produces a reversal in the sign of the nonlinear optical coefficient. Thus, the sign change due to the phase mismatch can be counteracted by a sign change in the nonlinear optical coefficient. As a result, the efficiency of the nonlinear optical generation process can continue to increase as the overall interaction distance increases.

The accumulated nonlinear optical generation or the net generation rate or efficiency for a nonlinear optical process, such as a spontaneous parametric down conversion process in a directional phase matched waveguide structure, can build up with the interaction distance as a series of steps. The total number of steps that can occur before the nonlinear optical interaction loses its coherence and begins to decline can depend on the relative error between the net coherent interaction length and the physical distance traveled by the light between reversals in the sign of the nonlinear optical coefficient.

For the illustrative example in FIG. 6, the length of one "zig" through the serpentine path or the length of one "zag" through the serpentine path is equal to the coherent interaction length. The coherent interaction length can depend on the detailed structure of the waveguide, which then determines the effective refractive indices of the specific waveguided optical modes of the pump light, the signal light, and the idler light that participate in the nonlinear optical process. The coherent interaction length also can depend on the specific wavelengths of the pump light, the signal light, and the idler light.

As depicted, the directional phase matching optical waveguide structure also can have one or more sets of tuning electrodes, as depicted in FIG. 6. The waveguide sections that have these tuning electrodes function as voltage-controlled optical phase shifters and are examples of phase shifters 164 in FIG. 1. These tuning electrodes can tune the phases of the pump light, the signal light, and the idler light. If the pump optical field, the signal optical field, and the idler optical field have different amounts of overlap with the electro-optic material in these waveguide sections, these fields can receive different amounts of phase shift due to the applied voltage and the electric-field resulting from that applied voltage. Thus, the net phase walk-off can be changed by the voltage applied to each set of tuning electrodes.

Tuning electrodes can be used to increase the efficiency of nonlinear optical generation in nonlinear optical waveguide 602. For a nonlinear optical waveguide, such as nonlinear optical waveguide 602, formed in an anisotropic material such as x-cut lithium niobate, the electro-optic coefficient which affects the optical phase shift resulting from an applied electrical voltage can depend on a propagation direction of light. This behavior is similar to the behavior of the second order nonlinear coefficient in the illustrative examples.

The electro-optic coefficient also can have one sign for light traveling in one direction and an opposite sign for light traveling in an opposite direction. The voltage dependent phase shift is determined by both the sign of the electro-optic coefficient and the sign of the applied voltage. The voltage dependent phase shift is proportional to the arithmetic product (i.e., multiplication) of the electro-optic coefficient and the electric field resulting from the applied voltage.

In this example, nonlinear optical waveguide 602 is fabricated in x-cut lithium niobate. Light propagates in the yz plane of the lithium niobate material in nonlinear optical waveguide 602. Light propagating in the +Y direction experiences one sign of the electro-optic coefficient and light propagating in −Y direction experiences the opposite sign of the electro-optic coefficient.

The light propagating in the upper-most straight segment propagates in the +Y direction. The positive electrode is at the left side from the point-of-reference of the propagating light and the negative electrode is at the right side. The light propagating in the second from the upper-most straight segment propagates in the −Y direction. The positive electrode is at the right side from the point-of-reference of the propagating light and the negative electrode is at the left side. Thus, with this arrangement of the electrodes, the sign of the applied voltage and the sign of the resulting electric field for light propagating in the +Y direction is opposite from the sign of the applied voltage and the sign of the resulting electric field for light propagating in the −Y direction. As a result, the product of the electro-optic coefficient and the electric field has one sign for light propagating in the +Y direction and the same sign for light propagating in the −Y direction. Turning now to FIG. 7, an illustration of an optical waveguide structure having a nonlinear optical waveguide with a racetrack shape that achieves direction-reversal enhanced coherent interaction (DRECI) is depicted in accordance with an illustrative embodiment. As depicted, optical waveguide structure 700 is an example of one implementation for optical waveguide structure 100 shown in block form in FIG. 1.

In this illustrative example, optical waveguide structure 700 comprises nonlinear optical waveguide 702, which operates as a direction reversal enhanced coherent interaction waveguide structure. As depicted, nonlinear optical waveguide 702 has a closed path in the shape of a racetrack. As depicted, a nonlinear optical (NLO) frequency conversion process occurs in the racetrack shape of nonlinear optical waveguide 702. As depicted, nonlinear optical waveguide 702 lies on a zy plane, which is defined by z-axis 720 and y-axis 722.

In this illustrative example, optical waveguide structure 700 further comprises pump input optical waveguide 704 into which a pump light is supplied and through which the pump light is provided to nonlinear optical waveguide 702. Optical waveguide structure 700 can also include one or more additional inputs such as input optical waveguide 706.

Further, optical waveguide structure 700 can have a set of outputs. In this illustrative example, the outputs can be output optical waveguide 708 and output optical waveguide 710.

Additionally, optical waveguide structure 700 can also include input optical coupler 701, input optical coupler 703, output optical coupler 705, and output optical coupler 707. As depicted, input optical coupler 701 couples pump input optical waveguide 704 to nonlinear optical waveguide 702; input optical coupler 703 couples input optical waveguide 706 to nonlinear optical waveguide 702; output optical coupler 705 couples output optical waveguide 708 to nonlinear optical waveguide 702; and output optical coupler 707 couples output optical waveguide 710 to nonlinear optical waveguide 702.

In this illustrative example, the light travels in a clockwise path through nonlinear optical waveguide 702 in the optical waveguide structure 700 functioning as a direction-reversal enhancement of the coherent interaction waveguide structure. In the illustrative example, one half of the circumference of the racetrack-shaped loop in nonlinear optical waveguide 702 is equal to the coherent interaction length.

As depicted in FIG. 7, sets of phase shifters such as tuning electrodes 712 and tuning electrodes 714 can be present in optical waveguide structure 700. Each set of tuning electrodes operates to apply a voltage in a manner that causes phases to shift in the wavelengths of light moving within nonlinear optical waveguide 702. In other words, these sets of tuning electrodes can operate as voltage control optical phase shifters and are examples of phase shifters 164 in FIG. 1. In this manner, phase walk-off of light traveling within nonlinear optical waveguide 702 can be changed as desired.

In this depicted example, the nonlinear optical process that operates within nonlinear optical waveguide 702 converts photons of the pump light received by at least one of pump input optical waveguide 704 or input optical waveguide 706 into photons of an output light of a different optical frequency. This output light can be output by at least one of output optical waveguide 708 or output optical waveguide 710.

In this illustrative example, the number of additional input optical waveguides and output optical waveguides can depend on the specific nonlinear optical process being used and the application selected for the nonlinear optical frequency generation. For example, a spontaneous parametric down conversion (SPDC) process can use pump input optical waveguide 704 and one or two outputs, such as output optical waveguide 708 and output optical waveguide 710.

In this example, the pump photons, supplied through pump input optical waveguide 704, have a higher energy than the output photons. In this example, the higher energy means that the pump photons have a higher frequency and a shorter wavelength.

The use of one or two outputs for optical waveguide structure 700 can depend on whether the spontaneous parametric down conversion process is phase matched to produce frequency degenerate output in which both output photons resulting from an input pump photon have the same frequency or frequency non-degenerate outputs in which the frequencies of the two output photons produced from an input pump photon are very different from each other. For the case of two outputs comprising photons with different frequencies, some illustrative examples can separate the photons of the two frequencies into two output optical waveguides, such as output optical waveguide 708 and output optical waveguide 710, for optical waveguide structure 700.

As another example, a parametric down conversion (PDC), a parametric up conversion (PUC), a difference frequency generation (DFG), or a sum frequency generation (SFG) process can be implemented with a direction-reversal enhanced coherent interaction waveguide structure, such as optical waveguide structure 700, that has inputs for the pump light, such as pump input optical waveguide 704 and input optical waveguide 706.

For difference frequency generation (DFG), the nonlinear optical process operating in nonlinear optical waveguide 702 produces an output photon whose optical frequency is the difference between the optical frequencies of the pump photon received through pump input optical waveguide 704 and the additional input photon received through input optical waveguide 706.

For sum frequency generation (SFG), the nonlinear optical process in nonlinear optical waveguide 702 produces an output photon whose optical frequency is a sum of the optical frequencies of the pump photon and the additional input photon. The output photons can be extracted from output optical waveguide 708.

Whether the process is considered a down-conversion process or an up-conversion process can depend on whether the parametric input photon has a higher or lower energy than the output photon resulting from the nonlinear optical frequency conversion.

Second harmonic generation (SHG) can be considered a specific case of sum frequency generation. In this case, the pump photon received by pump input optical waveguide 704 and the additional input photon received by input optical waveguide 706 have the same optical frequency. Both of the input photons can be supplied through pump input optical waveguide 704. In this illustrative example, the output photons produced by second harmonic generation have twice the optical frequency of the input photons. These output photons can be extracted through an output optical waveguide, such as output optical waveguide 708 or output optical waveguide 710.

The effectiveness of a nonlinear optical generation process, such as the power in the idler light generated by a spontaneous parametric down conversion for a given pump power, can depend on several factors such as the magnitude of the nonlinear optical coefficient, the degree of phase matching, and the physical interaction length. The effectiveness of a nonlinear optical generation process also can depend on the cross-sectional area of the wave-guided light because the nonlinear optical generation process depends on the pump intensity. Further, the effectiveness of the nonlinear optical generation process depends on the net overlap of the pump, signal, and idler optical fields with the nonlinear optical material in a cross-section of the nonlinear optical waveguide.

Figure 8:
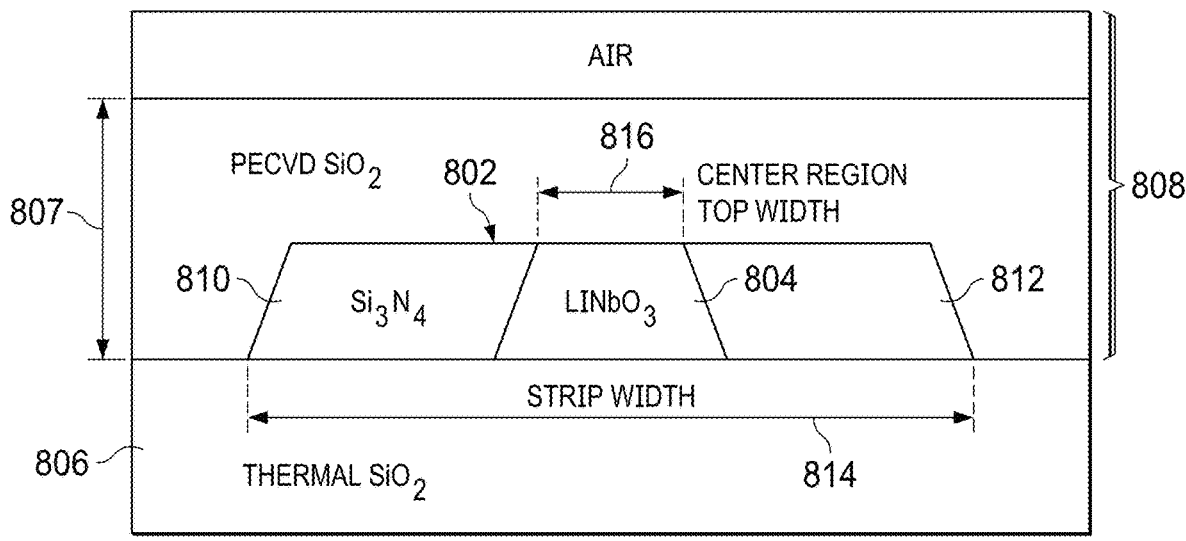
FIG. 8 is an illustration of the cross-sectional view of a nonlinear optical waveguide in an optical waveguide structure in accordance with an illustrative embodiment.

With reference now to FIG. 8, an illustration of a cross-sectional view of a nonlinear optical waveguide in an optical waveguide structure is depicted in accordance with an illustrative embodiment. Nonlinear optical waveguide 800 is an example of an implementation for nonlinear optical waveguide 102 shown in block form in FIG. 1 and in FIG. 4. In this illustrative example, nonlinear optical waveguide 800 has core region 802. In this illustrative example, core region 802 comprises a nonlinear optical material, such as x-cut lithium niobate (LiNbO3). As depicted, nonlinear optical waveguide 800 also has cladding regions. Nonlinear optical waveguide 800 has lower cladding 806 and upper cladding 808. In this example, lower cladding 806 is comprised of silicon oxide. In this depicted example, the cladding regions can comprise silicon dioxide region and air. As depicted, a first portion of upper cladding 808 is comprised of silicon dioxide and a second portion of upper cladding 808 is comprised of air. In this example, silicon oxide in upper cladding 808 has upper cladding height 807. In this illustrative example, upper cladding 808 can be comprised of silicon dioxide, air, or a combination of silicon dioxide and air.

Further, nonlinear optical waveguide 800 can have side regions on either side of central region 804 within core region 802. As depicted, these two side regions are located laterally adjacent to central region 804. In this illustrative example, the side regions include side region 810 and side region 812, which are comprised of silicon nitride ($Si_3N_4$).

As depicted, nonlinear optical waveguide 800 has strip width 814. Additionally, central region 804 in nonlinear optical waveguide 800 has center region top width 816.

In this illustrative example, silicon nitride can be a suitable material for side region 810 and side region 812 because silicon nitride has a minimal second order optical nonlinearity and the refractive index of silicon nitride is slightly smaller than the refractive index of lithium niobate, the nonlinear optical material used in central region 804. In this depicted example, the refractive index of silicon nitride can be less than 10% smaller than the refractive index of lithium niobate.

As depicted, nonlinear optical waveguide 800 can be especially suitable for modal phase matching in which the shortest wavelength of the light involved in the nonlinear optical process is in the $TE_{xy}=TE_{31}$ mode (or in the $TM_{xy}=TM_{31}$ mode). For this nomenclature, the x-axis of the cross-section is in the horizontal direction and the y-axis of the cross-section is in the vertical direction. These axes are reference directions in a cross-sectional depiction and are not necessarily the same as the X, Y, and Z axes of a lithium niobate crystal. For a spontaneous parametric down conversion nonlinear optical process, a pump light has the shortest wavelength (highest energy) and is in the $TE_{31}$ mode.

Figure 9:
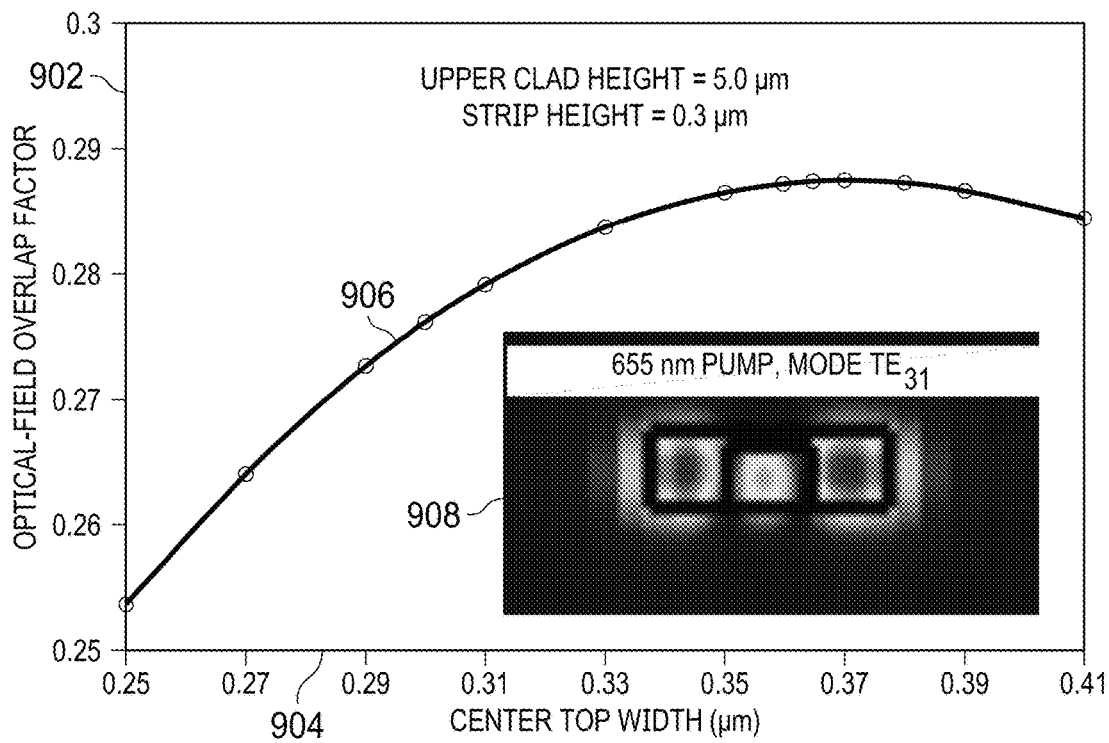
FIG. 9 is an illustration of a graph of an optical field overlap factor as a function of central region top width in accordance with an illustrative embodiment.

FIGS. 9-13 are graphs illustrating characteristics of nonlinear optical waveguide 800 in FIG. 8. With reference next to FIG. 9, an illustration of a graph of an optical field overlap factor as a function of a central region top width is depicted in accordance with an illustrative embodiment. In this illustrative example, graph 900 illustrates an optical field overlap factor as a function of center top width 816 for central region 804 in nonlinear optical waveguide 800 in FIG. 8. As depicted, y-axis 902 represents optical field overlap factor, and x-axis 904 represents center region top width 816 for central region 804 in micrometers.

In this illustrative example, line 906 illustrates values for the optical field overlap factor as center region top width 816 increases. In this example, upper clad height 807 for the $SiO_2$ portion of upper cladding 808 in FIG. 8 is 0.5 micrometers and is comprised of air. The strip height for central region 804 in FIG. 8 is 0.3 micrometers.

As depicted, line 906 shows that the optical field overlap factor can be optimized by selecting the width of the central region. The optical field profile of the $TE_{31}$ mode has a central peak of one sign and two side peaks of the opposite sign, as illustrated in section 908 in graph 900. In one illustrative example, a design goal can include maximizing the overlap of the central peak of the optical field profile and minimizing the overlap of the side peaks of that optical field profile with the nonlinear optical central region of the waveguide.

Figure 10:
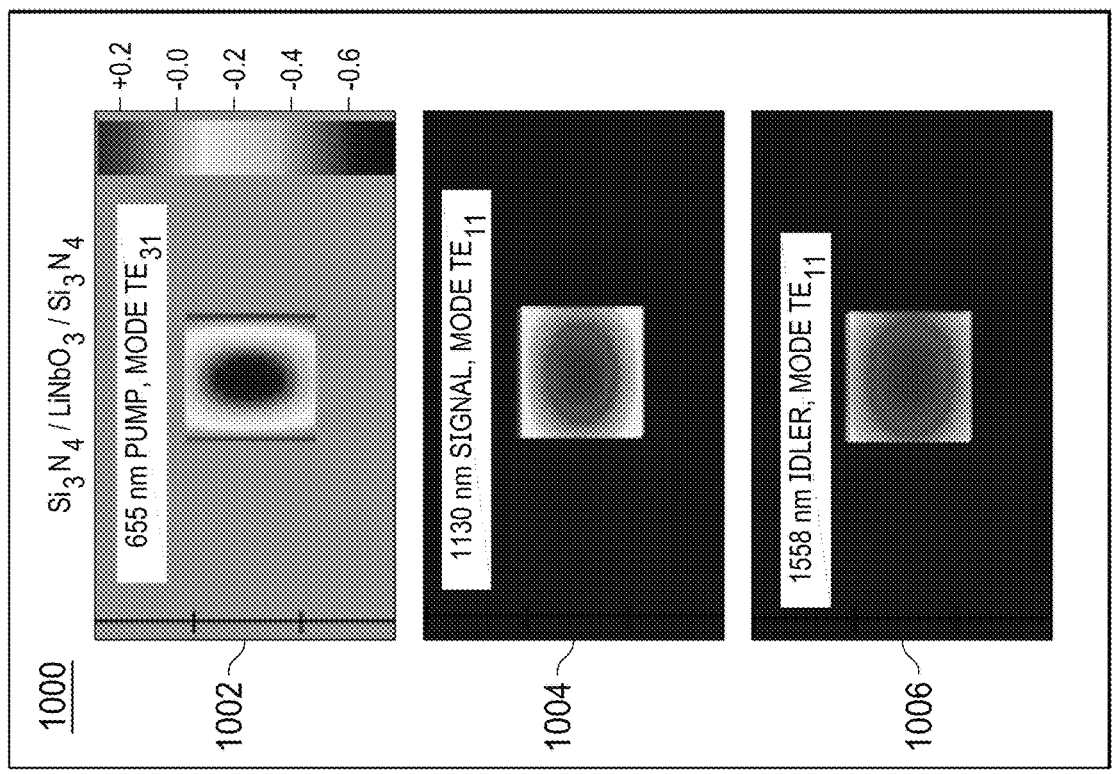
FIG. 10 is an illustration of optical field profiles that overlap a nonlinear optical material in a nonlinear optical waveguide in accordance with an illustrative embodiment.

Turning now to FIG. 10, an illustration of field profiles that overlap a nonlinear optical material in a nonlinear optical waveguide is depicted in accordance with an illustrative embodiment. In this illustrative example, optical field profiles 1000 are field profiles for a nonlinear optical waveguide, such as nonlinear optical waveguide 800 in FIG. 8.

As depicted, optical field profiles 1000 are illustrated for pump mode 1002, signal mode 1004, and idler mode 1006 that overlap nonlinear material in nonlinear optical waveguide 800 in FIG. 8. In this illustrative example, the pump light is in the $TE_{31}$ mode and the signal light and the idler light are in the $TE_{11}$ (or fundamental) mode. As depicted, optical field profiles 1000 depict side peaks of the pump optical field in pump mode 1002 having only minimal overlap with the nonlinear optical material. In this depicted example, substantial portions of the peaks of the signal field in signal mode 1004 and the idler field in idler mode 1006 overlap the nonlinear optical material.

Figure 11:
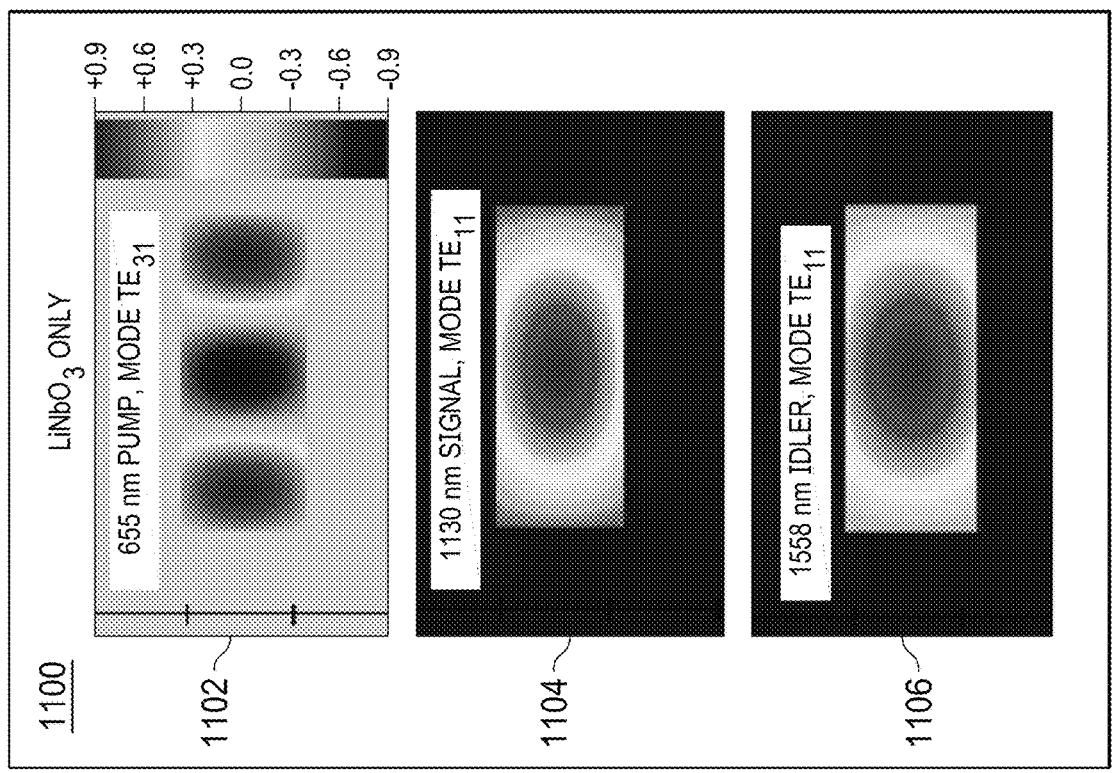
FIG. 11 is an illustration of optical field profiles that overlap a nonlinear optical material in a nonlinear optical waveguide in accordance with an illustrative embodiment.

In comparison, FIG. 11 is an illustration of optical field profiles that overlap a nonlinear optical material in a nonlinear optical waveguide depicted in accordance with an illustrative embodiment. As depicted, optical field profiles 1100 are illustrated for pump mode 1102, signal mode 1104, and idler mode 1106 that overlap the nonlinear material in the nonlinear optical waveguide that does not have side regions such as those depicted for nonlinear optical waveguide 800 in FIG. 8.

The side peaks of the $TE_{31}$ mode for the pump light in pump mode 1102 substantially overlap the nonlinear optical material and the contribution of those side peaks can partially cancel out the contribution of the central peak to the nonlinear optical frequency conversion. For example, an optical field overlap factor for nonlinear optical waveguide 800 in FIG. 8 can be larger than 0.33 (33%). This value for the optical field overlap factor is nearly twice as large as the best optical field overlap factor that can be achieved with nonlinear optical waveguides that do not have side regions for the same set of pump, signal, and idler wavelengths.

With reference next to FIG. 12, an illustration of a graph of a net coherent interaction length, obtained for one round trip, for different configurations of nonlinear optical waveguides is depicted in accordance with an illustrative embodiment. In this illustrative example, graph 1200 illustrates net coherent interaction length as a function of strip width.

In graph 1200, y-axis 1202 represents the net coherent interaction length in millimeters, and x-axis 1204 represents strip width in micrometers. The lines in graph 1200 illustrate that net coherent interaction length for various configurations of nonlinear optical waveguides.

As depicted, the lines in section 1206 depict net coherent interaction lengths for nonlinear optical waveguides with a spatially uniform core region rather than a core region that comprises a central region and two side regions, such as depicted in FIG. 8. In section 1206, line 1220 is for a nonlinear optical waveguide a spatially uniform lithium niobate core region and an upper cladding height of 0.45 µm, and line 1222 is for a nonlinear optical waveguide with a spatially uniform lithium niobate core region and an upper cladding height of 0.50 µm. In the illustrative example, the upper cladding height is the height for a first portion of the upper cladding. This upper cladding height corresponds to upper cladding height 807 for upper cladding 808 in FIG. 8. In the depicted example, air is above the upper cladding.

In this illustrative example, the lines in section 1208 show net coherent interaction lengths for nonlinear optical waveguides that include side regions, such as the waveguide depicted in FIG. 8. In section 1208, line 1224 is for nonlinear optical waveguide 800 in FIG. 8 with lithium niobate center region and silicon nitride side regions, a center region width of 0.3 µm, and an upper cladding height of 0.47 µm, and line 1226 is for nonlinear optical waveguide 800 in FIG. 8 with lithium niobate center region and silicon nitride side regions, a center region width of 0.3 µm, and an upper cladding height of 0.46 µm.

Turning now to FIG. 13, an illustration of a graph of an optical field overlap factor for different configurations of nonlinear optical waveguides is depicted in accordance with an illustrative embodiment. In this illustrative example, graph 1300 illustrates an optical field overlap factor as a function of strip width. In this example, y-axis 1302 represents the optical field overlap factor, and x-axis 1304 represents strip width in micrometers. The lines in graph 1300 illustrate values of the optical field overlap factor obtained for various configurations of nonlinear optical waveguides.

As depicted, the lines in section 1306 depict optical field overlap factors for nonlinear optical waveguides that have a spatially uniform lithium niobate core region. In section 1306, line 1352 is for a waveguide with a spatially uniform lithium niobate core region and an upper cladding height of 0.50 µm, and line 1354 is for a waveguide with a spatially uniform lithium niobate core region and an upper cladding height of 0.45 µm.

In this illustrative example, the lines in section 1308 illustrate optical field overlap factors for nonlinear optical waveguides whose core region comprises a central region and two side regions, such as the nonlinear optical waveguide 800 in FIG. 8 with lithium niobate center region and silicon nitride side regions. In section 1308, line 1356 is for a waveguide such as nonlinear optical waveguide 800 in FIG. 8 with a center region width of 0.3 µm, and an upper cladding height of 0.46 µm; and line 1358 is for nonlinear optical waveguide 800 in FIG. 8 with lithium niobate center region and silicon nitride side regions, a center region width of 0.3 µm, and an upper cladding height of 0.47 µm.

In some illustrative examples, one or more input optical waveguides and one or more output optical waveguides for an optical waveguide structure can be implemented in a material that has negligible or weak nonlinear optical susceptibility as compared to nonlinear optical material used in the nonlinear optical waveguide. For example, an optical waveguide structure whose nonlinear optical waveguide contains lithium niobate as a nonlinear optical material can have input and output optical waveguides with silicon nitride ($Si_3N_4$) or titanium dioxide ($TiO_2$) as the waveguide-core material of those input and output optical waveguides. The higher refractive-index core region of the input and output optical waveguides can be surrounded by lower refractive-index cladding that comprises a material such as silicon dioxide or air.

In the mathematical expression describing nonlinear optical generation and generation efficiency such as expressions (1) through (6) discussed above, the contribution of the optical field overlap factor can be included in the value used for the effective nonlinear optical coefficient $d_{eff}$.

Figure 14:
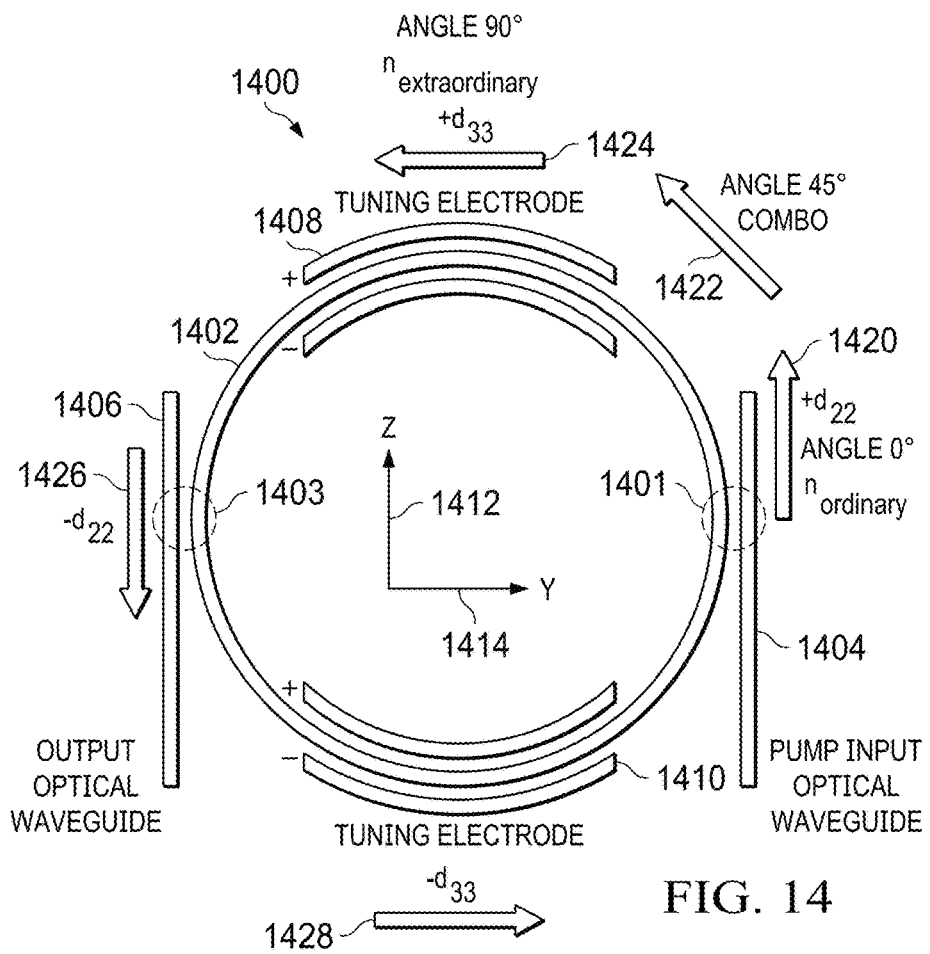
FIG. 14 is an illustration of an optical waveguide structure having a nonlinear optical waveguide with a shape of a circular ring that achieves a direction-reversal enhanced coherent interaction in accordance with an illustrative embodiment.

With reference next to FIG. 14, an illustration of an optical waveguide structure having a nonlinear optical waveguide with a shape of a circular ring that achieves a direction-reversal enhanced coherent interaction is depicted in accordance with an illustrative embodiment. As depicted, optical waveguide structure 1400 is an example of one implementation for optical waveguide structure 100 shown in block form in FIG. 1. The circular ring can be thought of as a simpler version of a racetrack shaped ring for which the length of the straight segments in the racetrack is zero.

In this illustrative example, optical waveguide structure 1400 comprises circular ring nonlinear optical waveguide 1402 which is a nonlinear optical waveguide in which light travels in a closed path that is in the shape of a circular ring. Further, optical waveguide structure 1400 also includes pump input optical waveguide 1404 and output optical waveguide 1406. As depicted in this illustrative example, optical waveguide structure 1400 also includes optical coupler 1401 and optical coupler 1403. Optical coupler 1401 couples light into circular ring nonlinear optical waveguide 1402 from pump input optical waveguide 1404. Optical coupler 1403 couples light from circular ring nonlinear optical waveguide 1402 to output optical waveguide 1406. In this depicted example, optical waveguide structure 1400 also includes sets of phase shifters such as tuning electrodes 1408 and tuning electrodes 1410.

As depicted, circular ring nonlinear optical waveguide 1402 has a shape of a circular ring that provides a closed circular path. In this illustrative example, circular ring nonlinear optical waveguide 1402 has zy plane as defined by z-axis 1412 and y-axis 1414.

In this example, a pump light, a signal light, and an idler light travel within circular ring nonlinear optical waveguide 1402 in a counter-clockwise direction. The propagation angle can be defined relative to z-axis 1412.

In one illustrative example, circular ring nonlinear optical waveguide 1402 can be implemented in x-cut lithium niobate. With this example, z-axis 1412 in the positive direction can correspond to the +Z crystallographic direction of the lithium niobate material.

The direction of travel and the propagation angles for light traveling in a counter-clockwise direction within circular ring nonlinear optical waveguide 1402 are illustrated by arrow 1420, arrow 1422, arrow 1424, arrow 1426, and arrow 1428. A propagation angle of zero degrees for arrow 1420 corresponds to travel along the +Z-axis of the lithium niobate material. TE polarized light at this propagation angle for arrow 1420 can experience the +$d_{22}$ nonlinear optical coefficient. A propagation angle of 90 degrees for arrow 1424 corresponds to travel along the minus Y-axis of the x-cut lithium niobate material. TE polarized light at this propagation angle for arrow 1424 can experience the +$d_{33}$ nonlinear optical coefficient.

In this depicted example, TE polarized light at a propagation angle of 180 degrees for arrow 1426 can travel along the −Z-axis of the x-cut lithium niobate material and can experience the −$d_{22}$ nonlinear optical coefficient. In a similar fashion, TE polarized light at a propagation angle of 270 degrees for arrow 1428 can travel along the +Y axis of the x-cut lithium niobate material and can experience the −$d_{33}$ nonlinear optical coefficient.

Light traveling around the ring at an intermediate propagation angle θ, such as 45 degrees for arrow 1422, can experience a combination of the $d_{33}$, $d_{31}$, and $d_{22}$ nonlinear optical coefficients. For example, the propagation-angle dependent nonlinear optical coefficient deff can be described by the expression:

$$d_{eff} = +d_{22}\cos^3\theta + 3d_{31}\cos^2\theta\sin\theta + d_{33}\sin^3\theta$$

TE polarized light propagating at different angles also can experience different values of the material refractive index. For the x-cut lithium niobate material, the material refractive index varies between the extra-ordinary index experienced by light traveling at propagation angles of 90 degrees and 270 degrees to the ordinary index experienced by light traveling at propagation angles of 0 degrees and 180 degrees.

Figure 15:
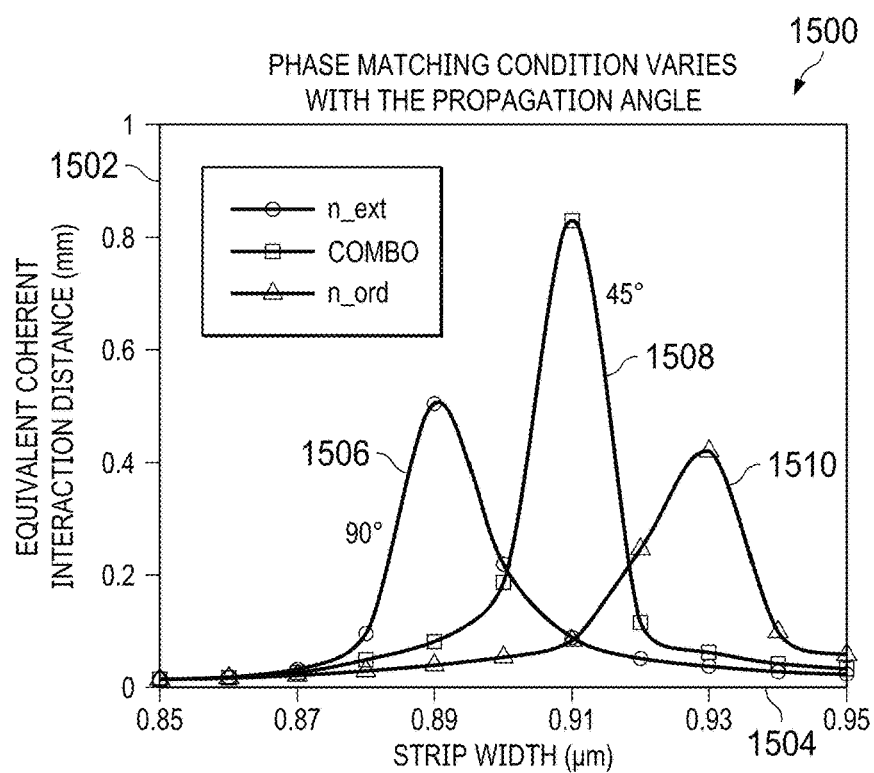
FIG. 15 is an illustration of a graph of phase matching conditions that vary with a propagation angle in accordance with an illustrative embodiment.

Turning next to FIG. 15, an illustration of a graph of phase matching conditions that vary with a propagation angle is depicted in accordance with an illustrative embodiment. In this depicted example, graph 1500 illustrates the coherent interaction distance obtained at different propagation angles around circular ring nonlinear optical waveguide 1402 in FIG. 14 and the dependence on the strip width of circular ring nonlinear optical waveguide 1402 in FIG. 14. As depicted, y-axis 1502 is the equivalent coherent interaction distance in millimeters, and x-axis 1504 is strip width in micrometers.

In graph 1500, phase matching conditions vary with propagation angle around the circular path of the nonlinear optical waveguide. In this illustrative example, line 1510 shows the equivalent coherent interaction distance for light propagating in the +Z direction in a nonlinear optical waveguide having the cross-section of circular ring nonlinear optical waveguide 1402 in FIG. 14. For propagation in this direction, which is equivalent to an angle of 0-degrees relative to the +Z axis, the light of the three wavelengths experience the ordinary refractive index, n_ord, of lithium niobate. Line 1506 shows the equivalent coherent interaction distance for light propagating in the −Y direction in a nonlinear optical waveguide having the cross-section of circular ring nonlinear optical waveguide 1402 in FIG. 14. For propagation in this direction, which is equivalent to an angle of 90-degrees relative to the +Z axis, the light of the three wavelengths experience the extra-ordinary refractive index, n_ext, of lithium niobate. Line 1508 shows the equivalent coherent interaction distance for light propagating in a direction equivalent to a 45-degree angle relative to the +Z axis, as depicted in FIG. 14. For propagation in this direction, the light of the three wavelengths experience a combination of the ordinary index and the extra-ordinary index of lithium niobate. Other materials in the waveguide structure such as silicon nitride and silicon dioxide are isotropic and the refractive index of those materials do not change with the direction of propagation of the light.

With the varying material refractive index, the equivalent coherent interaction distance that is obtained for a given value of the waveguide width can be different if the light were traveling in a straight waveguide at the angles of 0 degrees, 45 degrees, or 90 degrees, relative to the +Z axis of the x-cut lithium niobate.

The coherent interaction distance obtained for a given waveguide cross-section design can vary with the propagation angle, as illustrated in graph 1500. When the coherent interaction distance is longer, the additional phase walk-off contributed at that propagation angle is smaller. Conversely, when the coherent interaction distance is shorter, the additional phase walk-off is greater.

With reference now to FIGS. 16-21, illustrations of graphs illustrating a nonlinear optical coefficient, an accumulated phase walk-off, a nonlinear optical generation, and an accumulated nonlinear optical generation at different accumulated propagation angles around a nonlinear optical waveguide having a shape of a circular ring are depicted in accordance with illustrative embodiments. In this example, the circular ring nonlinear optical waveguide can be, for example, circular ring nonlinear optical waveguide 1402 in FIG. 14.

Figure 16:
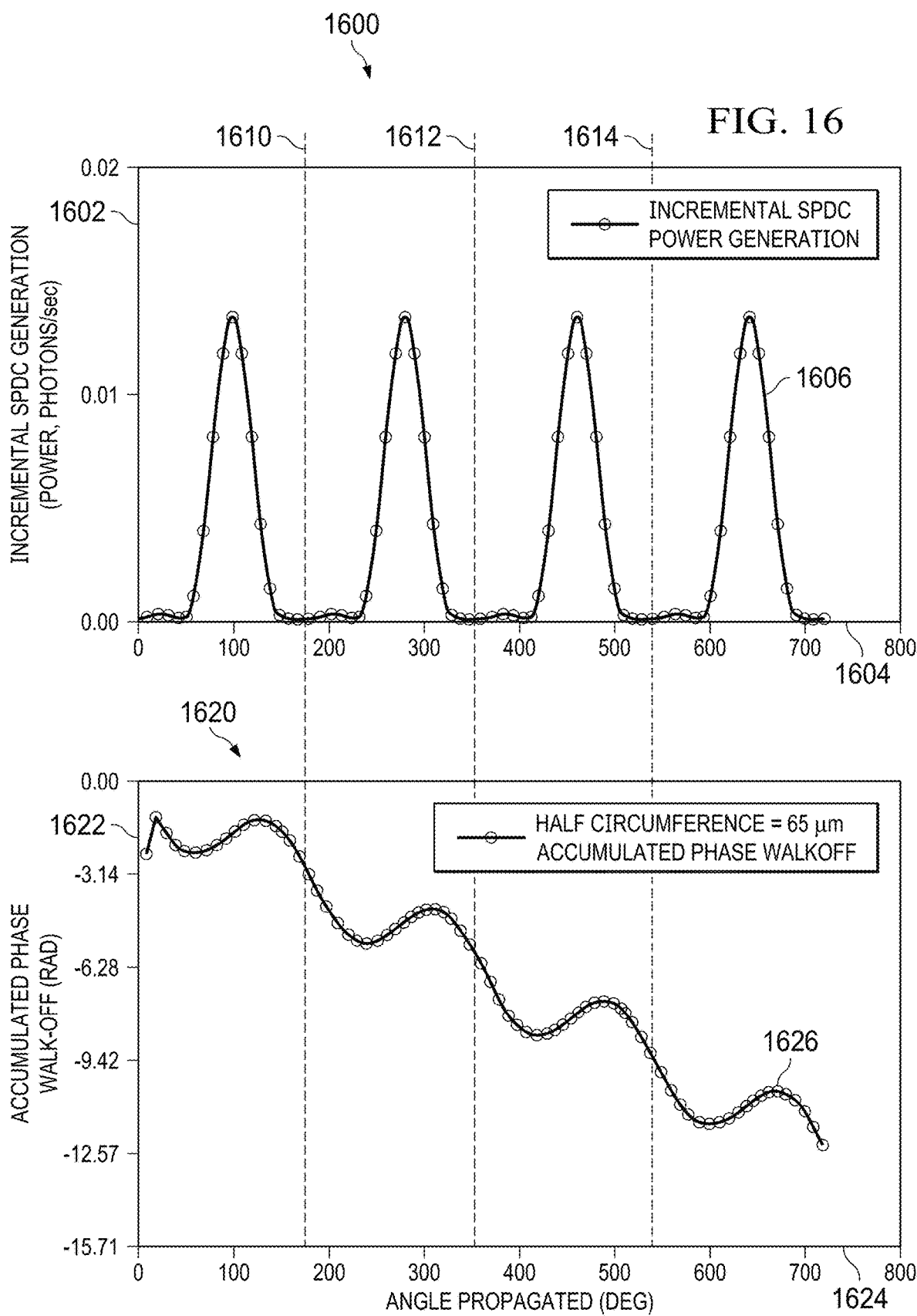
FIG. 16 is an illustration of graphs illustrating incremental spontaneous parametric down conversion (SPDC) generation rate relative to an accumulated phase walk-off in accordance with an illustrative embodiment.

In FIG. 16, illustrations of graphs illustrating the incremental generation by spontaneous parametric down conversion (SPDC) relative to an accumulated phase walk-off are depicted in accordance with an illustrative embodiment. As depicted, graph 1600 illustrates incremental photon generation rate or generated power from spontaneous parametric down (conversion (SPDC).

In this illustrative example, y-axis 1602 is a normalized incremental spontaneous parametric down (SPDC) generation in power or photons/sec, and x-axis 1604 is an angle propagated in degrees in graph 1600. Line 1606 in graph 1600 represents incremental spontaneous parametric down conversion (SPDC) generation as light travels within a circular ring nonlinear optical waveguide.

As illustrated, graph 1620 shows accumulated phase walk-off in accordance with an illustrative embodiment. In this illustrative example, y-axis 1622 is accumulated phase walk-off in radians, and x-axis 1624 is an angle propagated in degrees. Line 1626 in graph 1620 represents accumulated phase walk-off as light travels within circular ring nonlinear optical waveguide 1402 in FIG. 14.

In anisotropic material such as the x-cut lithium niobate material, the refractive index of the material can vary with the direction of the light propagation. Since the material refractive index changes, the refractive index of the waveguided mode also can change with the propagation direction, and the propagation constant or wave vector also changes with the propagation direction. Thus, the propagation-constant mismatch or wave vector mismatch Δk also can change as the propagation direction changes. As a result, the accumulated phase walk-off exhibits a somewhat oscillatory behavior with respect to the angle propagated. In this depicted example, the propagation angles corresponding to successive half-cycles are indicated by line 1610, line 1612, and line 1614. The ring circumference of circular ring nonlinear optical waveguide 1402 in FIG. 14 can be set equal to twice the equivalent coherent interaction distance for a round trip around the ring.

In this depicted example, accumulated phase walk-off represented by line 1626 equals a multiple of π radians after every half-cycle of travel around circular ring nonlinear optical waveguide 1402.

Figure 17:
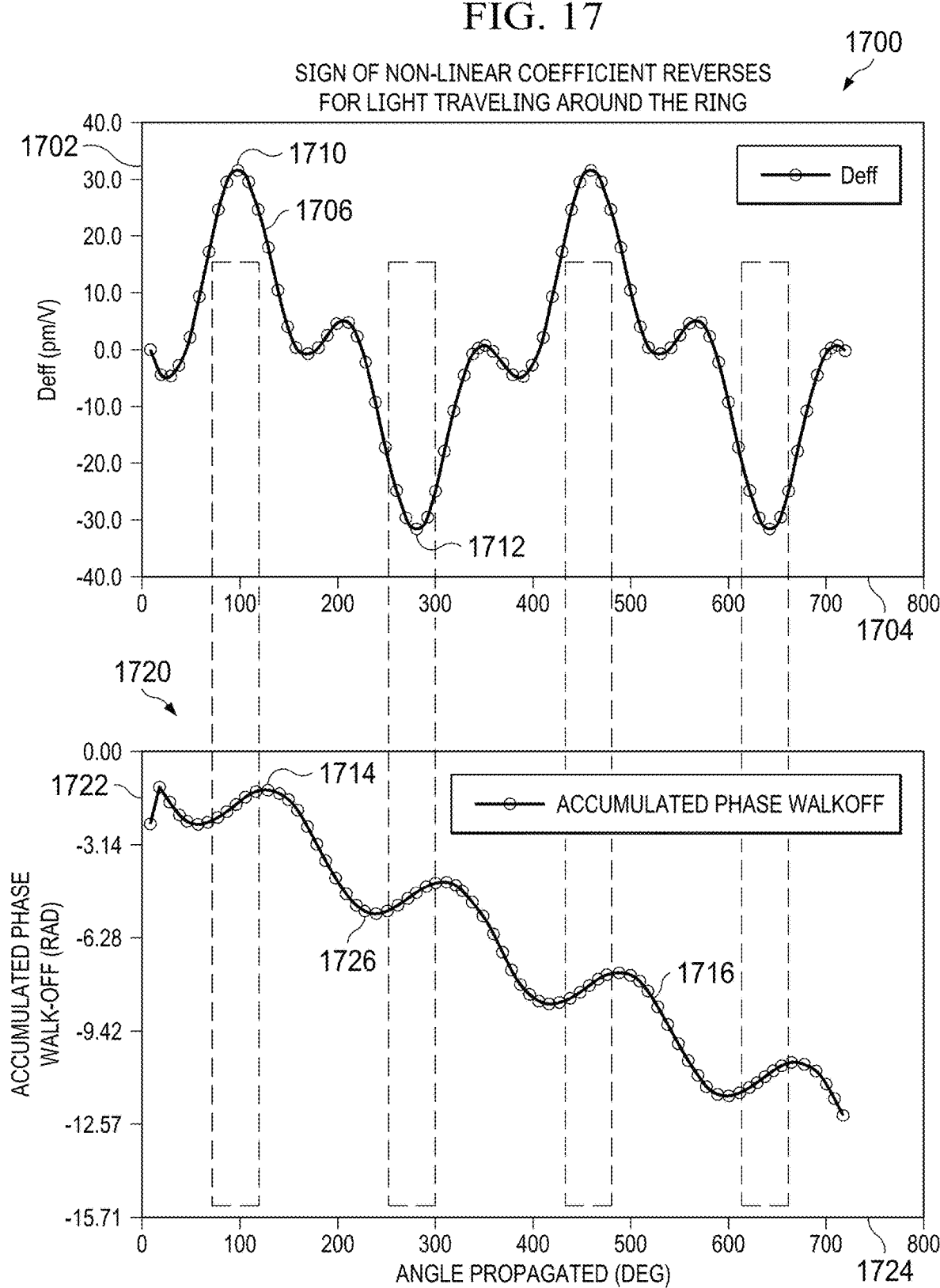
FIG. 17 is an illustration of graphs illustrating a sign of a nonlinear optical coefficient relative to an accumulated phase walk-off in accordance with an illustrative embodiment.

In FIG. 17, illustrations of graphs illustrating a value of a nonlinear optical coefficient relative to an accumulated phase walk-off is depicted in accordance with an illustrative embodiment. As depicted, graph 1700 illustrates the sign of an optical nonlinear coefficient reversing for light traveling through circular ring nonlinear optical waveguide 1402 in FIG. 14.

In this illustrative example, y-axis 1702 is nonlinear optical coefficient ($D_{eff}$) in pm/V, and x-axis 1704 is angle propagated in degrees. Line 1706 represents a value of the nonlinear optical coefficient ($D_{eff}$) as light travels within circular ring nonlinear optical waveguide 1402.

In this figure, graph 1720 depicts an accumulated phase walk-off in accordance with an illustrative embodiment. In this illustrative example, y-axis 1722 is accumulated phase walk-off in radians, and x-axis 1724 is angle propagated in degrees. Line 1726 represents accumulated phase walk-off as light travels within a circular ring nonlinear optical waveguide.

In the illustrative example, circular ring nonlinear optical waveguide 1402 in FIG. 14 can be a directional phase matching waveguide structure designed such that the magnitude of the nonlinear optical coefficient indicated by line 1706 in graph 1700 is larger at those propagation angles for which the accumulated phase walk-off is closer to an odd multiple of $\pi/2$ radians, as illustrated by line 1726 in graph 1720.

As depicted, line 1606 in FIG. 16 indicates that a greatest nonlinear optical generation can occur at propagation angles for which the nonlinear optical coefficient has larger magnitude as shown by line 1706 in FIG. 17 and the net phase walk-off is approximately an odd multiple of $\pi/2$ radians as shown in graph 1720 in FIG. 17. Comparatively low nonlinear optical generation occurs at those propagation angles for which the net phase walk-off is a multiple of n radians as can be seen as being high at angle of 100 degrees in line 1606 in FIG. 16 as compared to being low at an angle 180 degrees in line 1606. Also, with circular ring nonlinear optical waveguide 1402 in FIG. 14, the changes in the phase walk-off are greatest when small incremental spontaneous parametric down conversion generation is present as seen in line 1606 in graph 1600 in FIG. 16.

In this depicted example, line 1706 in graph 1700 in FIG. 17 shows that the sign of the nonlinear optical coefficient reverses after each half cycle (or 180 degrees) of travel around the circular ring nonlinear optical waveguide. Thus, the reversals in the sign of the nonlinear optical coefficient can match the change in the net sign of the interaction between the optical fields and the nonlinear optical material polarization due to the phase walk-off. For spontaneous parametric down conversion, both a signal photon and an idler photon can be generated from the interaction of a pump photon with the nonlinear optical material.

In the illustrative example, it is also desirable to have a magnitude of the second order nonlinear coefficient to be a peak when the factor for the phase walk-off is one. In this illustrative example, the factor for phase walk-off is one at an odd multiple of 180 degrees or $\pi/2$. As can be seen in FIG. 17, line 1706 has a peak magnitude can be seen, for example, at point 1710 and point 1712. This can be compared to the accumulated phase walk-off at point 1714 and point 1716. The alignment of the peaks in line 1706 with the odd multiples of 180 degrees or $\pi/2$ for phase walk-off in line 1726 can provide a desired level of light generation. For a suitably designed direction-reversal enhanced coherent interaction nonlinear optical waveguide, each increment in a spontaneous parametric down conversion generation process can add to the total power in the signal or idler in a coherent manner, as illustrated in FIG. 18. With reference now to FIG. 18, an illustration of graphs illustrating normalized net spontaneous parametric down conversion generation rates relative to normalized incremental spontaneous parametric down conversion generation rates is depicted in accordance with an illustrative embodiment.

As depicted, graph 1800 illustrates a normalized incremental spontaneous parametric down conversion (SPDC) generation rate. In this illustrative example, y-axis 1802 is normalized incremental spontaneous parametric down conversion (SPDC) generation rate in power or photons/sec, and x-axis 1804 is angle propagated in degrees. Line 1806 represents the normalized incremental spontaneous parametric down conversion (SPDC) generation rate as light travels within a circular ring nonlinear optical waveguide.

In FIG. 18, graph 1820 of normalized net spontaneous parametric down conversion generation is depicted in accordance with an illustrative embodiment. In this illustrative example, y-axis 1822 is length normalized net spontaneous parametric down conversion generation rate in photons per second or power per mm, and x-axis 1824 is angle propagated in degrees. Line 1826 represents normalized net spontaneous parametric down conversion generation as light travels within a circular ring nonlinear optical waveguide. By comparing line 1826 with line 1806, one can see that the net spontaneous parametric down conversion generation rate has larger increases at those values of travel distance, or propagated angle, for which the incremental spontaneous parametric down conversion generation rate is larger.

For this example, the net spontaneous parametric down conversion generation rate can decrease instead of increase for certain values of the travel distance or propagated angle. For these travel distances or propagated angles, the sign of the nonlinear optical coefficient does not match the sign of the interaction between the optical fields and the nonlinear optical material polarization due to the phase walk-off. Thus, the additional contribution to the net spontaneous parametric down conversion generation is destructive instead of constructive.

In the illustrative examples, the net coherent interaction length can be the distance of travel around a loop or zig-zag or serpentine path in an optical nonlinear waveguide at which the net phase walk-off equals $\pi$. If the nonlinear optical waveguide in the optical waveguide structure has the shape of a circular ring, the diameter of that ring can be equal to $2/\pi$ times the net coherent interaction distance, in one illustrative example.

In another illustrative example, if the nonlinear optical waveguide in the optical waveguide structure is a closed loop with a racetrack path, the circumference of the loop can be twice the net coherent interaction distance. In yet another illustrative example, if the nonlinear optical waveguide in the optical waveguide structure has a serpentine shape, each zig and each zag in this illustrative example can have a length that is equal to the net coherent interaction distance. Since the value for the material refractive index of x-cut lithium niobate varies with the propagation angle in the x-cut lithium niobate, a determination of the net coherent interaction distance can be made after the light has traveled over at least 180 degrees of propagation angle.

Figure 19:
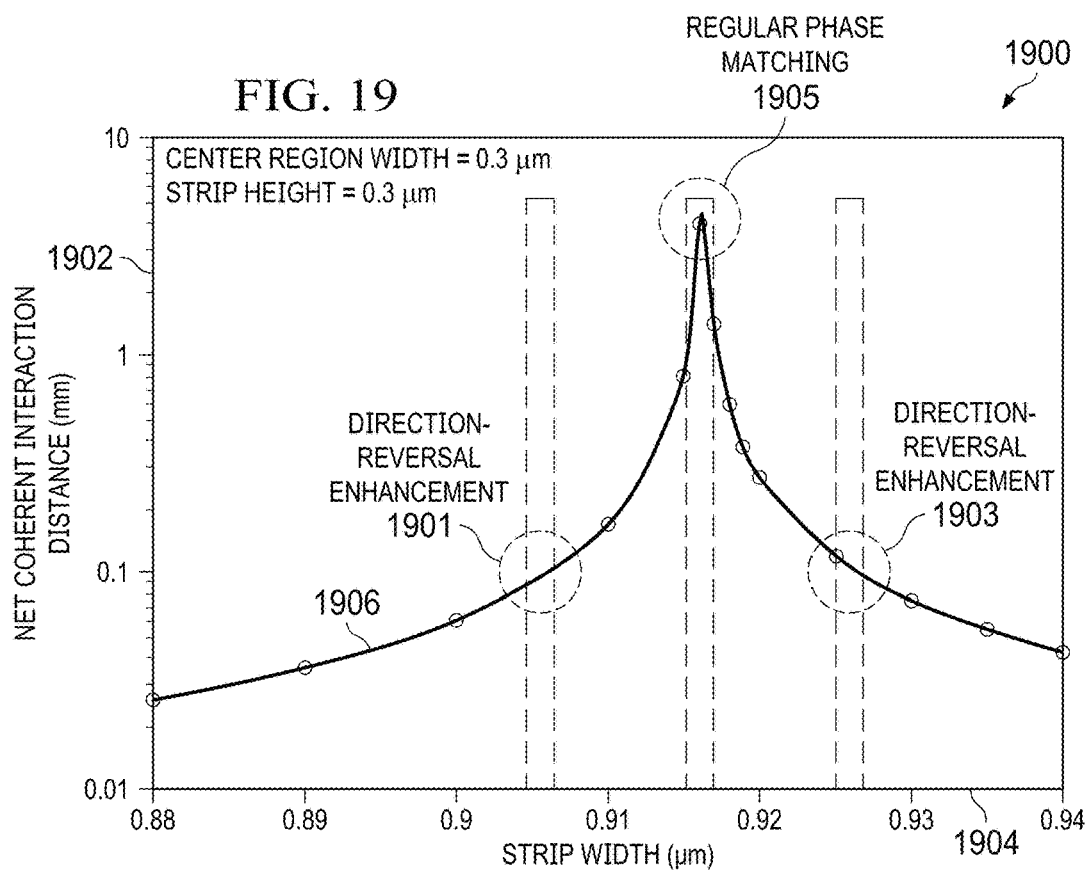
FIG. 19 is an illustration of a graph of a net coherent interaction distance in accordance with an illustrative embodiment.

The cross-sectional dimensions of the nonlinear optical waveguide can be designed to achieve a given value for the net coherent interaction distance. Turning next to FIG. 19, an illustration of a graph of a net coherent interaction distance is depicted in accordance with an illustrative embodiment. In this illustrative example, graph 1900 illustrates a net coherent interaction as a function of strip width. Y-axis 1902 represents net coherent interaction distance in millimeters, and x-axis 1904 represents strip width in micrometers. Line 1906 is the net coherent interaction distance as a function of strip width. In an illustrative example, the value for the strip width can be in accordance with strip width 814 depicted in FIG. 8.

As depicted, examples of strip width used for direction reversal enhancement are shown in section 1901 and section 1903 of line 1906 in graph 1900. An example of a strip width used for regular modal phase matching is shown in section 1905 of line 1906.

In a typical chip-scale nonlinear optical waveguide, the selected net coherent interaction distance may not be the maximum achievable value. Instead, the selected net coherent interaction distance can be substantially smaller such that the physical size of the nonlinear optical waveguide can be compatible with the desired size of a photonic chip. The physical size of the structure can be, for example, the diameter of a closed loop ring or a racetrack-shaped nonlinear waveguide or the curved segment of a serpentine-shaped nonlinear waveguide.

Figure 20:
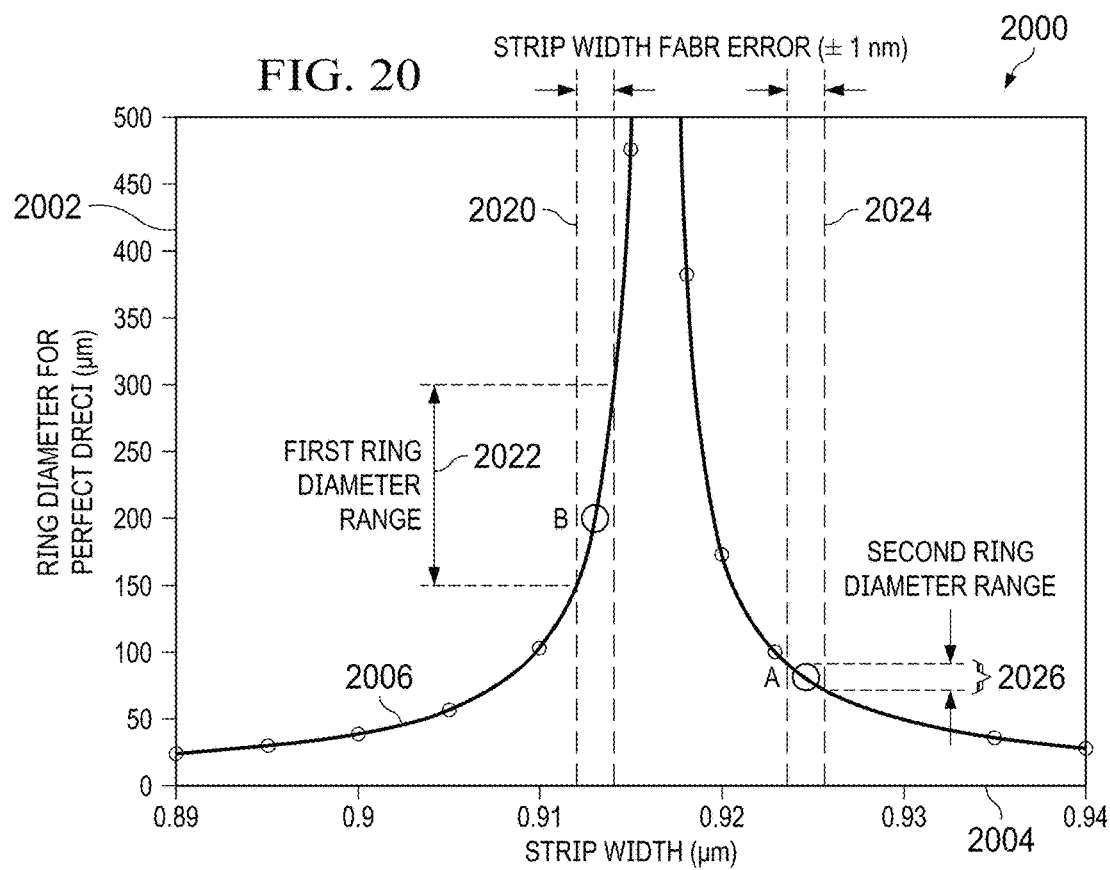
FIG. 20 is an illustration of a graph of a ring diameter for a circular ring nonlinear optical waveguide in accordance with an illustrative embodiment.

FIG. 20 is an illustration of a graph of a ring diameter for a circular ring nonlinear optical waveguide depicted in accordance with an illustrative embodiment. In this illustrative example, graph 2000 illustrates a ring diameter for a circular ring nonlinear optical waveguide, such as circular ring nonlinear optical waveguide 1402 in FIG. 14, as a function of strip width.

In this illustrative example, y-axis 2002 represents the ring diameter for a circular ring nonlinear optical waveguide in micrometers, and x-axis 2004 represents strip width in micrometers.

In graph 2000, line 2006 is the ring diameter as a function of strip width. Line 2006 in graph 2000 illustrates how the ring diameter can depend on the width of a core region of a nonlinear optical waveguide, such as core region 400 illustrated in FIG. 4.

A lower limit on the size of a nonlinear optical waveguide can be constrained by factors such as optical loss from having a radius of curvature that is too small. Graph 2000 illustrates a change in the diameter of circular ring nonlinear optical waveguide 1402 in FIG. 14 that can be made to accommodate a small (e.g., ±1 nm) change in the waveguide width.

For example, a ±1 nm change in the width in section 2020 can result in a first ring diameter range as depicted in section 2022. As another example, a ±1 nm change in section 2024 can result in a second ring diameter range as shown in section 2026. The percent change in the ring diameter needed can be smaller when circular ring nonlinear optical waveguide 1402 in FIG. 14 is used with a smaller net coherent interaction length, and thus a smaller ring diameter.

With a circular ring nonlinear optical waveguide, such as circular ring nonlinear optical waveguide 1402 in FIG. 14, a departure of the achieved net coherent interaction distance from a value that is one-half of the circular ring can reduce the number of round trips or cycles around circular ring nonlinear optical waveguide 1402 before the enhancement in total interaction distance achieved by the direction-reversal enhancement of the coherent interaction approach becomes limited. With a directional phase matching waveguide structure, the net nonlinear optical generation, such as of the signal light and idler light in a spontaneous parametric down conversion, increases with the overall interaction distance, as illustrated in FIG. 21.

Figure 21:
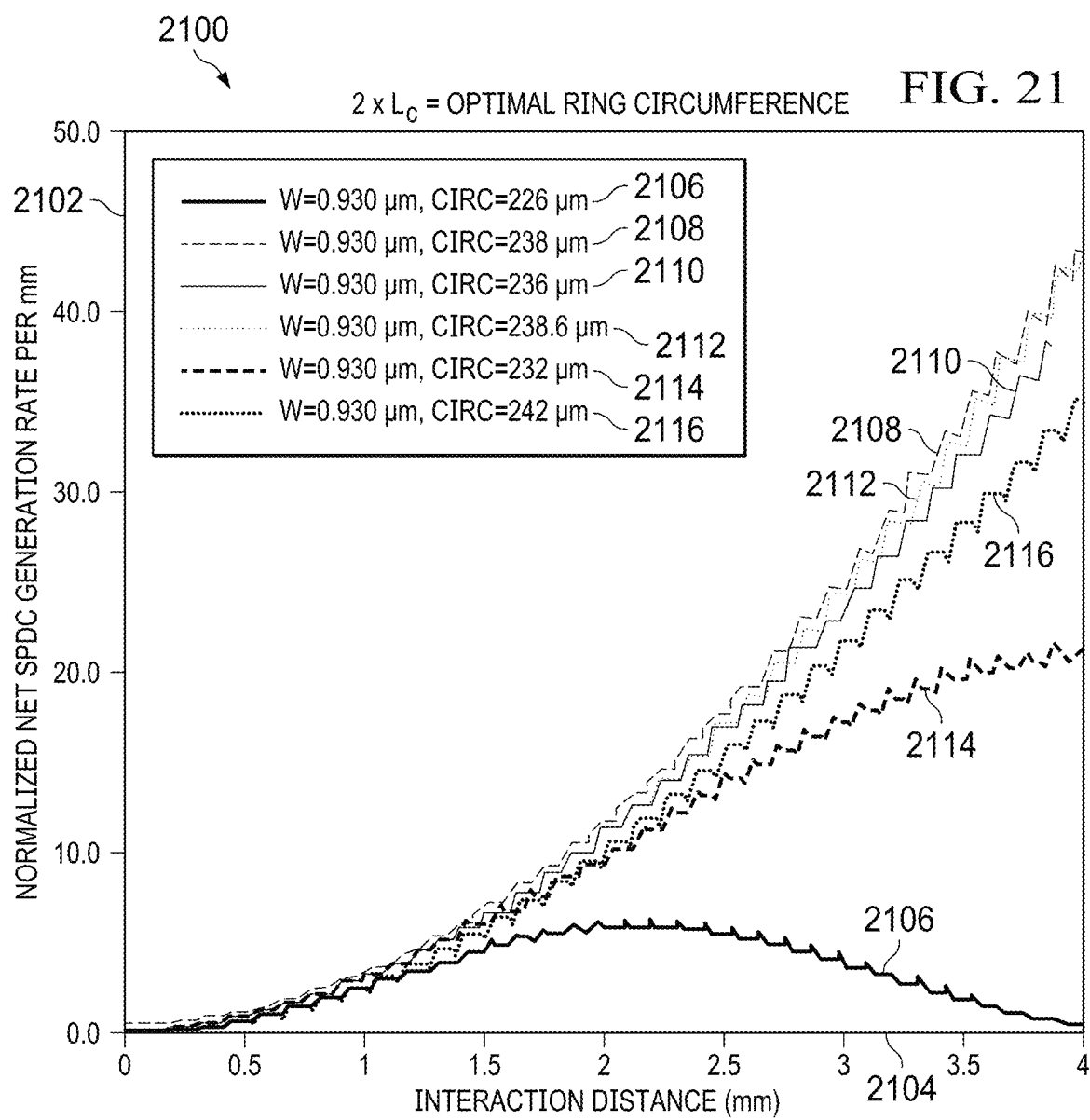
FIG. 21 is an illustration of a graph of a normalized net spontaneous parametric down conversion generation in accordance with an illustrative embodiment.

FIG. 21 is an illustration of a graph of a normalized net spontaneous parametric down conversion generation depicted in accordance with an illustrative embodiment. In this illustrative example, graph 2100 illustrates a length normalized net spontaneous parametric down conversion generation rate as a function of interaction distance.

In this example, y-axis 2102 represents the length normalized net spontaneous parametric down conversion generation rate with units of photons per second or power per mm, and x-axis 2104 represents interaction distance in millimeters.

The lines in graph 2100 illustrate a normalized net spontaneous parametric down conversion generation rate as a function of interaction distance for various waveguide core widths and waveguide circumference configurations for a circular ring optical waveguide such as circular ring nonlinear optical waveguide 1402 in FIG. 14.

In this illustrative example, line 2106 is for a configuration of circular ring nonlinear optical waveguide 1402 with a width of 0.930 μm and a circumference of 226 μm; line 2108 is for a configuration of circular ring nonlinear optical waveguide 1402 with a width of 0.930 μm and a circumference of 238 μm; line 2110 is for a configuration of circular ring nonlinear optical waveguide 1402 with a width of 0.930 μm and a circumference of 236 μm; line 2112 is for a configuration of circular ring nonlinear optical waveguide 1402 with a width of 0.930 μm and a circumference of 238.6 μm; line 2114 is for a configuration of circular ring nonlinear optical waveguide 1402 with a width of 0.930 μm and a circumference of 232 μm; and line 2116 is for a configuration of circular ring nonlinear optical waveguide 1402 with a width of 0.930 μm and a circumference of 242 μm.

When a large enough difference between the net coherent interaction distance and one-half the circumference of a loop is present, the normalized net nonlinear optical generation reaches a maximum value and begins to decline as illustrated by line 2106 in graph 2100.

Figure 22:
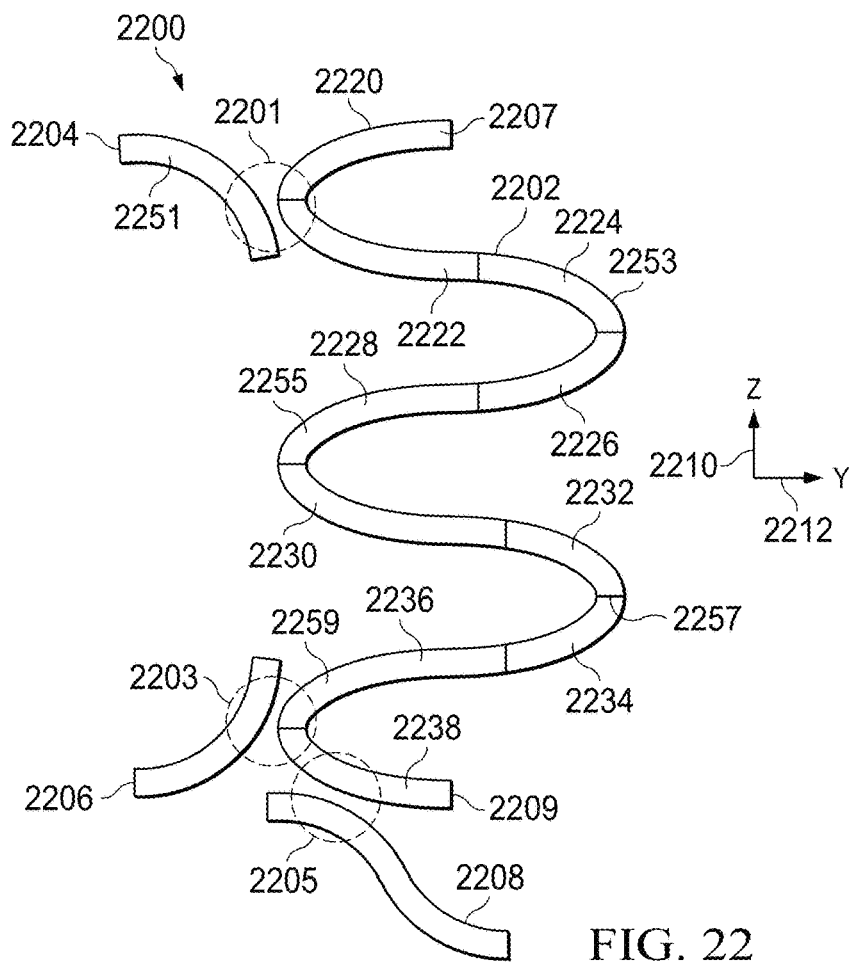
FIG. 22 is an illustration of an optical waveguide structure including a nonlinear optical waveguide with a serpentine path in accordance with an illustrative embodiment.

With reference to FIG. 22, an illustration of an optical waveguide structure including a nonlinear optical waveguide with a serpentine path is depicted in accordance with an illustrative embodiment. In this illustrative example, optical waveguide structure 2200 is an example of one implementation for optical waveguide structure 100 shown in block form in FIG. 1.

As depicted in this example, optical waveguide structure 2200 includes a number of different components. In this illustrative example, optical waveguide structure 2200 comprises nonlinear optical waveguide 2202, pump input optical waveguide 2204, output optical waveguide 2206, idler output optical waveguide 2208, input optical coupler 2201, output optical coupler 2203, and output optical coupler 2205. As depicted, optical waveguide structure 2200 lies in an yz plane defined by z-axis 2210 and y-axis 2212.

In this illustrative example, a pump input light can be input through pump input optical waveguide 2204 into nonlinear optical waveguide 2202 via input optical coupler 2201. At least one of an input idler light or an input signal light can be supplied at end 2207 of nonlinear optical waveguide 2202.

As depicted, an idler light can be extracted from idler output optical waveguide 2208. An output signal light can be extracted from nonlinear optical waveguide 2202 at output 2209 of nonlinear optical waveguide 2202.

In this depicted example, nonlinear optical waveguide 2202 has a shape in the form of a serpentine path. As depicted, nonlinear optical waveguide 2202 has a serpentine path with curved waveguide segments and without straight segments. In this illustrative example, nonlinear optical waveguide 2202 has curved segment 2220, curved segment 2222, curved segment 2224, curved segment 2226, curved segment 2228, curved segment 2230, curved segment 2232, curved segment 2234, curved segment 2236, and curved segment 2238.

As depicted, nonlinear optical waveguide 2202 is a serpentine waveguide with two zig-zag cycles. A first zig can be from location 2251 to location 2253. A first zag can be from location 2253 to location 2255. The first zig and the first zag form a first cycle for the zig-zag. A second zig is from location 2255 to location 2257. A second zag is from location 2257 to location 2259. The second zig and the second zag form a second cycle for the zig-zagging serpentine path.

In this depicted example, the location of input optical coupler 2201 is the location where the pump light is input from pump input optical waveguide 2204 into nonlinear optical waveguide 2202. This location defines the start of the first zig-zag cycle. The location of output optical coupler 2203 is the location where the pump light is extracted from nonlinear optical waveguide 2202 to output optical waveguide 2206 which defines the end of the last zig-zag cycle.

A nonlinear optical process such as difference frequency generation and sum frequency generation can involve two input wavelengths. In this example, the input wavelength whose optical power is substantially higher than the optical power of the other input wavelength typically is considered the "pump" light.

Additionally, optical waveguide structure 2200 also comprises output optical coupler 2205 that is used to physically separate the two wavelengths of light that are not the pump light.

As used herein, the terms "portion" and "part," as used herein, are interchangeable. For example, portions can be the curved segments. A portion can be the entire curved segment that is between two straight segments or a part of that curved segment. In the illustrative example, curved segments can be present at both ends of a straight segment in nonlinear optical waveguide 2202.

Figure 23:
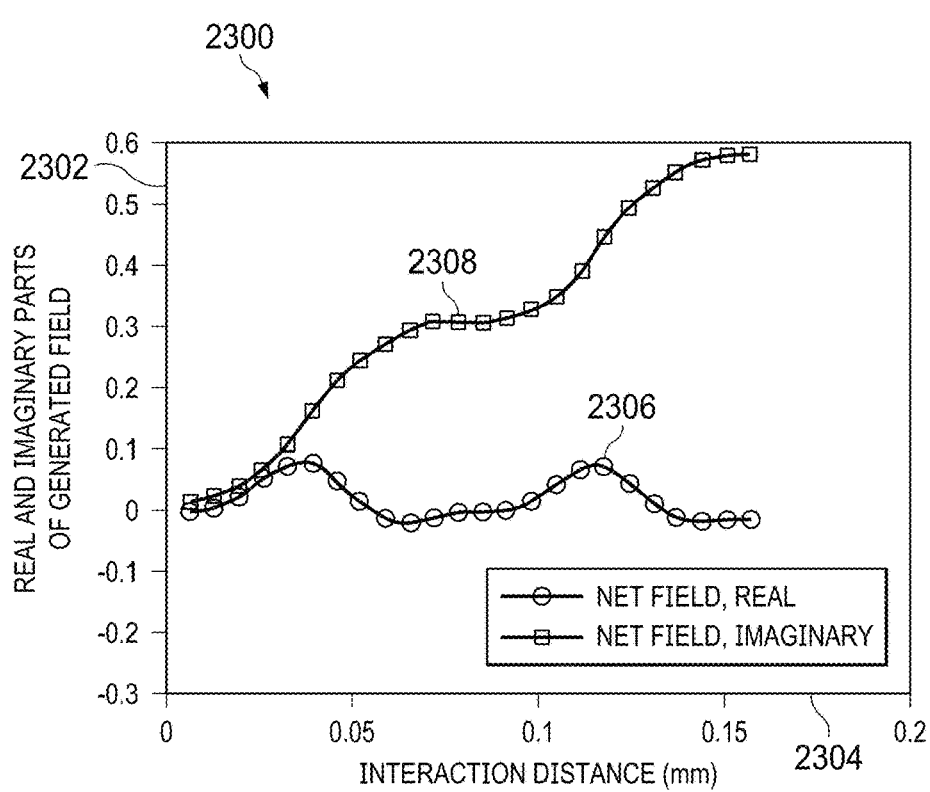
FIG. 23 is an illustration of a graph of real and imaginary parts of a generated field in accordance with an illustrative embodiment.

In this illustrative example, FIGS. 23-26 are graphs that illustrate the operation of nonlinear optical waveguide 2202 with a serpentine path having only curved segments, such as depicted in FIG. 22. FIGS. 23 and FIG. 24 illustrate the nonlinear optical process of spontaneous parametric down conversion that occurs in the first cycle through a serpentine structure, such as nonlinear optical waveguide 2202. In FIG. 23, an illustration of a graph of real and imaginary parts of a generated field is depicted in accordance with an illustrative embodiment. As depicted, graph 2300 illustrates real and imaginary parts of the generated field as a function of interaction distance.

In this illustrative example, y-axis 2302 is normalized amplitude of the real and imaginary parts of a generated field, and x-axis 2304 is interaction distance in millimeters. In graph 2300, line 2306 represents the real part of a net field, and line 2308 represents the imaginary part of a net field. The complex exponential factor in the mathematical expressions (1) and (2) discussed above can be represented as a sum of a real part and an imaginary part.

FIG. 24 is an illustration of graphs illustrating a phase walk-off relative to a nonlinear optical coefficient depicted in accordance with an illustrative embodiment. As illustrated, graph 2400 depicts a phase walk-off as a function of interaction distance. In this illustrative example, y-axis 2402 is phase walk-off in radians, and x-axis 2404 is interaction distance in millimeters. Line 2406 represents changes in the phase walk-off as the interaction distance increases.

In this figure, graph 2420 depicts the nonlinear optical coefficient as a function of interaction distance. As depicted, y-axis 2422 is the nonlinear optical coefficient in pm/V, and x-axis 2424 is interaction distance in millimeters. Line 2426 represents the change in the nonlinear optical coefficient as interaction distance increases.

In one example, the curved portion of nonlinear optical waveguide 2202 has a 25 µm radius of curvature. In nonlinear optical waveguide 2202, the total nonlinear optical interaction distance after one cycle is about 0.157 mm.

In this depicted example, the net phase walk-off for the wave-guided optical modes at the 3 wavelengths that participate in the nonlinear optical process reaches $\pi$ radians, or 180 degrees, at the halfway point of the first cycle at location 2430, as depicted in graph 2400. This halfway point is the end of the "zig" portion of the cycle and the start of the "zag" portion of the cycle.

In this illustrative example, nonlinear optical waveguide 2202 can be fabricated from x-cut lithium niobate and the zig and zag portions of a cycle can be oriented such that the nonlinear optical coefficient has primarily one sign (e.g., negative) for the zig portion of the cycle and primarily the opposite sign (e.g., positive) for the zag portion of the cycle. For the zig portion, the phase walk-off is close to $-\pi/2$ whereas for the zag portion, the phase walk-off is close to $-3\pi/2$.

Figure 25:
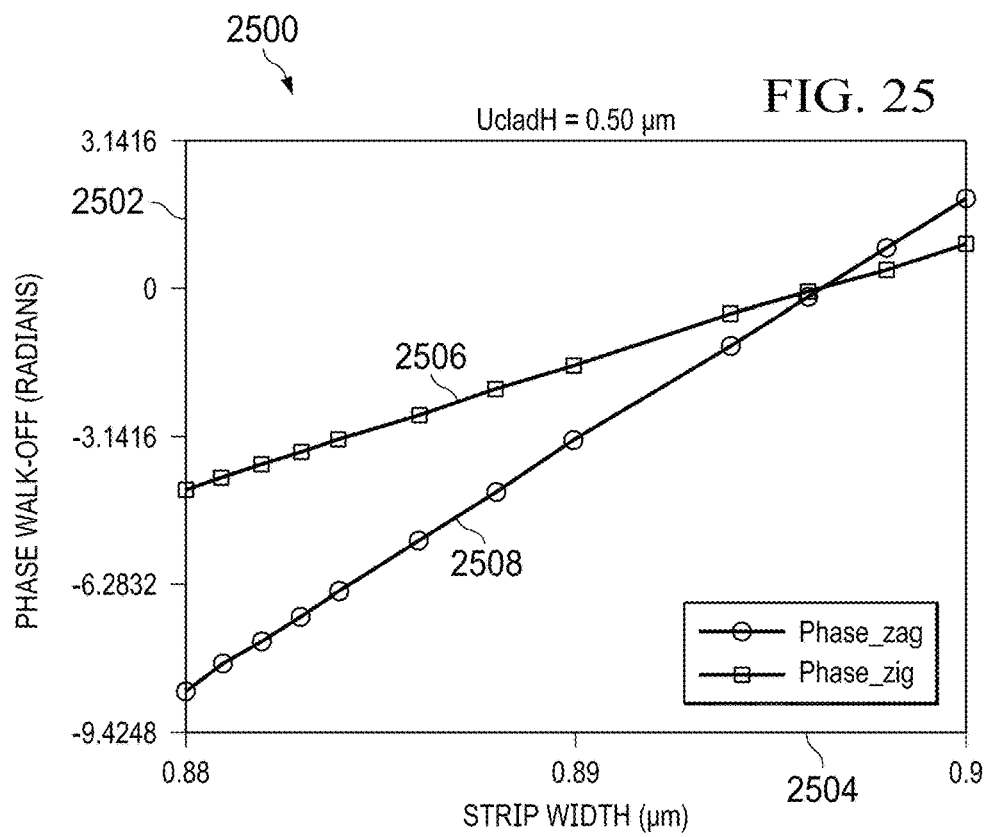
FIG. 25 is an illustration of a graph of a phase walk-off in accordance with an illustrative embodiment.

Turning to FIG. 25, an illustration of a graph of a phase walk-off is depicted in accordance with an illustrative example. As depicted, graph 2500 illustrates a phase walk-off as a function of strip width for nonlinear optical waveguide 2202 in FIG. 22. In this illustrative example, y-axis 2502 is phase walk-off in radians, and x-axis 2504 is waveguide strip width in micrometers. In this illustrative example, the strip width shown in FIG. 25 can be strip width 814 in nonlinear optical waveguide 800 illustrated in FIG. 8.

Line 2506 is the phase walk-off from traversing through a zig portion of nonlinear optical waveguide 2202, and line 2508 is the phase walk-off from traversing through the combination of a zig portion and a zag portion of nonlinear optical waveguide 2202. As shown in FIG. 25, the additional phase walk-off from traversing through a zig portion or through a zag portion is $-3.1436$ radians when the strip width is 0.884 µm for nonlinear optical waveguide 2202 in this particular example.

Figure 26:
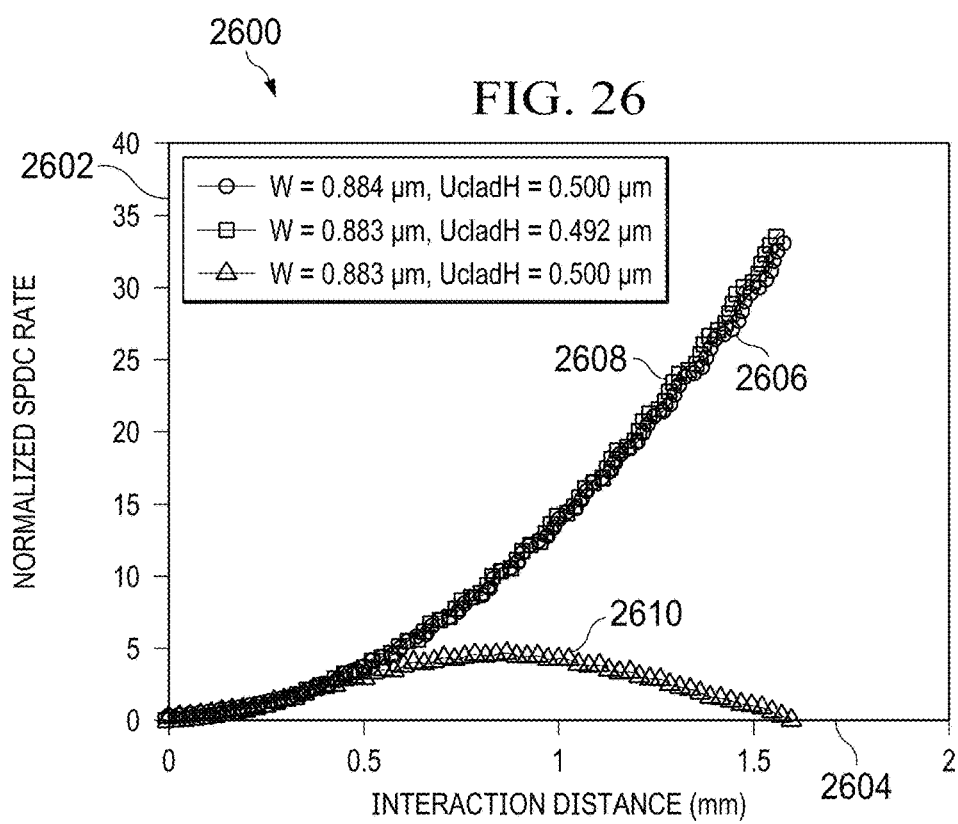
FIG. 26 is an illustration of a graph of a normalized spontaneous parametric down conversion (SPDC) rate in accordance with an illustrative embodiment.

With reference to FIG. 26, an illustration of a graph of a normalized spontaneous parametric down conversion (SPDC) rate is depicted in accordance with an illustrative embodiment. As depicted, graph 2600 illustrates a normalized spontaneous parametric down conversion (SPDC) rate as a function of interaction distance for nonlinear optical waveguide 2202 in FIG. 22. In this illustrative example, y-axis 2602 is normalized spontaneous parametric down conversion (SPDC) rate in photons per second or power, and x-axis 2604 is interaction distance in millimeters.

The optical field generated (e.g., by the spontaneous parametric down conversion) after a given interaction distance in nonlinear optical waveguide 2202 can be described by its real and imaginary components as depicted in graph 2300 in FIG. 23. Graph 2300 shows that for this example, the optical field magnitude, which combines the contributions from the real and imaginary components of the optical field, increases gradually with greater interaction distance. The optical power generated, which is shown in graph 2600 in FIG. 26, is given by summing the squares of the real and the imaginary field components, such as those shown in lines 2306 and 2308 of graph 2300 in FIG. 23. A comparison of graph 2300 in FIG. 23 and graph 2420 in FIG. 24 shows that the greatest increases in the optical field, and in the optical power, occur when the nonlinear optical coefficient has a larger magnitude. Also, a comparison of graph 2300 in FIG. 23 and graph 2400 in FIG. 24 shows that the greatest increases in the optical field, and in the optical power, occur when the phase walk-off has a value close to an odd multiple of π/2 radians. The greatest increases occur when the combination of the nonlinear optical coefficient and the phase walk-off are aligned properly.

The different lines in graph 2600 represent the normalized spontaneous parametric down conversion rate for different strip widths and upper cladding height for nonlinear optical waveguide 2202 in FIG. 22. The normalized spontaneous parametric down conversion rate can be a measure of efficiency, assuming the pump power is kept constant. As depicted, line 2606 is for a strip width of 0.884 μm with an upper cladding height of 0.500 μm; line 2608 is for a strip width of 0.883 μm with an upper cladding height of 0.492 μm; and line 2610 is for a strip width of 0.883 μm with an upper cladding height of 0.500 μm.

For a strip width of 0.884 μm, the normalized spontaneous parametric down conversion rate achieved for an interaction distance of 1 mm is about 15, as shown by line 2606 in graph 2600. However, the normalized spontaneous parametric down conversion rate achieved for this interaction distance is only about 4 for a strip width of 0.883 μm and the same upper cladding height, as shown by line 2610 in graph 2600. The lower SPDC rate is associated with the differing values for the phase walk-off achieved for the two strip widths.

Referring back to line 2506 in graph 2500 of FIG. 25, the phase walk-off for a strip width of 0.883 μm is roughly 10% more negative than is the phase walk-off for a strip width of 0.884 μm. As shown in graph 2600 in FIG. 26, the normalized spontaneous parametric down conversion rate at the interaction distance of 1 mm is less than 5, with the maximum normalized spontaneous parametric down conversion rate being about 5. Thus, for a 10% change in the phase walk-off, the spontaneous parametric down conversion rate is reduced by a factor of 3. Whether a factor of 3 degradation in the generation rate of photons is acceptable depends on the particular implementation. Thus, whether a 10% departure from π/2 is acceptable or not depends on the implementation.

For a different strip width, such as 0.883 μm as illustrated in 2600 in FIG. 26, the phase walk-off after a zig portion departs slightly from being equal to an odd multiple of π. Thus, nonlinear optical interaction eventually is no longer coherent after a larger number of cycles and the spontaneous parametric down conversion generation reaches a maximum value and declines, as shown by the line 2610 in FIG. 26.

For the waveguide cross-sectional structure of nonlinear optical waveguide 2202 in FIG. 22, a compensation can be made for a change in a waveguide parameter, such as the strip width, by a corresponding change in another waveguide parameter, such as the upper cladding height. Line 2608 in FIG. 26 shows that, for this example, changing the upper cladding height from 0.500 μm to 0.492 μm can be suitable for adjusting the effective refractive indices of the optical modes at the pump, signal, and idler wavelengths participating in the nonlinear optical process, and thus having the phase walk-off be an odd multiple of π at the end of the zig portion.

For the nonlinear optical process in nonlinear optical waveguide 2202 in FIG. 22 to remain coherent over many zig and zag cycles through a serpentine waveguide, the phase walk-off after each zig portion should be an odd multiple of n and the phase walk-off after each zag portion should be a multiple of 2π. Graph 2500 in FIG. 25 shows that this condition can be met in the present example for a strip width of 0.884 μm. Graph 2600 in FIG. 26 shows that for a strip width of 0.884 μm, the net generation of signal light or idler light by a spontaneous parametric down conversion process does continue to increase with additional zig-zag cycles, and thus greater interaction distance.

In this example, when the waveguide is designed such that the sign change due to the phase walk-off and the sign change of the second order nonlinear coefficient are aligned in a desired manner, the results are like those shown in line 2608 and line 2606.

If a level of alignment is not as great, then the result shown in line 2610 can occur. However, the results in line 2610 can be sufficient in some implementations made in accordance with an illustrative example. In other words, the perfect or exact alignment is not necessary to obtain desired light generation. In other words, the amount of alignment depends on the amount of light generation desired.

Figure 27:
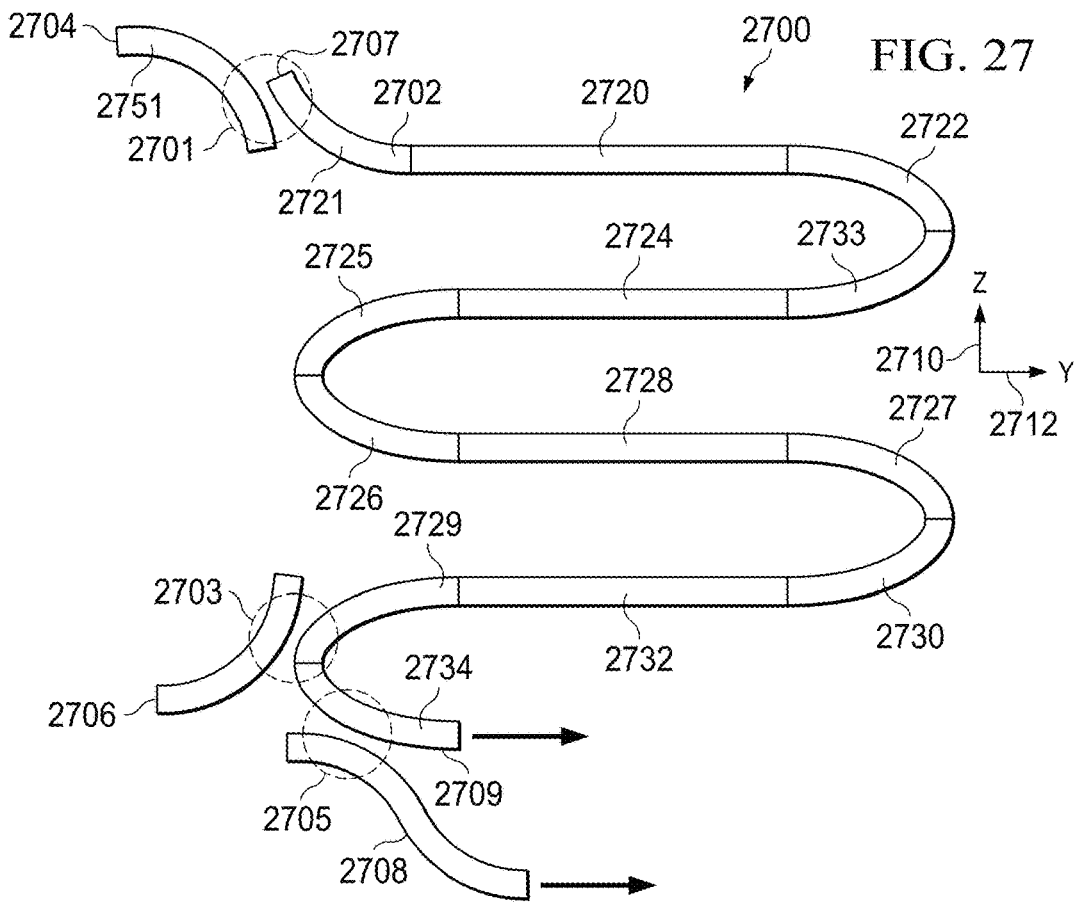
FIG. 27 is an illustration of an optical waveguide structure including a nonlinear optical waveguide with a serpentine path in accordance with an illustrative embodiment.

Turning now to FIG. 27, an illustration of an optical waveguide structure including a nonlinear optical waveguide with a serpentine path is depicted in accordance with an illustrative embodiment. In this illustrative example, optical waveguide structure 2700 is an example of one implementation for optical waveguide structure 100 shown in block form in FIG. 1.

As depicted in this example, optical waveguide structure 2700 includes a number of different components. In this illustrative example, optical waveguide structure 2700 includes nonlinear optical waveguide 2702, pump input optical waveguide 2704, pump removal optical waveguide 2706, idler output optical waveguide 2708, input optical coupler 2701, output optical coupler 2703, and output optical coupler 2705. As depicted, optical waveguide structure 2700 lies in an yz plane defined by z-axis 2710 and y-axis 2712.

In this illustrative example, a pump input light can be input through pump input optical waveguide 2704. At least one of an input idler light or an input signal light can be supplied at end 2707 of nonlinear optical waveguide 2702.

As depicted, an idler light can be extracted from idler output optical waveguide 2708. An output signal light can be extracted from nonlinear optical waveguide 2702 at end 2709 of nonlinear optical waveguide 2702.

Nonlinear optical waveguide 2702 has a serpentine path that has straight segments in addition to curved segments. In this example, nonlinear optical waveguide 2702 has curved segment 2721, straight segment 2720, curved segment 2722, curved segment 2723, straight segment 2724, curved segment 2725, curved segment 2726, straight segment 2728, curved segment 2727, curved segment 2730, straight segment 2732, curved segment 2729, and curved segment 2734.

As depicted, nonlinear optical waveguide 2702 has two cycles of zigs and zags. For a structure that has both straight and curved segments, the relative contributions of straight segment 2724 and the two curved segments, curved segment 2733 and curved segment 2725 on either side of straight segment 2724, in a zig can be considered. Additionally, the relative contributions of straight segment 2728 and the two curved segments, curved segment 2726 and curved segment 2727 on either side of straight segment 2728 in a zag can be considered.

Figure 28:
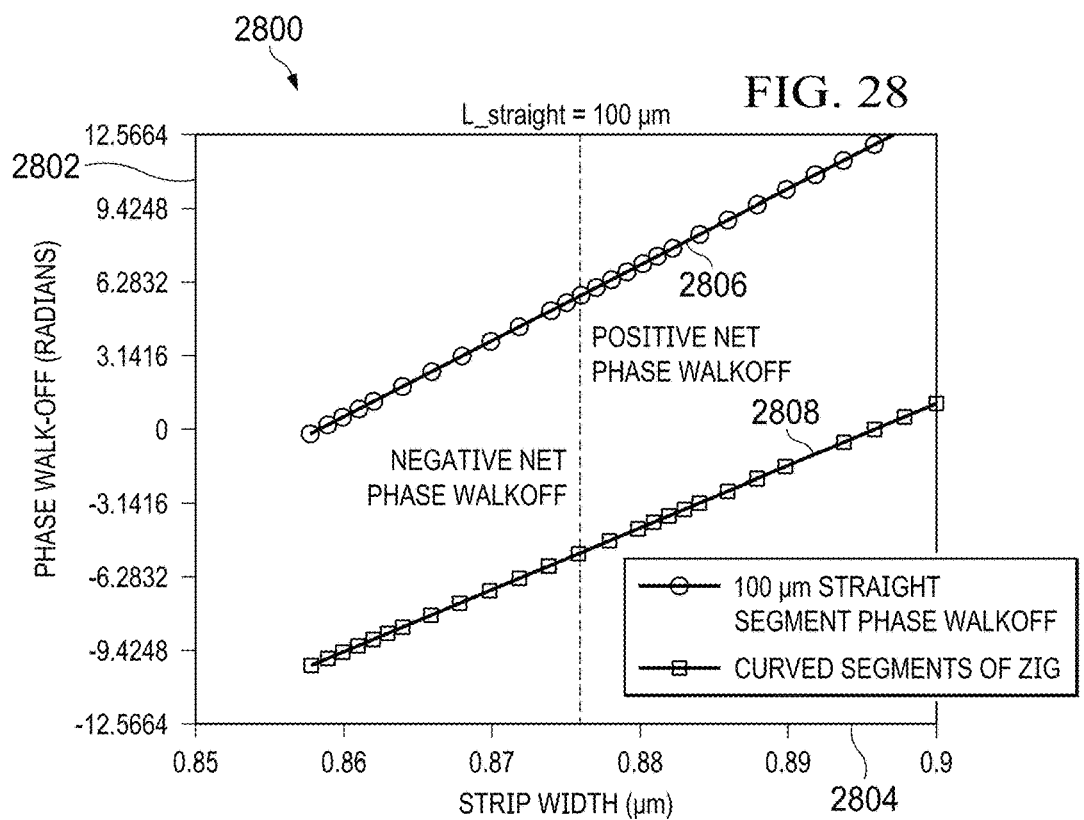
FIG. 28 is an illustration of a graph of a phase walk-off in accordance with an illustrative embodiment.

Turning to FIG. 28, an illustration of a graph of a phase walk-off is depicted in accordance with an illustrative embodiment. As depicted, graph 2800 illustrates a phase walk-off as a function of strip width for nonlinear optical waveguide 2702 in FIG. 27. The strip width for this illustrative example can be as defined by strip width 814 in nonlinear optical waveguide 800 depicted in FIG. 8. In this illustrative example, y-axis 2802 is phase walk-off in radians, and x-axis 2804 is strip width in micrometers. Line 2806 is the phase walk-off for a straight segment in nonlinear optical waveguide 2702 in FIG. 27, and line 2808 is the phase walk-off for a curved segment in nonlinear optical waveguide 2702 in FIG. 27. In this depicted example, a straight segment has a length of about 100 µm. In this example, the curved segments include the two portions of curved segments that are on either end of a straight segment of a zig or of a zag.

For this example, the contribution to the phase walk-off from the curved segments in a zig (or a zag) is shown by line 2808 in graph 2800. This contribution can vary with the parameters of the waveguide cross-section structure, such as strip width.

The phase walk-off due to the straight segment can depend on the waveguide cross-sectional structure and on the length of that straight segment. For the example, line 2806 in graph 2800 represents the contribution from a straight segment of 100 µm length. Line 2806 becomes steeper as the length of the straight segment is made larger.

Thus, for a given strip width, one can choose a length for the straight segment at which the net phase walk-off due to both the curved and straight segments of a zig is an odd multiple of $\pi$, and can be either $+\pi$ or $-\pi$. The following examples illustrate considerations and trade-offs that can be made when choosing a waveguide cross-sectional dimensional parameter, such as strip width, and when choosing the straight segment length.

In an illustrative example, the phase walk-off in the curved segments in nonlinear optical waveguide 2702 in FIG. 27 can be chosen to have a value that is close to the desired odd multiple of $\pi/2$. An example of this condition is illustrated in FIGS. 29 and 30.

Figure 29:
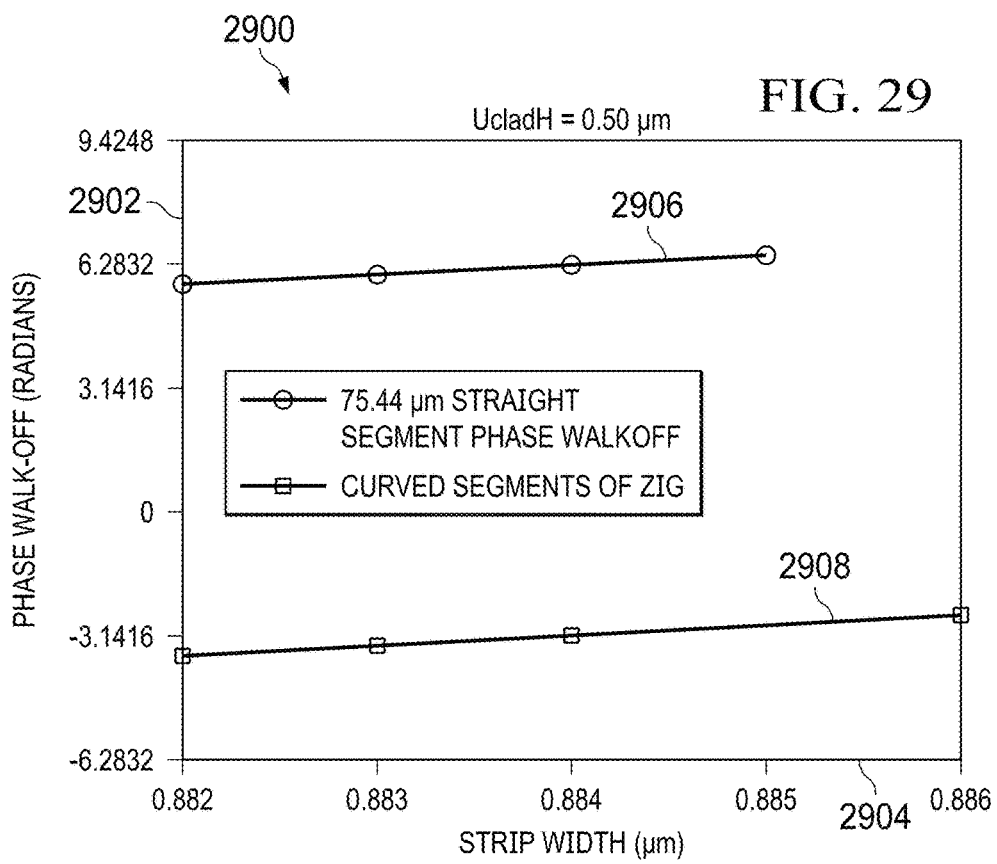
FIG. 29 is an illustration of a graph of a phase walk-off in accordance with an illustrative embodiment.
Figure 30:
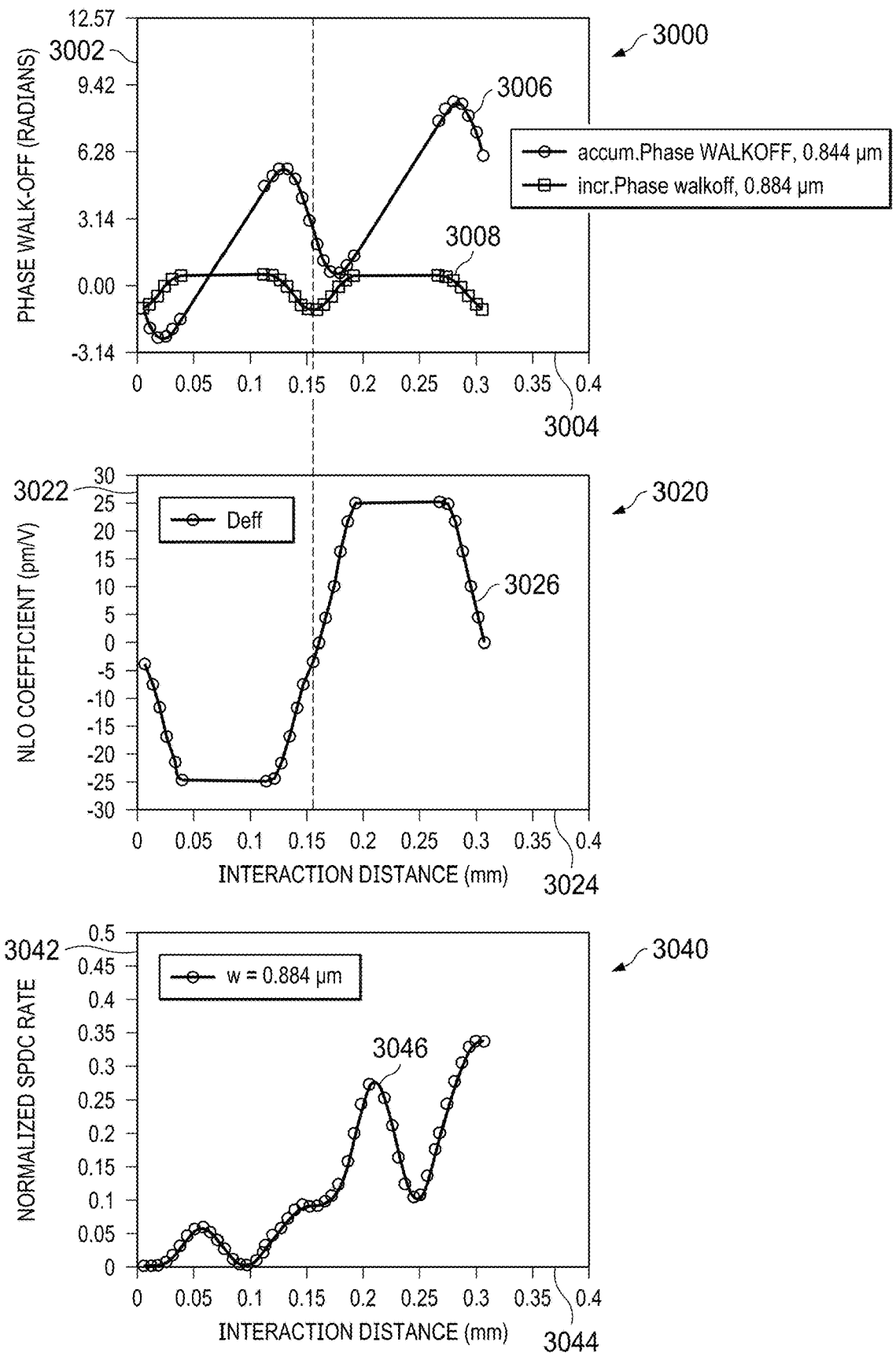
FIG. 30 is an illustration of graphs illustrating a phase walk-off relative to a nonlinear optical coefficient and relative to a normalized spontaneous parametric down conversion (SPDC) rate in accordance with an illustrative embodiment.

Before turning to FIGS. 29 and 30, consider graph 2800 in FIG. 28. Line 2808 of this graph indicates that the phase walk-off from the curved segments of a zig can be approximately $-\pi$ radians when the strip width is 0.884 µm. Thus, to have the net phase walk-off due to the combination of both the curved segments and a straight segment be an odd multiple of n radians, one would want the straight segment to contribute a phase walk-off that is zero or is an even multiple of n radians. Line 2806 in graph 2800 is for a straight segment length of 100 µm. For a strip width of 0.884 µm, this straight segment length gives an additional phase walk-off that is greater than $2\pi$ and is approaching $3\pi$ radians. Thus, the desired condition for direction phase matching can be achieved with a shorter straight segment length.

Turning to FIG. 29, an illustration of a graph of a phase walk-off is depicted in accordance with an illustrative embodiment. As depicted, graph 2900 illustrates a phase walk-off as a function of strip width for nonlinear optical waveguide 2702 in FIG. 27. In this illustrative example, y-axis 2902 is phase walk-off in radians, and x-axis 2904 is strip width in micrometers.

In graph 2900, line 2906 is the phase walk-off for a straight segment in nonlinear optical waveguide 2702, and line 2908 is phase walk-off for a curved segment in nonlinear optical waveguide 2702. In this depicted example, nonlinear optical waveguide 2702 in FIG. 27 has an upper cladding height of 0.50 µm. For graph 2900 in FIG. 29, the straight segment has a length of 75.44 µm, which was chosen so that the contribution to the phase walk-off from the straight segment would be $+2\pi$ radians when the strip width is 0884 µm and for an upper cladding height of 0.50 µm.

Turning now to FIG. 30, an illustration of graphs illustrating a phase walk-off relative to a nonlinear optical coefficient and relative to a normalized spontaneous parametric down conversion (SPDC) rate is depicted in accordance with an illustrative embodiment. As illustrated, graph 3000 depicts a phase walk-off as a function of interaction distance. In this illustrative example, y-axis 3002 is phase walk-off in radians, and x-axis 3004 is interaction distance in millimeters. Line 3006 represents accumulated phase walk-off as the interaction distance increases. Line 3008 represents incremental phase walk-off as the interaction distance increases.

In FIG. 30, graph 3020 depicts the nonlinear optical coefficient as a function of interaction distance. As depicted, y-axis 3022 is the nonlinear optical coefficient in pm/V, and x-axis 3024 is interaction distance in millimeters. Line 3026 represents the change in the nonlinear optical coefficient as interaction distance increases.

The results shown in FIG. 30 are for a waveguide with a straight segment length of 75.44 µm. For this length of the straight segment, the net phase walk-off due to the contributions of both the curved segments and the straight segment of a zig is $+\pi$ radians when the strip width is 0.884 µm. This value for the net phase walk-off can be obtained by adding the contributions indicated by lines 2906 and 2908 in graph 2900 of FIG. 29.

Graph 3000 in FIG. 30 shows that the accumulated phase walk-off does equal $+\pi$ radians at the end of the zig portion of the serpentine waveguide structure. For this illustrative example, the end of the zig corresponds to an interaction distance slightly larger than 0.15 mm and is indicated by the dashed vertical line that extends through graphs 3000 and 3020. Also, at the end of a combination of a zig and a zag, the accumulated phase walk-off equals $+2\pi$ radians.

For this illustrative example, line 3008 in graph 3000 shows that the incremental phase walk-off for the straight segment has a value that is not zero. As a result, the accumulated phase walk-off has a large change as the interaction distance increases while the light traverses the straight segment. In fact, the accumulated phase walk-off changes from a value of approximately $-\pi/2$ radians to a value of approximately $+3\pi/2$ radians.

Graph 3040 of FIG. 30 depicts the normalized spontaneous parametric down conversion generation rate as a function of interaction distance. As depicted, y-axis 3042 is normalized spontaneous parametric down conversion generation rate in photons per second or power, and x-axis 3044 is interaction distance in millimeters. Line 3046 represents the change in the spontaneous parametric down conversion generation rate as the interaction distance increases. Since the phase walk-off that occurs in each of the straight segments exceeds 180 degrees and equals 360 degrees, the contribution to the spontaneous parametric down conversion generation of light from a first portion of a straight segment would be cancelled by the contribution from a second portion of the straight segment. As a result, the only overall increase in the spontaneous parametric down conversion generation rate is from the curved segments of the zig and zag portions of this exemplary serpentine waveguide. Nevertheless, the spontaneous parametric down conversion generation rate does become higher and higher for more and more zig-zag cycles through the serpentine waveguide.

Figure 31:
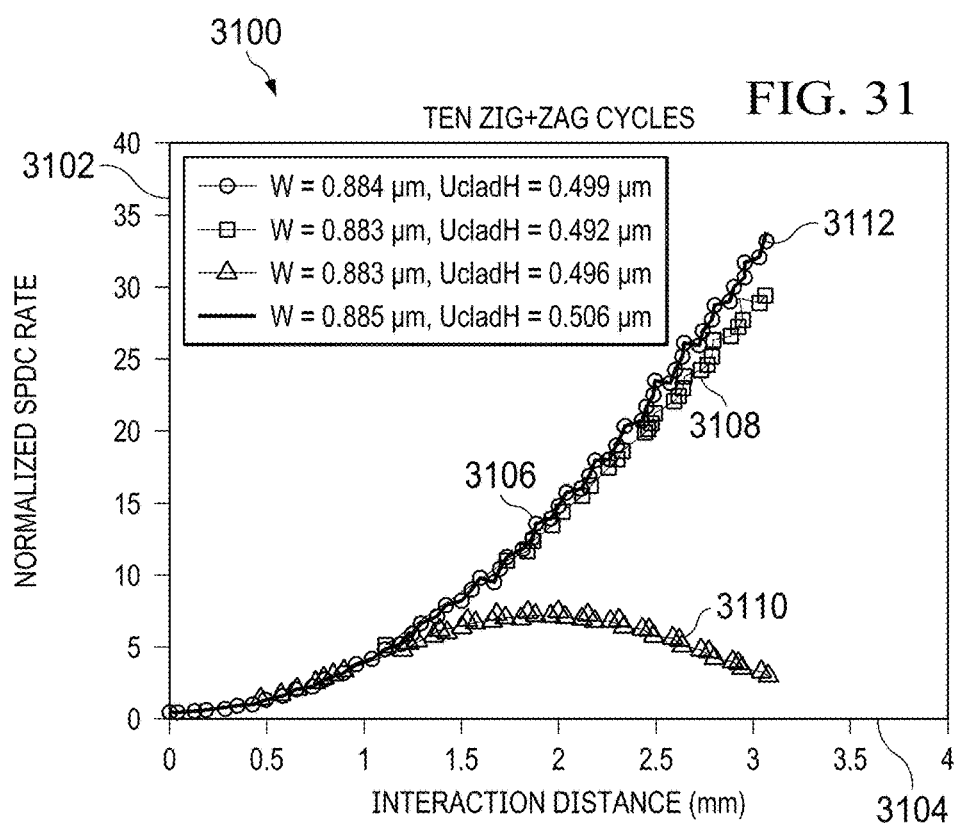
FIG. 31 is an illustration of a graph of a normalized spontaneous parametric down conversion (SPDC) rate in accordance with an illustrative embodiment.

With reference to FIG. 31, an illustration of a graph of a normalized spontaneous parametric down conversion (SPDC) rate is depicted in accordance with an illustrative embodiment. As depicted, graph 3100 illustrates a normalized spontaneous parametric down conversion rate as a function of interaction distance for nonlinear optical waveguide 2702 in FIG. 27. In this illustrative example, y-axis 3102 is normalized spontaneous parametric down conversion (SPDC) rate, and x-axis 3104 is the interaction distance in millimeters.

The different lines in graph 3100 represent the normalized spontaneous parametric down conversion rate for different strip widths for nonlinear optical waveguide 2702 in FIG. 27. The spontaneous parametric down conversion rates obtained for 10 zig plus zag cycles through the serpentine shape of nonlinear optical waveguide 2702 are shown in these lines. As depicted, line 3106 is for a strip width of 0.884 µm with an upper cladding height of 0.499 µm; line 3108 is for a strip width of 0.883 µm with an upper cladding height of 0.492 µm; line 3110 is for a strip width of 0.883 µm with an upper cladding height of 0.496 µm; and line 3112 is for a strip width of 0.885 µm with an upper cladding height of 0.506 µm. Thus, for each value of the strip width, there is a different value for the upper cladding height that results in a higher spontaneous parametric down conversion generation rate. For those examples having a more optimal choice of waveguide parameters, such as indicated by line 3106, line 3108, and line 3112, the normalized spontaneous parametric down conversion generation rate continues to increase as the number of zig-zag cycles and thus the overall interaction distance increases.

Similar to nonlinear optical waveguide 2202 in FIG. 22 with only curved segments, the serpentine path in nonlinear optical waveguide 2702 in FIG. 27 with both curved and straight segments can have one of its cross-sectional waveguide parameters adjusted to compensate for a change in another cross-sectional waveguide parameter.

As depicted in graph 3100 in FIG. 31, adjustments can be made to an upper cladding height. In graph 3100, a combination of a strip width and an upper cladding height can be optimized to obtain a net spontaneous parametric down conversion generation that continues to be coherent over many zig-zag cycles and to have desired levels of spontaneous parametric down conversion photon-generation rates, or spontaneous parametric down conversion efficiency. For example, the spontaneous parametric down conversion efficiency is improved for a waveguide with strip width of 0.883 µm by changing the upper cladding height from 0.496 µm to 0.492 µm, as illustrated by comparing lines 3110 and 3108 in graph 3100.

In the illustrative example, a determination can be made as to whether the phase walk-off is sufficiently close. This determination can be made using the value for the normalized spontaneous parametric down conversion rate obtained for that phase walk-off and whether that normalized spontaneous parametric down conversion rate is considered to be acceptable in a particular implementation. As a result, a value for the phase walk-off can be sufficiently close, but another value for the phase walk-off can be even closer.

In the depicted example, the straight segment in nonlinear optical waveguide 2702 can produce a large change in the phase walk-off. Graph 2800 in FIG. 28 also shows that the waveguide parameters can be chosen such that the phase walk-off due to the straight segments can be quite small as compared to the phase walk-off due to the curved segments of a zig or a zag. As depicted in graph 2800, this regime of operation occurs when the strip width is approximately 0.859 µm. The phase walk-off due to the curved segments is not equal to +π or to −π in graph 2800. However, the phase walk-off can still be close to being an odd multiple of π, such as −3π.

Turning next to FIG. 32, an illustration of a graph of a phase walk-off is depicted in accordance with an illustrative embodiment. As depicted, graph 3200 illustrates a phase walk-off as a function of interaction distance for nonlinear optical waveguide having a serpentine path, such as nonlinear optical waveguide 2702 in FIG. 27. In this illustrative example, y-axis 3202 is phase walk-off in radians, and x-axis 3204 is interaction distance in millimeters.

The different lines in graph 3200 represent a phase walk-off for different waveguide strip widths and for different lengths of straight segments in a nonlinear optical waveguide. As depicted, line 3206 depicts an incremental phase walk-off for a strip width of 0.884 µm with a straight segment length of 75.44 µm; line 3208 depicts an accumulated phase walk-off for a strip width of 0.884 µm with a line segment length of 75.44 µm; line 3210 depicts an incremental phase walk-off for a strip width of 0.859 µm with a line segment length of 631.7 µm; and line 3212 depicts an accumulated phase walk-off for a strip width of 0.859 µm with a line segment length of 631.7 µm. The data plotted in lines 3206 and 3208 of graph 3200 is the same as the data plotted in lines 3006 and 3008 of graph 3000 in FIG. 30.

In this depicted example, line 3210 and line 3212 in graph 3200 show the phase walk-off obtained for the first zig-zag cycle of a nonlinear optical waveguide having a serpentine path with a straight segment having a strip width of 0.859 µm and curved segments with 25 µm radius of curvature. The length of the straight segment in this example is 631.7 µm and can be selected to achieve a net phase walk-off at the end of the zig portion that is nearly exactly −3π radians. This phase walk-off is due solely to the curved segments of the zig portion. As illustrated by line 3210, the incremental phase walk-off for the straight segment of the zig portion, and also for the straight segment of the zag portion, is almost exactly zero.

The phase walk-off in the straight segment of nonlinear optical waveguide 2702 in FIG. 27 having a serpentine path with a strip width of 0.859 µm is much smaller than 180 degrees. The 631.7 µm length of this straight segment is much smaller than the coherent interaction length, ~4,457 µm, for that straight nonlinear optical waveguide.

As a result, the spontaneous parametric down conversion increases as the square of the interaction distance in the straight segment, as depicted in FIG. 33. In the illustrative example, FIG. 33 is an illustration of a graph of a normalized spontaneous parametric down conversion rate depicted in accordance with an illustrative embodiment. As depicted, graph 3300 illustrates a normalized spontaneous parametric down conversion rate as a function of interaction distance for a nonlinear optical waveguide having a serpentine path, such as nonlinear optical waveguide 2702 in FIG. 27. In this illustrative example, y-axis 3302 is normalized spontaneous parametric down conversion rate in photons per second or in a unit of power such as Watts, and x-axis 3304 is the interaction distance in millimeters.

The different lines in graph 3300 represent normalized spontaneous parametric down conversion rates for different waveguide strip widths and different lengths for the straight segments in a serpentine nonlinear optical waveguide. As depicted, line 3306 depicts a normalized spontaneous parametric down conversion rate for a strip width of 0.884 µm with a line segment length of 75.44 µm; and line 3308 depicts a normalized spontaneous parametric down conversion rate for a strip width of 0.859 µm with a line segment length of 631.7 µm.

Each straight segment in nonlinear optical waveguide 2702 in FIG. 27 essentially can act like a nonlinear optical waveguide with close-to-perfect modal phase matching. The directional phase matching allows successive zig and zag segments to function substantially like one longer waveguide having their combined lengths, as also depicted in graph 3300 in FIG. 33.

Direction-reversal enhanced coherent interaction allows the overall interaction distance in a serpentine waveguide, such as nonlinear optical waveguide 2702 in FIG. 27, to be much larger than the coherent interaction length of the straight waveguide segment. This enhancement of the interaction distance is a result of the resetting of the phase walk-off to exactly a multiple of $2\pi$ after each cycle due to the combined phase walk-offs of the curved segments and the straight segments of a cycle.

Figure 34:
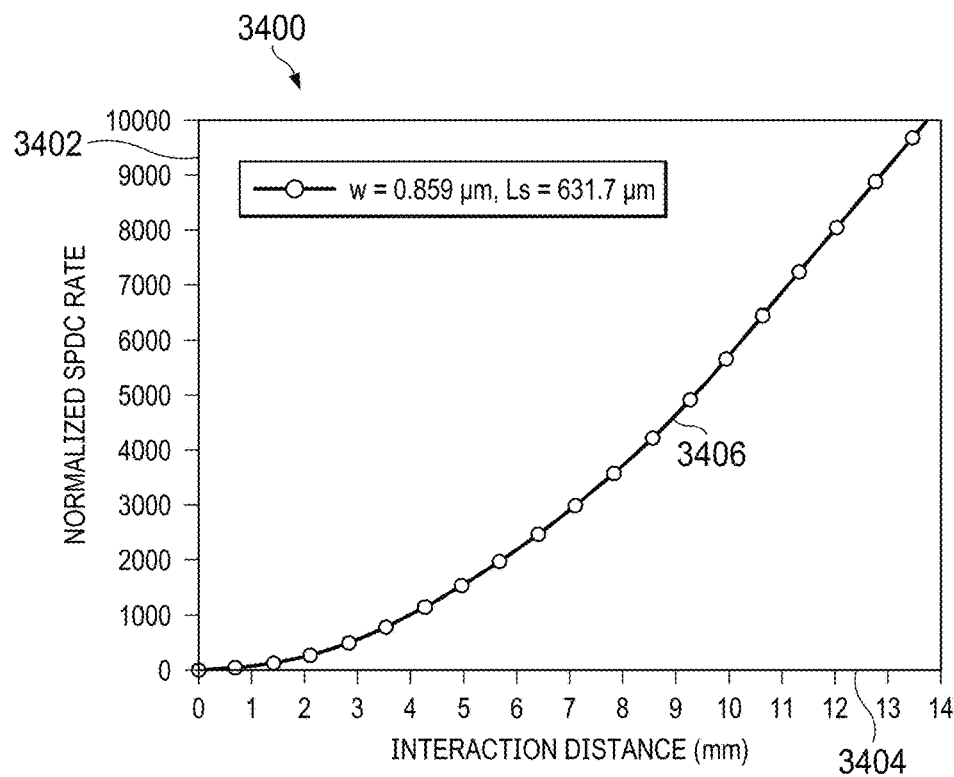
FIG. 34 is an illustration of a graph of a normalized spontaneous parametric down conversion rate in accordance with an illustrative embodiment.

Turning next to FIG. 34, an illustration of a graph of a normalized spontaneous parametric down conversion rate is depicted in accordance with an illustrative embodiment. As depicted, graph 3400 illustrates a normalized spontaneous parametric down conversion rate as a function of interaction distance for a nonlinear optical waveguide having a serpentine path, such as nonlinear optical waveguide 2702 in FIG. 27. In this illustrative example, y-axis 3402 is normalized spontaneous parametric down conversion rate in photons per second or in a unit of power such as Watts, and x-axis 3404 is the interaction distance in millimeters.

Line 3406 in graph 3400 represents the normalized spontaneous parametric down conversion rate in a nonlinear optical waveguide for a strip width of 0.859 µm with a line segment length of 651.7 µm.

In FIG. 34, the normalized spontaneous parametric down conversion photon-generation rate (or efficiency) that is obtained after 10 zig-zag cycles is shown. This spontaneous parametric down conversion generation rate is more than 18 times higher than the maximum spontaneous parametric down conversion generation rate for a single straight nonlinear optical waveguide with a 0.859 µm strip width.

Thus, the result shown in graph 3400 illustrates a benefit of using a nonlinear optical waveguide with directional phase matching that occurs from direction-reversal enhanced coherent interaction as compared to a waveguide that uses only modal phase matching.

Other components in an optical waveguide structure having directional phase matching include optical couplers. Optical couplers can be present between a nonlinear optical waveguide and the input and output optical waveguides used with a nonlinear optical waveguide.

For example, an optical coupler can be used to couple a pump input optical waveguide to a nonlinear optical waveguide. For example, input optical coupler 601 can be used to couple pump light from pump input optical waveguide 604 to nonlinear optical waveguide 602 in FIG. 6. In this example, input optical coupler 601 can couple the pump light into the nonlinear optical waveguide 602. As another example, the output optical coupler 603 can be configured to couple only the pump light and not couple the signal light and the idler light from nonlinear optical waveguide 602 out to output optical waveguide 606.

Figure 35:
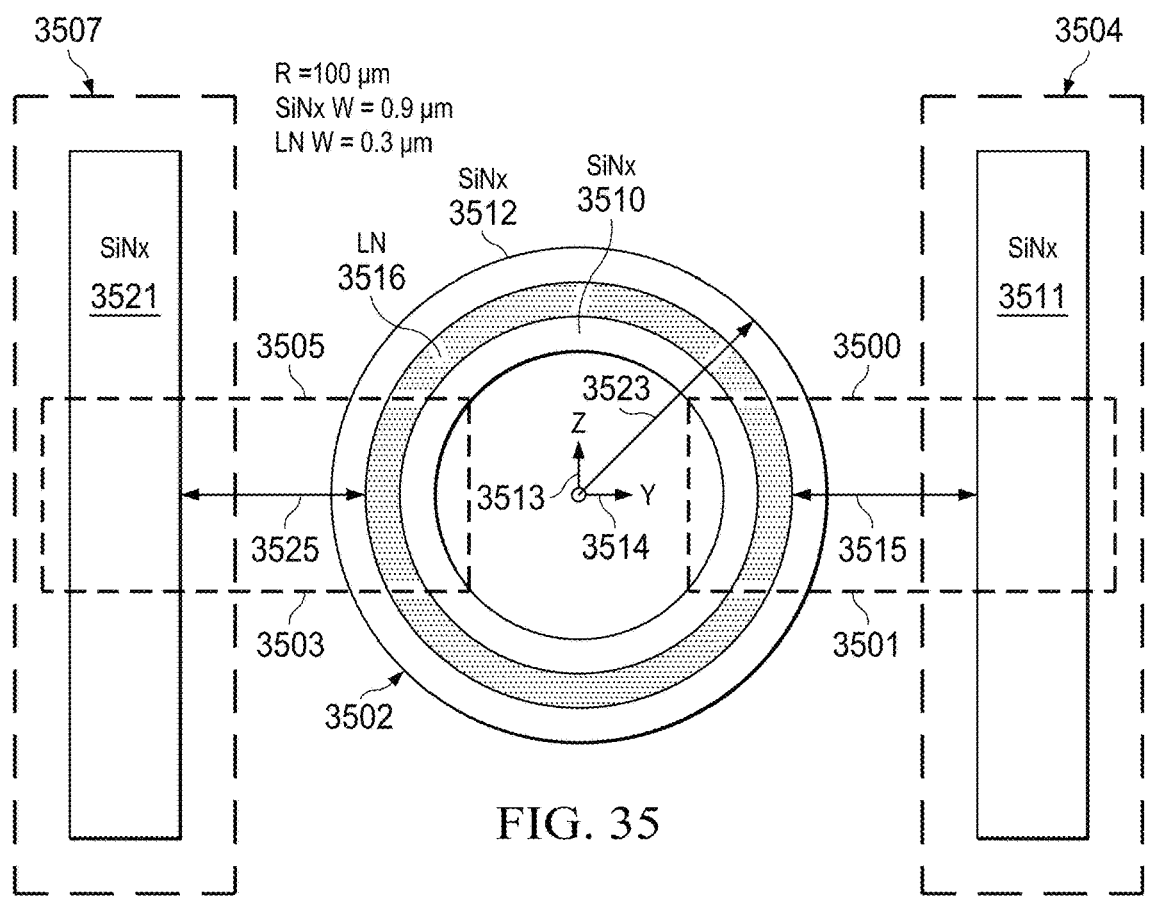
FIG. 35 is an illustration of optical couplers used to couple a pump input optical waveguide to a nonlinear optical waveguide and to couple output light from the nonlinear optical waveguide to an output optical waveguide in accordance with an illustrative embodiment.

Turning next to FIG. 35, an illustration of optical couplers used to couple a pump input optical waveguide to a nonlinear optical waveguide and output light from the nonlinear optical waveguide to an output optical waveguide is depicted in accordance with an illustrative embodiment. FIG. 35 depicts a cross-sectional top view of waveguide structures as taken by a plane that intersects through core regions of both nonlinear optical waveguide 3502, input optical waveguide 3504, and output optical waveguide 3507 with the structure viewed from above (perpendicular to that plane).

In this illustrative example, input optical coupler 3500 is defined by region 3501 in this figure. As depicted, input optical coupler 3500 lies on an yz plane defined by z-axis 3513 and y-axis 3514. Input optical coupler 3500 is formed by a portion of nonlinear optical waveguide 3502 and a portion of input optical waveguide 3504. In this example, input optical coupler 3500 is indicated by the portions of these two waveguides that are within region 3501.

As depicted, output optical coupler 3503 is defined by region 3505 in this figure. As depicted, output optical coupler 3503 lies on an yz plane defined by z-axis 3513 and y-axis 3514. Output optical coupler 3503 is formed by a portion of nonlinear optical waveguide 3502 and a portion of output optical waveguide 3507. In this example, output optical coupler 3503 is indicated by the portions of these two waveguides that are within region 3505. As depicted, nonlinear optical waveguide 3502 has a circular configuration with radius 3523, which is 100 µm in this example. In this illustrative example, nonlinear optical waveguide 3502 has a waveguide core region that is comprised of ring 3510, ring 3516, and ring 3512. Ring 3510 is comprised of silicon nitride (SiNx) and has a width of 0.3 µm; ring 3516 is comprised of lithium niobate (LN) and has a width of 0.3 µm; and ring 3512 is comprised of silicon nitride (SiNx) and has a width of 0.3 µm.

Input optical waveguide 3504 has core region 3511 comprised of silicon nitride (SiNx). For input optical coupler 3500, core region 3511 of input optical waveguide 3504 and core region comprising portions of ring 3512, ring 3516, and ring 3510 of nonlinear optical waveguide 3502 are separated by gap 3515. Nonlinear optical waveguide 3502 and input optical waveguide 3504 share the same cladding material in gap 3515.

Output optical waveguide 3507 has core region 3521 comprised of silicon nitride (SiNx). For output optical coupler 3503, core region 3521 of output optical waveguide 3507 and core region comprising portions of ring 3612, ring 3516, and ring 3510 of nonlinear optical waveguide 3502 are separated by gap 3525. Nonlinear optical waveguide 3502 and output optical waveguide 3507 share the same cladding material in gap 3525. In this illustrative example, gap 3525 can be a different distance from gap 3515. In other words, the distance feature can depend on the particular characteristics desired for coupling light.

The cross-sectional illustration of nonlinear optical waveguide 800 depicted in FIG. 8 can represent a cross-sectional side view of a portion of nonlinear optical waveguide 3502 in input optical coupler 3500 in FIG. 35. In input optical coupler 3500, a part of the core region comprising parts of ring 3510, ring 3516, and ring 3512 can be represented by side region 810, central region 804, and side region 812 in FIG. 8. A part of upper cladding 808 can be located between these regions and core region 3511 of input optical waveguide 3504. The core regions of both nonlinear optical waveguide 3502 and input optical waveguide 3504 can be located above lower cladding 806 in FIG. 8.

The coupling of light between nonlinear optical waveguide 3502 and input optical waveguide 3504 can depend on the cross-sectional dimensions of their core regions in input optical coupler 3500, on the size or width of gap 3515, and on the overall length of input optical coupler 3500. In a general optical coupler, these dimensions can vary along the length direction of the optical coupler.

In this illustrative example, input optical coupler 3500 can couple pump light between input optical waveguide 3504 and nonlinear optical waveguide 3502. The pump light has a wavelength of 655 nm.

Figure 36:
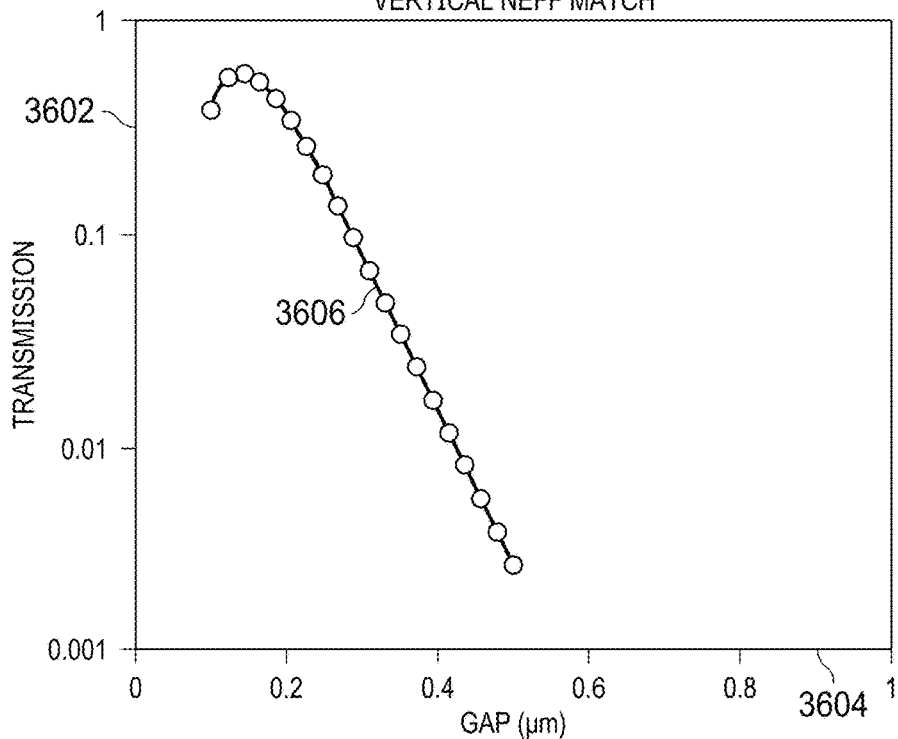
FIG. 36 is an illustration of a graph of a pump light transmission in accordance with an illustrative embodiment.

With reference now to FIG. 36, an illustration of a graph of a pump light transmission is depicted in accordance with an illustrative embodiment. As depicted, graph 3600 illustrates a pump light transmission as a function of the size or width of gap 3515 between the core region of nonlinear optical waveguide 2702 and the core region of pump input optical waveguide 2704 in FIG. 27 operating as a pump input optical waveguide. In this illustrative example, y-axis 3602 is pump light transmittance or normalized transmission, which has a maximum value of 1, and x-axis 3604 is the gap size in micrometers.

Line 3606 in graph 3600 represents the transmittance or normalized power coupling of pump light, having a wavelength of 655 nm, from input optical waveguide 3504 to nonlinear optical waveguide 3502 in FIG. 35. Since an optical coupler is a reciprocal device, line 3606 can also represent the transmittance of pump light from the nonlinear optical waveguide 3502 back to the input optical waveguide 3504 in FIG. 35.

As depicted, input optical coupler 3500 couples 655 nm light that is in the fundamental $TE_{11}$ mode of input optical waveguide 3504 when configured as a pump input optical waveguide into the TE31 mode of nonlinear optical waveguide 3502. In some implementations, input optical coupler 3500 can provide coupling such that as much pump power from input optical waveguide 3504 operating as a pump input optical waveguide is supplied into nonlinear optical waveguide 3502 as is lost from nonlinear optical waveguide 3502. Power can be lost by mechanisms such as absorption, scattering, and nonlinear optical frequency conversion. The amount of pump light coupled (or transmitted) into nonlinear optical waveguide 3502 depends on the width of the gap between input optical waveguide 3504 configured to operate as a pump input optical waveguide and nonlinear optical waveguide 3502, as illustrated in FIG. 36.

Input optical waveguide 3504 comprises a material with a nonlinear optical coefficient that is small compared to the nonlinear optical coefficient of the nonlinear optical material in nonlinear optical waveguide 3502. Thus, the nonlinear optical interaction that generates at least one of an idler light or a signal light from the pump light occurs only in nonlinear optical waveguide 3502 and does not occur in input optical waveguide 3504. An example of a material with a weak nonlinear optical coefficient is silicon nitride or aluminum oxide. In comparison, the center region of the core region of nonlinear optical waveguide 3502 can comprise lithium niobate, which has a much larger nonlinear optical coefficient. The constraints on the optical coupler for the output waveguide of a nonlinear optical waveguide structure can depend on whether that nonlinear optical waveguide structure has a closed loop configuration, such as the circular ring illustrated in FIG. 14 or the racetrack-shaped ring illustrated in FIG. 7, or has an open configuration, such as the serpentine waveguide illustrated in FIG. 6.

Figure 37:
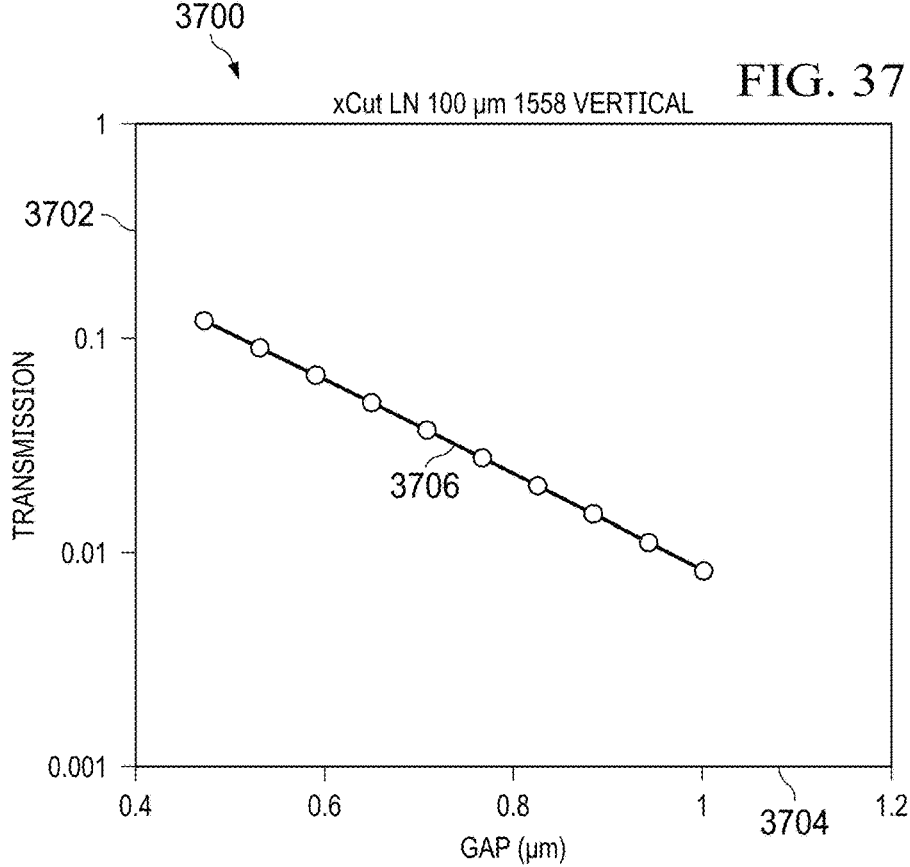
FIG. 37 is an illustration of a graph of an output light transmission in accordance with an illustrative embodiment.

With reference now to FIG. 37, an illustration of a graph of an output light transmission is depicted in accordance with an illustrative embodiment. As depicted, graph 3700 illustrates an output light transmission as a function of gap size or width of output optical waveguide 3507 in FIG. 35. In this illustrative example, y-axis 3702 is normalized idler light transmittance, and x-axis 3704 is the gap size in micrometers.

Line 3706 in graph 3700 represents the transmittance of an output light of 1558 nm wavelength from an optical coupler. In this example, input optical coupler 3500 in FIG. 35 couples a circular ring nonlinear optical waveguide having a 100 µm radius, such as nonlinear optical waveguide 3502 illustrated in FIG. 35 to an output optical waveguide. For this illustrative example, output optical waveguide 3507 can be an output optical waveguide with core region 3521 comprising silicon nitride, like core region 3511 of input optical waveguide 3504, but having a different width than that of output optical waveguide 3507. Core region 3521 of output optical waveguide 3507 is separated from ring 3512 of nonlinear optical waveguide 3502 by gap 3525.

The output light coupled by input optical coupler 3500 can be at least one of a 1558 nm idler light or a 1130 nm signal light. Line 3706 in graph 3700 illustrates that the coupling of the light at a 1558 nm wavelength by this exemplary optical coupler becomes weaker in an exponential manner as the gap size is increased.

When the nonlinear optical waveguide structure has a closed-loop configuration, output optical coupler 3503 can extract a percentage of the signal light or the idler light from nonlinear optical waveguide 3502 having a ring-shape and into output optical waveguide 3506, and leave the rest of the signal light or the idler light to continue propagating in the closed-loop or ring-shape of nonlinear optical waveguide 3502.

In the illustrative example, the amount of light output optical coupler 3503 is designed to leave in the ring-shape of nonlinear optical waveguide 3502 depends on the desired optical loss limited propagation distance in the nonlinear optical waveguide 3502. That loss-limited interaction distance can be approximately equal to the interaction distance limited by the accuracy with which the phase walk-off is achieved as discussed with reference to FIG. 21. The loss of the signal light or the idler light from a ring-shaped nonlinear optical waveguide can be caused by both the coupling of the light out through the output coupler and by other loss mechanisms such as absorption and scattering of the signal light or the idler light while the signal light or the idler light circulates around the nonlinear optical waveguide.

The amount of light coupled can depend on what percentage of coupling is desired for a particular implementation. In an illustrative example, four optical couplers, input optical coupler 701, input optical coupler 703, output optical coupler 705, and output optical coupler 707 are present in optical waveguide structure 700 in FIG. 7. With this example, input optical coupler 701 can be designed to couple or transmit a certain percentage of the input pump light from pump input optical waveguide 704 into nonlinear optical waveguide 702. The design of input optical coupler 701 can be similar to the design illustrated in FIG. 35 for input optical coupler 3500. For this example, output optical coupler 705 is intended to couple signal light out from nonlinear optical waveguide 702 to output optical waveguide 708. Also, output optical coupler 707 is intended to couple idler light out from nonlinear optical waveguide 702 to output optical waveguide 710.

Figure 38:
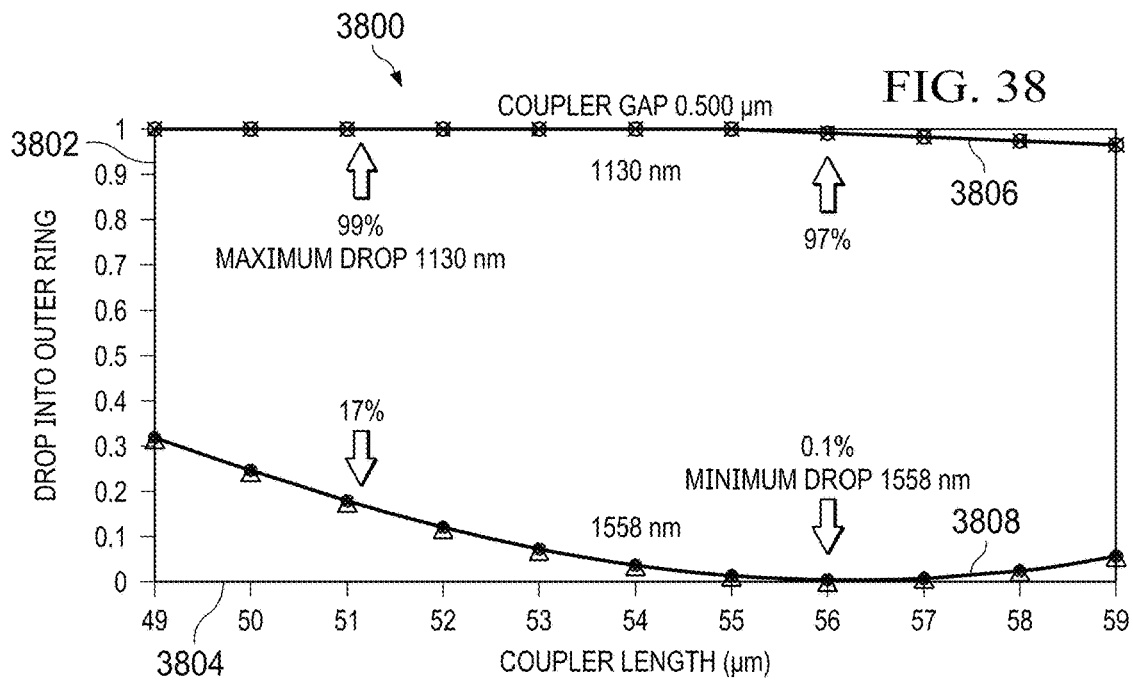
FIG. 38 is an illustration of a graph of a coupled transmittance of light from a nonlinear optical waveguide to an output waveguide in accordance with an illustrative embodiment.

Additionally, output optical coupler 705 and output optical coupler 707 in FIG. 7 can be configured such that only the light of the desired wavelength is coupled out and the light of the other two wavelengths is not coupled out. As discussed previously with reference to FIG. 36, an optical coupler for the pump light can be designed to couple light of the 655 nm pump wavelength, but have minimal coupling of the 1130 nm signal wavelength and minimal coupling of the 1558 nm idler wavelength. With reference next to FIG. 38, an illustration of a graph of a coupled transmittance of light from a nonlinear optical waveguide to an output waveguide is depicted in accordance with an illustrative embodiment. As depicted, graph 3800 illustrates a coupled transmittance into an output waveguide as a function of couple length of an optical coupler. In this illustrative example, y-axis 3802 is normalized coupled transmittance (dimensionless), and x-axis 3804 is coupler length in micrometers.

As depicted in this illustrative example, a coupler gap of 0.500 µm is present between the core region of the nonlinear optical waveguide, such as nonlinear optical waveguide 800 in FIG. 8, and the core of the output waveguide. The output waveguide can have a core region comprising a material such as silicon nitride or titanium dioxide. For the illustrative example of FIG. 38, the core region of the output waveguide comprises silicon nitride.

As depicted, line 3806 in graph 3800 represents the coupled transmittance for a signal light having a wavelength of 1130 nm. Line 3808 in graph 3800 represents the coupled transmittance for an idler light having a wavelength of 1558 nm.

As illustrated in graph 3800, output optical coupler 705 in FIG. 7 can be designed to be wavelength-selective. For example, output optical coupler 705 can couple out 1130 nm signal light from nonlinear optical waveguide 702 into output optical waveguide 3608. Further, output optical coupler 705 can couple 1558 nm idler light or 655 nm pump light at a much lower percentage.

For example, when output optical coupler 705 has a coupler length of about 51 µm, the coupled transmittance of the 1130 nm signal light between nonlinear optical waveguide 702 and output optical waveguide 708 is about 99 percent, as shown in line 3806.

In the depicted example, a coupler length of about 56 µm can be selected to obtain a coupled transmittance for the 1558 nm idler light of only 0.1%, as depicted in line 3808. With a coupler length 56 µm, the coupled transmittance for the 1130 nm signal light is about 97%, as shown in line 3806.

Thus, the coupler length for output optical coupler 705 can be selected in a manner that obtains a desired level of coupling for at least one of a signal light or an idler light as depicted in graph 3800. A selection of coupler lengths can also be made to obtain a desired amount of pump light from output optical coupler 705.

The illustrative examples of an optical waveguide structure with directional phase matching can involve an open, as opposed to closed-loop, nonlinear optical waveguide, such as the serpentine path depicted for nonlinear optical waveguide 602 in FIG. 6. Nonlinear optical waveguide 602 can also be described as having a zig-zag path.

With a serpentine path or zigzag path, the output optical waveguides can be located near the end of the nonlinear optical waveguide. The optical coupler for coupling the signal light or the idler light into its output optical waveguide can be designed to couple as much of the signal light or the idler light as possible into the output optical waveguide because the signal and idler light do not need to recirculate in the nonlinear optical waveguide having an open path for those wavelengths of light.

Figure 39:
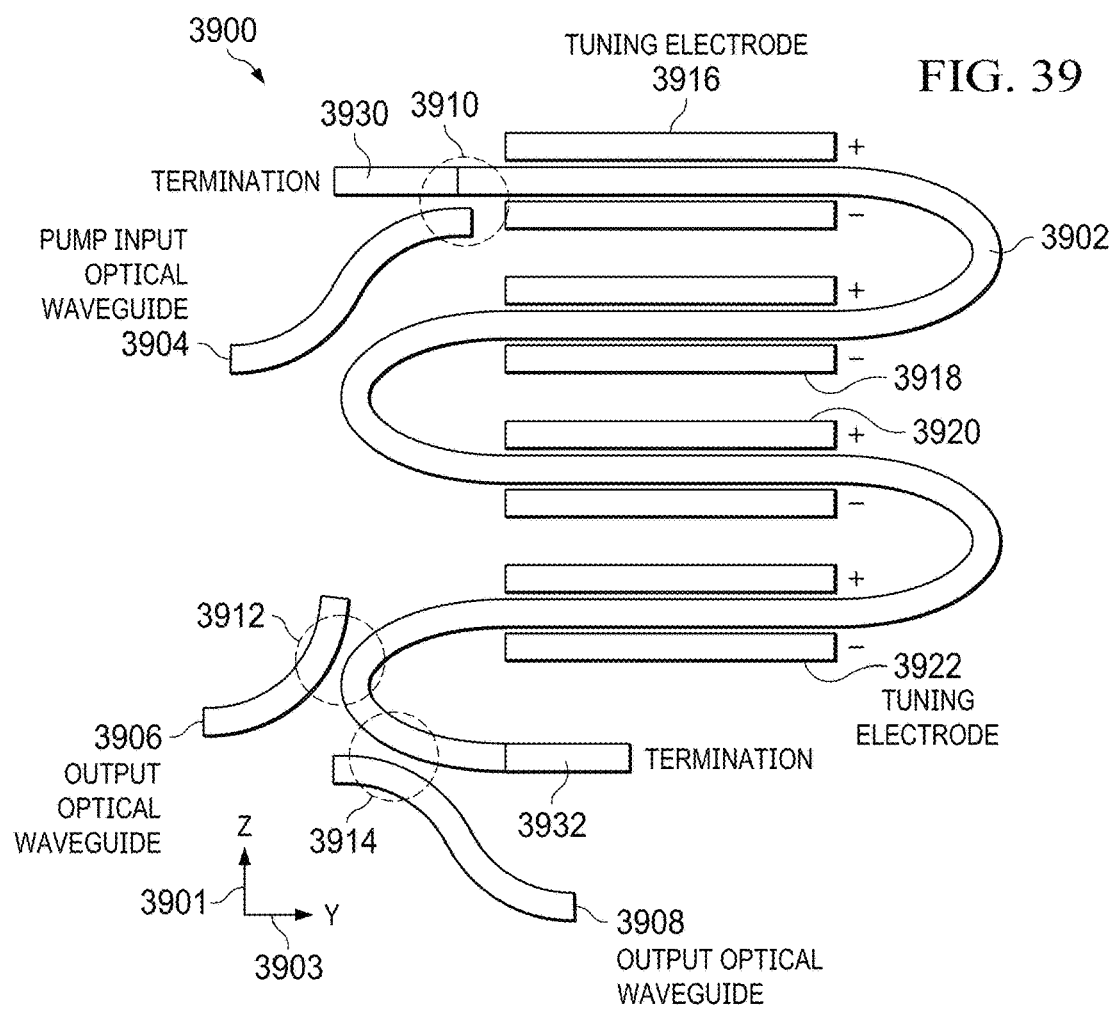
FIG. 39 is an illustration of an optical waveguide structure in accordance with an illustrative embodiment.

Turning next to FIG. 39, an illustration of an optical waveguide structure is depicted in accordance with an illustrative embodiment. In this illustrative example, optical waveguide structure 3900 comprises nonlinear optical waveguide 3902, pump input optical waveguide 3904, output optical waveguide 3906, output optical waveguide 3908, optical coupler 3910, optical coupler 3912, and optical coupler 3914. In this illustrative example, optical waveguide structure 3900 also includes a set of phase shifters, such as tuning electrodes 3916, tuning electrodes 3918, tuning electrodes 3920, and tuning electrodes 3922.

In this illustrative example, nonlinear optical waveguide 3902 is a nonlinear optical waveguide with a serpentine path. This path can also be referred to as a zigzag path.

A pump light can be supplied from pump input optical waveguide 3904 via optical coupler 3910. Light can be output from nonlinear optical waveguide 3902 through output optical waveguide 3906 using optical coupler 3912 and through output optical waveguide 3908 using optical coupler 3914.

Additional light can be input and output of nonlinear optical waveguide 3902 using additional input and output optical waveguides. Each wavelength can be supplied or output through a single optical waveguide. In other illustrative examples, an optical waveguide can input or output multiple wavelengths of light.

In some illustrative examples, one or both ends of a nonlinear optical waveguide can have a termination region. For example, nonlinear optical waveguide 3902 has termination 3930 and termination 3932. In some illustrative examples, at least one of termination 3930 or termination 3932 in nonlinear optical waveguide 3902 can absorb the pump light and prevent recirculation of that pump light in nonlinear optical waveguide 3902.

In this illustrative example, nonlinear optical waveguide 3902 lies on an yz plane defined by z-axis 3901 and y-axis 3903.

For other examples, termination 3930 and termination 3932 can be reflecting terminations. In some illustrative examples, the reflecting terminations form an optical cavity for the pump light. Having the pump light confined within an optical cavity can increase the pump power that contributes to the nonlinear optical process and make that "intracavity" pump power much higher than the pump power that is supplied into the input optical waveguide for the pump light, such as a factor of 2 higher to more than a factor of 100 higher.

Nonlinear optical waveguide 702 in FIG. 7 and circular ring nonlinear optical waveguide 1402 in FIG. 14 have pump light, signal light, and idler light circulating in an optical cavity in the racetrack or circular ring. In contrast, in nonlinear optical waveguide 3902, only the pump light circulates in an optical cavity in nonlinear optical waveguide 3902. In this example, the signal light and the idler light do not circulate in nonlinear optical waveguide 3902. The signal light and the idler light make one pass through that waveguide.

In some illustrative examples, at least one of termination 3930 or termination 3932 in nonlinear optical waveguide 3902 can reflect the pump light. Examples of opticalfrequency (or wavelength) selective reflector regions that can be used in termination 3930 and termination 3932 include at least one of a waveguide loop mirror, a micro-ring waveguide resonator, a distributed feedback grating, or a photonic crystal structure.

In illustrative examples, a directional phase matching optical waveguide structure that has a serpentine or zig-zag nonlinear optical waveguide and has pump-wavelength selecting reflective terminations at each of the two ends of the nonlinear optical waveguide has a linear optical cavity for the pump light. The pump power in the nonlinear optical waveguide can be much higher than the pump power supplied to the nonlinear optical waveguide via the pump input optical waveguide. Optical waveguide structure 600 with nonlinear optical waveguide 602 in FIG. 6, optical waveguide structure 2200 with nonlinear optical waveguide 2202 in FIG. 22, optical waveguide structure 2700 with nonlinear optical waveguide 2702 in FIG. 27, and optical waveguide structure 3900 with nonlinear optical waveguide 3902 in FIG. 39 are examples of nonlinear optical waveguides that can have terminations in the illustrative examples.

In another example, a directional phase matching optical waveguide structure that has a ring, racetrack or other closed-loop nonlinear optical waveguide shape forms a closed path nonlinear optical waveguide that has an optical cavity for the pump light and also can have optical cavities for either or both of the signal light and the idler light. Optical waveguide structure 700 with nonlinear optical waveguide 702 in FIG. 7 and optical waveguide structure 1400 with circular ring nonlinear optical waveguide 1402 in FIG. 14 are examples of closed path nonlinear optical waveguides.

With a closed path nonlinear waveguide, the signal light and idler light also recirculate in that closed path optical cavity in the nonlinear optical waveguide. In this example, optical couplers can be used to extract the signal light and the idler light.

With an open path nonlinear optical waveguide having pump-wavelength reflecting terminations, only the pump light recirculates in that optical cavity. The signal light and the idler light are not reflected by the reflecting terminations and do not recirculate in this illustrative example.

Furthermore, the path length for one round trip through an optical cavity can determine the spectral density of the optical-cavity or resonator modes (i.e., how closely spaced in wavelength those resonator modes are). A nonlinear waveguide with a long round-trip path length has resonator modes that are more closely spaced in wavelength than a nonlinear waveguide with a shorter round-trip path length. The tuning electrodes in the nonlinear optical waveguide can be used to adjust the net phase shift of the pump light such that the pump wavelength is aligned with a resonator mode of the nonlinear optical waveguide cavity.

Thus, the illustrative examples provide an optical waveguide structure that comprises a nonlinear optical waveguide comprising a nonlinear optical material having a second order nonlinear coefficient that changes with a direction of light propagation. A first portion of the nonlinear optical waveguide in which a light propagating through the first portion is affected by a positive value of a second order nonlinear coefficient. A second portion of the nonlinear optical waveguide in which the light propagating through the first portion is affected by a negative value of a second order nonlinear coefficient, wherein a set of dimensions in the nonlinear optical waveguide in the first portion and the second portion is selected to cause the light to have a relative phase walk-off that is an odd multiple of 180 degrees.

In the illustrative examples, direction-reversal enhanced coherent interaction can match a phase walk-off that is an odd multiple of n radians to a reversal in the sign of the nonlinear optical coefficient. For a second order nonlinear optical process in the different illustrative examples, the nonlinear optical process involves 1 input photon (the pump photon) that produces 2 output photons (the signal photon and the idler photon). This nonlinear process is called spontaneous parametric down conversion (SPDC). Since the nonlinear optical processes are quite inefficient, most of the input pump photons are not converted to signal and idler photons. Thus, those "un-used" pump photons can be part of the output from a nonlinear optical waveguide.

Further, in the illustrative examples, additional structures can be present in the optical waveguide structure in addition to the nonlinear optical waveguide. These additional structures can be, for example, optical couplers that separate the pump light, the signal light, and the idler light into different output optical waveguides. In other words, each different type of light can be output into a different output optical waveguide.

The efficiency of the nonlinear optical process can be the inverse of the number of input photons of a given type of photons that are needed to produce one output photon or one pair of output photons as a result of their interaction with the nonlinear optical material. Examples of input photons can be pump photons, signal photons and idler photons. In the illustrative example, the output photon can be an idler photon or a signal photon. The pair of output photons can be a signal photon and an idler photon when spontaneous parametric down conversion is present.

FIGS. 16-18 illustrate the effect of a phase matching approach on the nonlinear optical generation in a nonlinear optical waveguide, such as circular ring nonlinear optical waveguide 1402 in FIG. 14. The results shown in graphs in FIGS. 16-18 also are relevant to the other configurations of the directional phase matching waveguide structure. The value of the nonlinear optical coefficient is shown in graph 1700 in FIG. 17. The nonlinear optical coefficient $D_{eff}$ (or $d_{eff}$) has a positive value when the direction of travel for the light is primarily along the −Y direction of the x-cut lithium niobate material (propagation angles between 30 and 150 degrees). The nonlinear optical coefficient has a negative value when the direction of travel for the light is primarily along the +Y direction of the x-cut lithium niobate material (propagation angles between 210 and 330 degrees).

In the illustrative example, the nonlinear optical generation is an interaction of the optical fields rather than the optical power. This interaction is illustrated in equation (2) above.

The nonlinear optical coefficient can be multiplied with the term $$\frac{e^{i\Delta kL} - 1}{i\Delta k}$$

describing the effect of the phase walk-off. This term has a sinusoidal dependence with the phase walk-off and can have positive or negative values. The nonlinear optical waveguides in the illustrative examples are constructed such that the sign of the nonlinear optical coefficient remains the same as the sign of this term or remains opposite to the sign of this term. Therefore, the multiplication of the nonlinear optical coefficient with this term gives a result whose value continues to have the same sign, rather than alternating between being positive and being negative. This result is illustrated in graph 1800 in FIG. 18.

Thus, the nonlinear optical generation efficiency (or generation rate) of at least one of the output signal or idler photons continues to increase as the interaction distance is increased, as illustrated in graph 1820 in FIG. 18. The graphs in FIGS. 23-26 and FIGS. 28-31 also illustrate this increase in the nonlinear optical generation efficiency (or generation rate), for other configurations of nonlinear optical waveguides.

Figure 40:
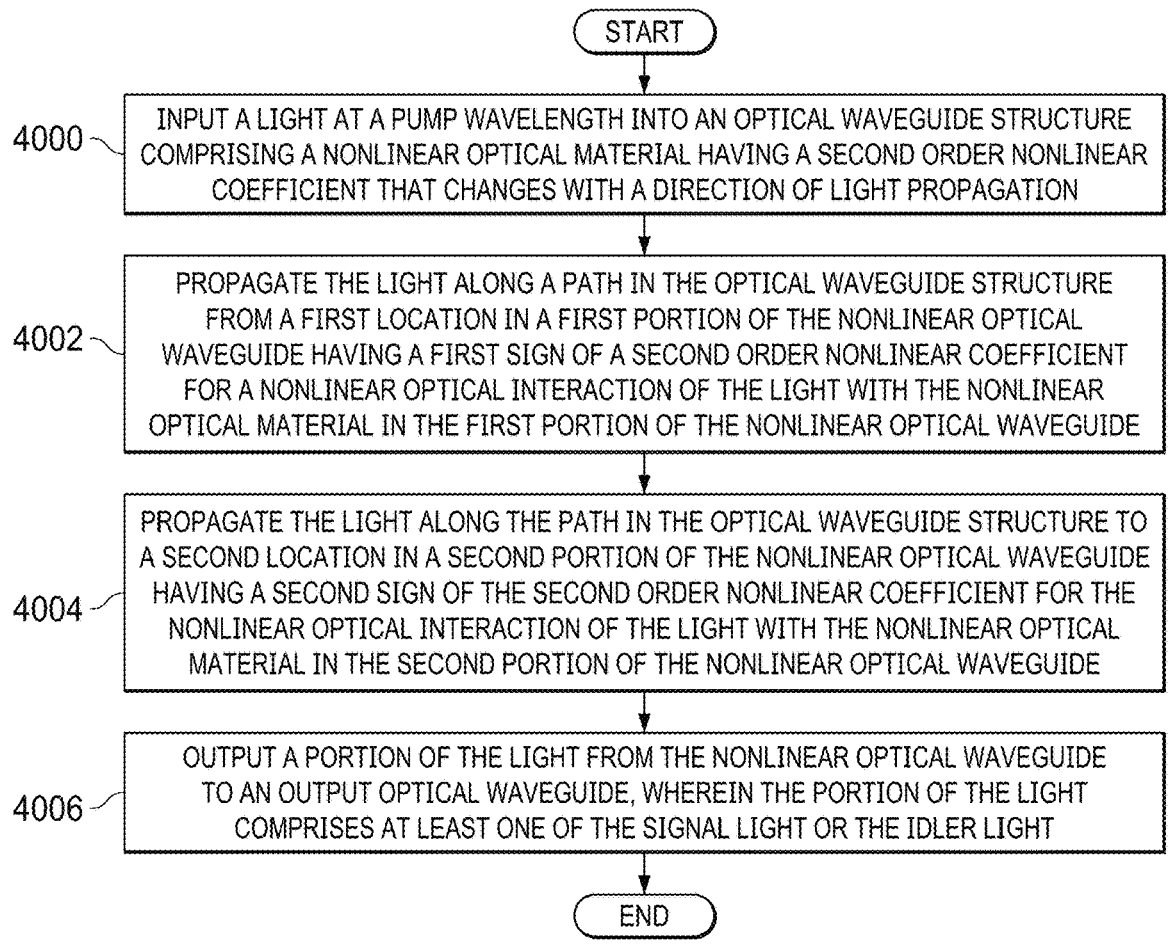
FIG. 40 is an illustration of a flowchart of a process for inputting light through an optical waveguide structure in accordance with an illustrative embodiment.

Turning next to FIG. 40, an illustration of a flowchart of a process for inputting light through an optical waveguide structure is depicted in accordance with an illustrative embodiment. The process in FIG. 40 can be implemented in physical waveguide structure such as nonlinear optical waveguide 102 in FIG. 1 in the different physical implementation shown in the different illustrative examples.

The process begins by inputting a light at a pump wavelength into an optical waveguide structure comprising a nonlinear optical material having a second order nonlinear coefficient that changes with a direction of light propagation (operation 4000). In operation, 4000, the light input into the nonlinear optical waveguide can be a pump light supplied by an input optical waveguide.

The process propagates the light along a path in the optical waveguide structure from a first location in a first portion of the nonlinear optical waveguide having a first sign of a second order nonlinear coefficient for a nonlinear optical interaction of the light with the nonlinear optical material in the first portion of the nonlinear optical waveguide (operation 4002). In operation 4002, the light propagated can have a pump wavelength. Also, in operation 4002, the light generation can occur at the first location to generate at least one of a signal light or idler light. For example, in operation 4002, at least one of a signal light or an idler light can be generated at the first location such that the light in the nonlinear optical interaction of the light with the nonlinear optical material in the second portion of the nonlinear optical waveguide comprises the pump light and at least one of the signal light or the idler light at the second location. In one illustrative example, the nonlinear optical interaction involves the light of the pump wavelength as well as the light of the signal wavelength and idler wavelength.

The process propagates the light along the path in the optical waveguide structure to a second location in a second portion of the nonlinear optical waveguide having a second sign of the second order nonlinear coefficient for the nonlinear optical interaction of the light with the nonlinear optical material in the second portion of the nonlinear optical waveguide (operation 4004). In operation 4004, the light propagated can have a pump wavelength. Further, in operation 4004, the interaction involves light of the pump wavelength as well as the light of the signal wavelength and the idler wavelength. The light generated in the first location in the nonlinear optical interaction occurring in the first portion of the nonlinear optical waveguide propagates to the second location in the second portion of the nonlinear optical waveguide and the nonlinear optical interactions occurring in the first location and in the second location have a phase walk-off that is an odd multiple of 180 degrees. In this example, the phase walk-off is for the nonlinear optical interaction occurring in the second location in the second portion of the nonlinear optical waveguide in which the phase walk-off is an odd multiple of 180 degrees.

A portion of the light is output from the nonlinear optical waveguide to an output optical waveguide, wherein the portion of the light comprises at least one of the signal light or the idler light (operation 4006). The process terminates thereafter.

Further, in propagating the light on the path through the nonlinear optical waveguide, a configuration of nonlinear optical waveguide can be selected such that a peak in a magnitude of the second order nonlinear coefficient is aligned with a phase walk-off of an odd multiple of $\pi/2$ radians. The alignment of the peak in the magnitude of the second order nonlinear coefficient with the phase walk-off of an odd multiple of $\pi/2$ radians can be within $\pi/4$ radians. Other amounts of alignment can be used in other illustrative examples.

In the flowchart in FIG. 40, at least one of a signal light or an idler light can be generated at the first location such that the light in the nonlinear optical interaction of the light with the nonlinear optical material in the second portion of the nonlinear optical waveguide comprises the pump light and at least one of the signal light or the idler light at the second location. The interaction can involve the light of the pump wavelength as well as the light of the signal wavelength and the idler wavelength.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 41:
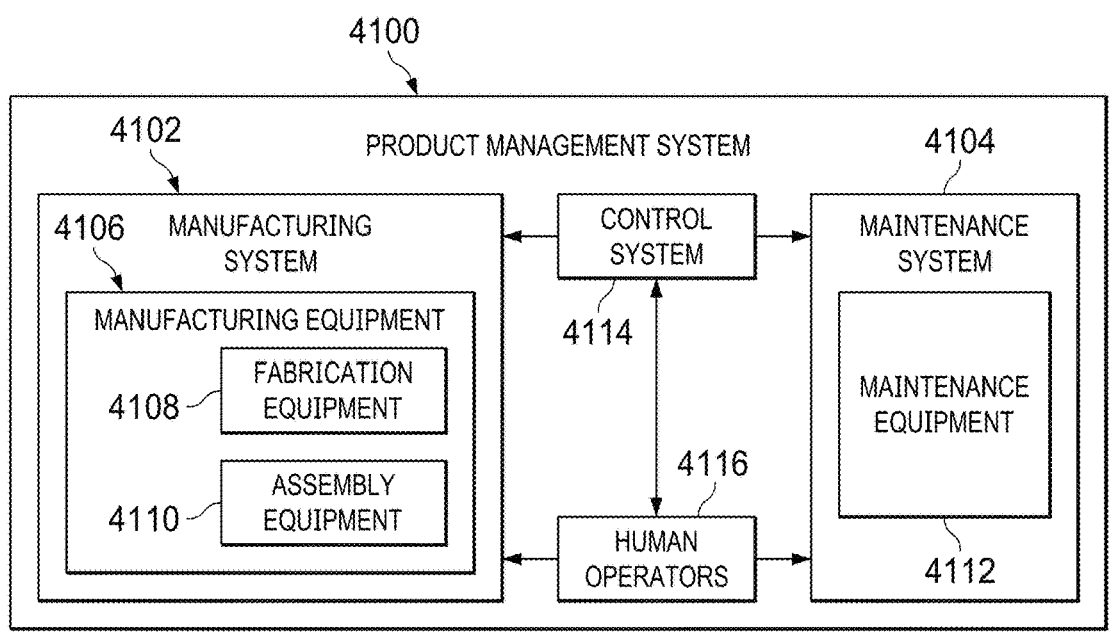
FIG. 41 is an illustration of a block diagram of a product management system in accordance with an illustrative embodiment.

Turning now to FIG. 41, an illustration of a block diagram of a product management system is depicted in accordance with an illustrative embodiment. Product management system 4100 is a physical hardware system. In this illustrative example, product management system 4100 includes at least one of manufacturing system 4102 or maintenance system 4104.

Manufacturing system 4102 is configured to manufacture products. As depicted, manufacturing system 4102 includes manufacturing equipment 4106. Manufacturing equipment 4106 includes at least one of fabrication equipment 4108 or assembly equipment 4110.

Fabrication equipment 4108 is equipment that used to fabricate the nonlinear optical waveguide structure. Multiple copies or multiple versions of nonlinear optical waveguide structures can be fabricated on a substrate wafer. For example, both closed-loop structures such as those depicted in FIG. 6 and FIG. 14 and FIG. 35 as well as open structures, such as those depicted in FIG. 7, FIG. 38, FIG. 22, FIG. 27, can be fabricated on the same substrate wafer. The substrate wafer can comprise a material such as silicon or lithium niobate or quartz or sapphire or silicon carbide. Fabrication equipment 4108 can be used to fabricate at least one of optical waveguide structures, nonlinear optical waveguides, laser transmitters, ultraviolet transmission systems, point-to-point communication devices, laser infrared countermeasure sources, through water optical communication devices, or other suitable devices, antennas, or other suitable types of parts.

For example, fabrication equipment 4108 can include machines and tools. With respect to fabricating semiconductor components and optical waveguide components, fabrication equipment 4108 can comprise at least one of an epitaxial reactor, an oxidation system, a diffusion system, an etching system, a cleaning system, a bonding machine, a dicing machine, a wafer saw, an ion implantation system, a physical vapor deposition system, a chemical vapor deposition system, a photolithography system, an electron-beam lithography system, a plasma etcher, a die attachment machine, a wire bonder, a die overcoat system, molding equipment, a hermetic sealer, an electrical tester, a burn-in oven, a retention bake oven, a UV erase system, or other suitable types of equipment that can be used to manufacture semiconductor structures.

Assembly equipment 4110 is equipment used to assemble parts to form a product such as a chip, an integrated circuit, a computer, an aircraft, or some other product. Assembly equipment 4110 also can include machines and tools. These machines and tools may be at least one of a robotic arm, a spinner system, a sprayer system, an elevator system, a rail-based system, or a robot.

In this illustrative example, maintenance system 4104 includes maintenance equipment 4112. Maintenance equipment 4112 can include any equipment needed to perform maintenance on and evaluation of a product. Maintenance equipment 4112 may include tools for performing different operations on parts on a product. These operations can include at least one of disassembling parts, refurbishing parts, inspecting parts, reworking parts, manufacturing replacement parts, or other operations for performing maintenance on the product. These operations can be for routine maintenance, inspections, upgrades, refurbishment, or other types of maintenance operations.

In the illustrative example, maintenance equipment 4112 may include optical inspection devices, x-ray imaging systems, surface-profile measurement systems, drills, vacuum leak checkers, and other suitable devices. In some cases, maintenance equipment 4112 can include fabrication equipment 4108, assembly equipment 4110, or both to produce and assemble parts that needed for maintenance.

Product management system 4100 also includes control system 4114. Control system 4114 is a hardware system and may also include software or other types of components. Control system 4114 is configured to control the operation of at least one of manufacturing system 4102 or maintenance system 4104. In particular, control system 4114 can control the operation of at least one of fabrication equipment 4108, assembly equipment 4110, or maintenance equipment 4112.

The hardware in control system 4114 can be implemented using hardware that may include computers, circuits, networks, and other types of equipment. The control may take the form of direct control of manufacturing equipment 4106. For example, robots, computer-controlled machines, and other equipment can be controlled by control system 4114. In other illustrative examples, control system 4114 can manage operations performed by human operators 4116 in manufacturing or performing maintenance on a product. For example, control system 4114 can assign tasks, provide instructions, display models, or perform other operations to manage operations performed by human operators 4116. In these illustrative examples, the different processes for fabricating semiconductor structures, optical structures, nonlinear optical waveguides, laser transmitters, photon generators, photon transmitters, photon detectors, ultraviolet transmission systems, point-to-point communication devices, laser infrared countermeasure sources, through water optical communication devices, or other suitable devices can be manufactured using processes implemented in control system 4114.

In the different illustrative examples, human operators 4116 can operate or interact with at least one of manufacturing equipment 4106, maintenance equipment 4112, or control system 4114.

This interaction can occur to manufacture semiconductor structures and other components for products such as semiconductor devices or components for use in products such as aircraft, spacecraft, communications systems, computation systems, and sensor systems.

Further, control system 4114 can be used to adjust manufacturing of nonlinear optical waveguides, optical waveguides, optical couplers and terminations dynamically during the manufacturing process. For example, many points in the process of fabricating the optical waveguide structure including the nonlinear optical waveguide as well as other components are present at which adjustments can be made to control characteristics of components in an optical waveguide structure.

For example, the height of the upper cladding region can be selected to achieve the desired value for the phase walk-off. The phase walk-off depends on the values of the effective refractive indices $n_{eff,P}$, $n_{eff,S}$, and $n_{eff,I}$ for the wave-guided modes at the pump, signal, and idler wavelengths. For example, one point in the fabrication process is after the waveguide core region has been fabricated and before the upper cladding material has been deposited over the waveguide core region.

The dimensions of the fabricated core region can be measured and optical waveguide design simulations can be done to determine the values of the effective refractive indices that can be obtained for various candidate values of the upper cladding height. The upper cladding height that gives the desired value for the phase walk-off can be chosen accordingly. Upper cladding material can then be deposited that has the desired thickness or height.

Another point in the fabrication process is after the upper cladding material has been deposited to a value that is greater than what might be desired. Test devices such as asymmetric Mach-Zehnder interferometers and micro-ring resonators can be fabricated in addition to the nonlinear optical waveguide.

These test devices can be characterized to extract values for the effect refractive indices for the upper cladding height of those test devices. The upper cladding height can then be reduced by etching away some of the upper cladding material, possibly in an iterative manner accompanied by additional measurements of the test structures. In this way, the desired value for the upper cladding height can be approached and then achieved.

Thus, in one illustrative example, the optical waveguide structure is constructed such that the change in the sign in the phase walk-off is aligned with a change in sign the second order linear coefficient in the nonlinear optical material in the nonlinear optical waveguide. The alignment of the changes can occur based on the configuration of the nonlinear optical waveguide in the optical waveguide structure. Additionally, the optical waveguide structure can also include electrodes that can supply voltages that are used to adjust the phase walk-off to provide a desired level of alignment between sign changes in the phase walk-off and the second order nonlinear coefficient to have a desired amount of alignment.

Some features of the illustrative examples are described in the following clauses. These clauses are examples of features not intended to limit other illustrative examples.

Clause 1:

An optical waveguide structure comprising:

a nonlinear optical waveguide comprising a nonlinear optical material having a second order nonlinear coefficient for a second order nonlinear susceptibility in which the second order nonlinear coefficient changes with a direction of light propagation;

wherein a light propagating in a first direction through a first portion of the nonlinear optical waveguide has a first sign of the second order nonlinear coefficient for a nonlinear optical interaction of the light with the nonlinear optical material in the first portion of the nonlinear optical waveguide and the light propagating in a second direction through a second portion of the nonlinear optical waveguide has a second sign of the second order nonlinear coefficient for the nonlinear optical interaction of the light with the nonlinear optical material in the second portion of the nonlinear optical waveguide; and wherein the light generated in a first location of a nonlinear optical interaction occurring in the first portion of the nonlinear optical waveguide propagates to a second location in the second portion of the nonlinear optical waveguide and has a phase walk-off between the first location and the second location that is an odd multiple of 180 degrees.

Clause 2:
The optical waveguide structure according to clause 1 further comprising:
an output optical waveguide configured to output an output light from the nonlinear optical waveguide, wherein the output light has an output wavelength that is different from a pump light at a pump wavelength input into the nonlinear optical waveguide.

Clause 3:
The optical waveguide structure according to one of clause 1 or 2 further comprising:
an input optical waveguide configured to input an input light into the nonlinear optical waveguide.

Clause 4:
The optical waveguide structure according to one of clause 1, 2, or 3, wherein the phase walk-off is between previously generated light in the waveguide and newly generated light in the waveguide.

Clause 5:
The optical waveguide structure according to one of clause 1, 2, 3, or 4, wherein the phase walk-off of the nonlinear optical interaction occurs in the second portion of the nonlinear optical waveguide from the light generated in the first portion of the nonlinear optical waveguide.

Clause 6:
The optical waveguide structure according to one of clause 1, 2, 3, 4, or 5, wherein the phase walk-off is an odd multiple of 180 degrees and wherein the phase walk-off is the odd multiple of 180 degrees that occurs at a location where a change in a sign of the second order nonlinear coefficient occurs.

Clause 7:
The optical waveguide structure according to one of clause 1, 2, 3, 4, 5, or 6, wherein the phase walk-off is an odd multiple of 180 degrees and wherein a location at which the phase walk-off has the odd multiple of 180 degrees is aligned with the location at which a change in a sign of the second order nonlinear coefficient occurs.

Clause 8:
The optical waveguide structure according to one of clause 1, 2, 3, 4, 5, 6, or 7, wherein successive sign changes of the second order nonlinear coefficient occur in alignment with corresponding successive increments of odd multiples of 180 degrees in the phase walk-off.

Clause 9:
The optical waveguide structure according to one of clause 1, 2, 3, 4, 5, 6, 7, or 8, wherein a configuration of nonlinear optical waveguide is selected to cause an increase in efficiency in generating at least one of a signal light or an idler light within the nonlinear optical waveguide.

Clause 10:
The optical waveguide structure according to one of clause 1, 2, 3, 4, 5, 6, 7, 8, or 9, wherein a configuration of nonlinear optical waveguide is selected such that a peak in a magnitude of the second order nonlinear coefficient is aligned with a phase walk-off of an odd multiple of $\pi/2$ radians.

Clause 11:
The optical waveguide structure according to clause 10, wherein an alignment of the peak in the magnitude of the second order nonlinear coefficient with the phase walk-off of an odd multiple of $\pi/2$ radians is within $\pi/4$ radians.

Clause 12:
The optical waveguide structure according to one of clause 1, 2, 3, 4, 5, 6, 7, 8, 9, 10, or 11, wherein the nonlinear optical waveguide is selected from one of a closed path, a ring, a circular ring, an elliptical ring, a racetrack, a square, or a rectangle path.

Clause 13:
The optical waveguide structure according to one of clause 1, 2, 3, 4, 5, 6, 7, 8, 9, 10, 11, or 12, wherein the nonlinear optical waveguide is selected from one of an open path, a serpentine path, or a zig-zag path.

Clause 14:
The optical waveguide structure according to one of clause 1, 2, 3, 4, 5, 6, 7, 8, 9, 10, 11, 12, or 13, wherein the nonlinear optical waveguide has an open path with an ending at a termination in a set of waveguide structures.

Clause 15:
The optical waveguide structure according to one of clause 1, 2, 3, 4, 5, 6, 7, 8, 9, 10, 11, 12, 13, or 14, wherein the nonlinear optical waveguide has an open path with ends points at reflecting terminations in a set of waveguide structures that increases a power of a pump light in the light.

Clause 16:
The optical waveguide structure according to one of clause 1, 2, 3, 4, 5, 6, 7, 8, 9, 10, 11, 12, 13, 14, or 15, wherein the nonlinear optical waveguide has a central region and two side regions on each side of the central region, wherein the central region comprises a first nonlinear optical material in a set of nonlinear optical materials that has a first second-order nonlinear coefficient with a magnitude that is at least one picometer/volt, and wherein the two side regions have a second nonlinear optical material in the set of nonlinear optical materials that has a second second-order nonlinear coefficient whose magnitude is equal to or less than one tenth the magnitude of the first second-order nonlinear coefficient for the first nonlinear optical material.

Clause 17:
The optical waveguide structure according to one of clause 1, 2, 3, 4, 5, 6, 7, 8, 9, 10, 11, 12, 13, 14, 15, or 16, wherein the nonlinear optical waveguide has a core region, a lower cladding region, and an upper cladding region, wherein the core region is located between the lower cladding region and the upper cladding region and wherein the upper cladding region has a height selected to compensate for a variation of the phase walk-off in the nonlinear optical waveguide.

Clause 18:
The optical waveguide structure according to claim 17, wherein the core region has a central region and two side regions on each side of the central region, wherein the central region comprises a first nonlinear optical material in a set of nonlinear optical materials that has a first second-order nonlinear coefficient with a magnitude that is at least one picometer/volt and wherein the two side regions have a particular nonlinear optical material in the set of nonlinear optical materials that has a second second-order nonlinear coefficient whose magnitude is one tenth the magnitude of the first second-order nonlinear coefficient for the first nonlinear optical material.

Clause 19:

The optical waveguide structure according to one of clause 1, 2, 3, 4, 5, 6, 7, 8, 9, 10, 11, 12, 13, 14, 15, 16, 17, or 18, wherein the nonlinear optical waveguide has a first curved segment and a second curved segment with a first straight segment located between the first curved segment and the second curved segment, and the second portion of the nonlinear optical waveguide has a third curved segment and a fourth curved segment with a second straight segment located between has the third curved segment and the fourth curved segment.

Clause 20:

The optical waveguide structure according to one of clause 1, 2, 3, 4, 5, 6, 7, 8, 9, 10, 11, 12, 13, 14, 15, 16, 17, 18, or 19, wherein the first portion has a first curved segment and a first straight segment, and the second portion of the nonlinear optical waveguide has a second curved segment and a second straight segment, wherein the second curved segment in the second portion is connected to the first curved segment in the first portion.

Clause 21:

The optical waveguide structure according to one of clause 1, 2, 3, 4, 5, 6, 7, 8, 9, 10, 11, 12, 13, 14, 15, 16, 17, 18, 19, or 20, wherein the first portion has a first curved segment and the second portion of the nonlinear optical waveguide has a second curved segment that is connected to the first curved segment.

Clause 22:

The optical waveguide structure according to one of clause 1, 2, 3, 4, 5, 6, 7, 8, 9, 10, 11, 12, 13, 14, 15, 16, 17, 18, 19, 20, or 21 further comprising:

an optical coupler for the nonlinear optical waveguide and an output optical waveguide.

Clause 23:

The optical waveguide structure according to clause 22, wherein the optical coupler is configured to couple the light having at least one of a signal wavelength or an idler wavelength from the nonlinear optical waveguide to the output optical waveguide.

Clause 24:

The optical waveguide structure according to one of clause 1, 2, 3, 4, 5, 6, 7, 8, 9, 10, 11, 12, 13, 14, 15, 16, 17, 18, 19, 20, 21, 22, or 23 further comprising:

an optical coupler for an input of an input optical waveguide and the nonlinear optical waveguide.

Clause 25:

The optical waveguide structure according to clause 24, wherein the optical coupler is configured to couple the light having a pump wavelength from the input optical waveguide to the nonlinear optical waveguide.

Clause 26:

The optical waveguide structure according to one of clause 1, 2, 3, 4, 5, 6, 7, 8, 9, 10, 11, 12, 13, 14, 15, 16, 17, 18, 19, 20, 21, 22, 23, 24, or 25 further comprising:

a set of phase shifters adjacent to the nonlinear optical waveguide.

Clause 27:

The optical waveguide structure according to one of clause 1, 2, 3, 4, 5, 6, 7, 8, 9, 10, 11, 12, 13, 14, 15, 16, 17, 18, 19, 20, 21, 22, 23, 24, or 25 further comprising:

a first set of phase shifters located adjacent to the first portion of the nonlinear optical waveguide; and a second set of phase shifters located adjacent to the second portion of the nonlinear optical waveguide, wherein the first set of phase shifters operates to apply a first voltage and the second set of phase shifters operates to apply a second voltage in which the first voltage and the second voltage cause phase shifts in wavelengths of the light selected from at least one of a pump light, a signal light, or an idler light in the nonlinear optical waveguide such that a value of the phase walk-off changes.

Clause 28:

The optical waveguide structure according to one of clause 1, 2, 3, 4, 5, 6, 7, 8, 9, 10, 11, 12, 13, 14, 15, 16, 17, 18, 19, 20, 21, 22, 23, 24, 25, 26, or 27, wherein the second direction is opposite to the first direction.

Clause 29:

The optical waveguide structure according to one of clause 1, 2, 3, 4, 5, 6, 7, 8, 9, 10, 11, 12, 13, 14, 15, 16, 17, 18, 19, 20, 21, 22, 23, 24, 25, 26, 27, or 28, wherein the second sign is negative when the first sign is positive and the second sign is positive when the first sign is negative.

Clause 30:

The optical waveguide structure according to one of clause 1, 2, 3, 4, 5, 6, 7, 8, 9, 10, 11, 12, 13, 14, 15, 16, 17, 18, 19, 20, 21, 22, 23, 24, 25, 26, 27, 28, or 29, wherein the light propagates through the nonlinear optical waveguide as a pump light having a pump wavelength, a signal light having a signal wavelength, and an idler light having an idler wavelength.

Clause 31:

The optical waveguide structure according to one of clause 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30, wherein the phase walk-off is one of a relative phase walk-off and a cumulative phase walk-off.

Clause 32:

An optical waveguide structure comprising:

a nonlinear optical waveguide comprising:

a nonlinear optical material having a second order nonlinear coefficient that changes with a direction of light propagation;

a first portion of the nonlinear optical waveguide in which a light propagating through the first portion is affected by a positive value of the second order nonlinear coefficient; and a second portion of the nonlinear optical waveguide in which the light propagating through the first portion is affected by a negative value of the second order nonlinear coefficient, wherein a set of dimensions in the nonlinear optical waveguide in the first portion and the second portion is selected to cause the light in a first location in the first portion and a second location in the second portion to have a phase walk-off that is an odd multiple of 180 degrees.

Clause 33:

The optical waveguide structure according to clause 32 further comprising:

an output optical waveguide configured to output an output light from the nonlinear optical waveguide, wherein the output light has an output wavelength that is different from a pump light at a pump wavelength input into the nonlinear optical waveguide.

Clause 34:

The optical waveguide structure according to one of clause 32 or 33, wherein the light propagates through the nonlinear optical waveguide as a pump light having a pump wavelength, a signal light having a signal wavelength, and an idler light having an idler wavelength and wherein a phase of the signal light and the idler light generated at the first location and the phase of the signal light and the idler light generated at the second location have the phase walk-off that is an odd multiple of 180 degrees.

Clause 35:
The optical waveguide structure according to one of clause 32, 33, or 34 further comprising:
a set of optical couplers for the nonlinear optical waveguide and an output optical waveguide.

Clause 36:
The optical waveguide structure according to one of clause 32, 33, 34, or 35, wherein a configuration of nonlinear optical waveguide is selected such that a peak in a magnitude of the second order nonlinear coefficient is aligned with a phase walk-off of an odd multiple of $\pi/2$ radians.

Clause 37:
The optical waveguide structure according to one of clause 32, 33, 34, 35, or 36, wherein an alignment of the peak in the magnitude of the second order nonlinear coefficient with the phase walk-off of an odd multiple of $\pi/2$ radians is within $\pi/4$ radians.

Clause 38:
The optical waveguide structure according to one of clause 32, 33, 34, 35, 36, or 37, wherein the phase walk-off is one of a relative phase walk-off and a cumulative phase walk-off.

Clause 39:
A method for moving a light through an optical waveguide structure, the method comprising:
inputting the light at a pump wavelength into the optical waveguide structure comprising a nonlinear optical material having a second order nonlinear coefficient that changes with a direction of light propagation;
propagating the light at the pump wavelength along a path in the optical waveguide structure from a first location in a first portion of a nonlinear optical waveguide having a first sign of the second order nonlinear coefficient for a nonlinear optical interaction of the light with the nonlinear optical material in the first portion of the nonlinear optical waveguide; and
propagating the light at the pump wavelength along the path in the optical waveguide structure to a second location in a second portion of the nonlinear optical waveguide having a second sign of the second order nonlinear coefficient for the nonlinear optical interaction of the light with the nonlinear optical material in the second portion of the nonlinear optical waveguide, wherein the light generated in the first location in the nonlinear optical interaction occurring in the first portion of the nonlinear optical waveguide propagates to the second location in the second portion of the nonlinear optical waveguide and has a phase walk-off for the nonlinear optical interaction occurring in the second location in the second portion of the nonlinear optical waveguide that is an odd multiple of 180 degrees.

Clause 40:
The method according to clause 39 further comprising:
generating at least one of a signal light or an idler light at the first location such that the light in the nonlinear optical interaction of the light with the nonlinear optical material in the second portion of the nonlinear optical waveguide comprises a pump light and at least one of the signal light or the idler light at the second location.

Clause 41:
The method according to one of clause 39 or 40 further comprising:
outputting a portion of the light from the nonlinear optical waveguide to an output optical waveguide, wherein the portion of the light comprise at least one of a signal light or an idler light.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An optical waveguide structure comprising:
a nonlinear optical waveguide comprising a nonlinear optical material having a second order nonlinear coefficient for a second order nonlinear susceptibility in which the second order nonlinear coefficient changes with a direction of light propagation;
wherein a light propagating in a first direction through a first portion of the nonlinear optical waveguide has a first sign of the second order nonlinear coefficient for a nonlinear optical interaction of the light with the nonlinear optical material in the first portion of the nonlinear optical waveguide and the light propagating in a second direction through a second portion of the nonlinear optical waveguide has a second sign of the second order nonlinear coefficient for the nonlinear optical interaction of the light with the nonlinear optical material in the second portion of the nonlinear optical waveguide; and
wherein the light generated in a first location of the nonlinear optical interaction occurring in the first portion of the nonlinear optical waveguide propagates to a second location in the second portion of the nonlinear optical waveguide and has a phase walk-off between the first location and the second location that is an odd multiple of 180 degrees.

2. The optical waveguide structure of claim 1 further comprising:
an output optical waveguide configured to output an output light from the nonlinear optical waveguide, wherein the output light has an output wavelength that is different from a pump light at a pump wavelength input into the nonlinear optical waveguide.

3. The optical waveguide structure of claim 1 further comprising:
an input optical waveguide configured to input an input light into the nonlinear optical waveguide.

4. The optical waveguide structure of claim 1, wherein the phase walk-off is between previously generated light in the nonlinear optical waveguide and newly generated light in the nonlinear optical waveguide.

5. The optical waveguide structure of claim 1, wherein the phase walk-off of the nonlinear optical interaction occurs in the second portion of the nonlinear optical waveguide from the light generated in the first portion of the nonlinear optical waveguide.

6. The optical waveguide structure of claim 1, wherein the phase walk-off is the odd multiple of 180 degrees that occurs at a location where a change in a sign of the second order nonlinear coefficient occurs.

7. The optical waveguide structure of claim 1, wherein a location at which the phase walk-off has an odd multiple of 180 degrees is aligned with the location at which a change in a sign of the second order nonlinear coefficient occurs.

8. The optical waveguide structure of claim 7, wherein successive sign changes of the second order nonlinear coefficient occur in alignment with corresponding successive increments of odd multiples of 180 degrees in the phase walk-off.

9. The optical waveguide structure of claim 1, wherein a configuration of the nonlinear optical waveguide is selected to cause an increase in efficiency in generating at least one of a signal light or an idler light within the nonlinear optical waveguide.

10. The optical waveguide structure of claim 1, wherein a configuration of the nonlinear optical waveguide is selected such that a peak in a magnitude of the second order nonlinear coefficient is aligned with a phase walk-off of an odd multiple of $\pi/2$ radians.

11. The optical waveguide structure of claim 10, wherein an alignment of the peak in the magnitude of the second order nonlinear coefficient with the phase walk-off of an odd multiple of $\pi/2$ radians is within $\pi/4$ radians.

12. The optical waveguide structure of claim 1, wherein the nonlinear optical waveguide is selected from one of a closed path, a ring, a circular ring, an elliptical ring, a racetrack, a square, or a rectangle path.

13. The optical waveguide structure of claim 1, wherein the nonlinear optical waveguide is selected from one of an open path, a serpentine path, or a zig-zag path.

14. The optical waveguide structure of claim 1, wherein the nonlinear optical waveguide has an open path with an ending at a termination in a set of waveguide structures.

15. The optical waveguide structure of claim 1, wherein the nonlinear optical waveguide has an open path with end points at reflecting terminations in a set of waveguide structures that increases a power of a pump light in the light.

16. The optical waveguide structure of claim 1, wherein the nonlinear optical waveguide has a central region and two side regions on each side of the central region, wherein the central region comprises a first nonlinear optical material in a set of nonlinear optical materials that has a first second-order nonlinear coefficient with a magnitude that is at least one picometer/volt, and wherein the two side regions have a second nonlinear optical material in the set of nonlinear optical materials that has a second second-order nonlinear coefficient whose magnitude is equal to or less than one tenth the magnitude of the first second-order nonlinear coefficient for the first nonlinear optical material.

17. The optical waveguide structure of claim 1, wherein the nonlinear optical waveguide has a core region, a lower cladding region, and an upper cladding region, wherein the core region is located between the lower cladding region and the upper cladding region and wherein the upper cladding region has a height selected to compensate for a variation of the phase walk-off in the nonlinear optical waveguide.

18. The optical waveguide structure of claim 17, wherein the core region has a central region and two side regions on each side of the central region, wherein the central region comprises a first nonlinear optical material in a set of nonlinear optical materials that has a first second-order nonlinear coefficient with a magnitude that is at least one picometer/volt and wherein the two side regions have a particular nonlinear optical material in the set of nonlinear optical materials that has a second second-order nonlinear coefficient whose magnitude is one tenth the magnitude of the first second-order nonlinear coefficient for the first nonlinear optical material.

19. The optical waveguide structure of claim 1, wherein the nonlinear optical waveguide has a first curved segment and a second curved segment with a first straight segment located between the first curved segment and the second curved segment, and the second portion of the nonlinear optical waveguide has a third curved segment and a fourth curved segment with a second straight segment located between has the third curved segment and the fourth curved segment.

20. The optical waveguide structure of claim 1, wherein the first portion has a first curved segment and a first straight segment located and the second portion of the nonlinear optical waveguide has a second curved segment and a second straight segment, wherein the second curved segment in the second portion is connected to the first curved segment in the first portion.

21. The optical waveguide structure of claim 1, wherein the first portion has a first curved segment, and the second portion of the nonlinear optical waveguide has a second curved segment that is connected to the first curved segment.

22. The optical waveguide structure of claim 1 further comprising:
an optical coupler for the nonlinear optical waveguide and an output optical waveguide.

23. The optical waveguide structure of claim 22, wherein the optical coupler is configured to couple the light having at least one of a signal wavelength or an idler wavelength from the nonlinear optical waveguide to the output optical waveguide.

24. The optical waveguide structure of claim 1 further comprising:
an optical coupler for an input of an input optical waveguide and the nonlinear optical waveguide.

25. The optical waveguide structure of claim 24, wherein the optical coupler is configured to couple the light having a pump wavelength from the input optical waveguide to the nonlinear optical waveguide.

26. The optical waveguide structure of claim 1 further comprising:
set of phase shifters adjacent to the nonlinear optical waveguide.

27. The optical waveguide structure of claim 1 further comprising:
a first set of phase shifters located adjacent to the first portion of the nonlinear optical waveguide; and
a second set of phase shifters located adjacent to the second portion of the nonlinear optical waveguide, wherein the first set of phase shifters operates to apply a first voltage and the second set of phase shifters operates to apply a second voltage in which the first voltage and the second voltage cause phase shifts in wavelengths of the light selected from at least one of a pump light, a signal light, or an idler light in the nonlinear optical waveguide such that a value of the phase walk-off changes.

28. The optical waveguide structure of claim 1, wherein the second direction is opposite to the first direction.

29. The optical waveguide structure of claim 1, wherein the second sign is negative when the first sign is positive and the second sign is positive when the first sign is negative.

30. The optical waveguide structure of claim 1, wherein the light propagates through the nonlinear optical waveguide as a pump light having a pump wavelength, a signal light having a signal wavelength, and an idler light having an idler wavelength.

31. The optical waveguide structure of claim 1, wherein the phase walk-off is one of a relative phase walk-off and a cumulative phase walk-off.

32. An optical waveguide structure comprising:
a nonlinear optical waveguide comprising:
a nonlinear optical material having a second order nonlinear coefficient that changes with a direction of light propagation;
a first portion of the nonlinear optical waveguide in which a light propagating through the first portion is affected by a positive value of the second order nonlinear coefficient; and
a second portion of the nonlinear optical waveguide in which the light propagating through the first portion is affected by a negative value of the second order nonlinear coefficient, wherein a set of dimensions in the nonlinear optical waveguide in the first portion and the second portion is selected to cause the light in a first location in the first portion and a second location in the second portion to have a phase walk-off that is an odd multiple of 180 degrees.

33. The optical waveguide structure of claim 32 further comprising:
an output optical waveguide configured to output an output light from the nonlinear optical waveguide, wherein the output light has an output wavelength that is different from a pump light at a pump wavelength input into the nonlinear optical waveguide.

34. The optical waveguide structure of claim 32, wherein the light propagates through the nonlinear optical waveguide as a pump light having a pump wavelength, a signal light having a signal wavelength, and an idler light having an idler wavelength, and wherein a phase of the signal light and the idler light generated at the first location and the phase of the signal light and the idler light generated at the second location have the phase walk-off that is an odd multiple of 180 degrees.

35. The optical waveguide structure of claim 32 further comprising:
a set of optical couplers for the nonlinear optical waveguide and an output optical waveguide.

36. The optical waveguide structure of claim 32, wherein a configuration of the nonlinear optical waveguide is selected such that a peak in a magnitude of the second order nonlinear coefficient is aligned with the phase walk-off of an odd multiple of $\pi/2$ radians.

37. The optical waveguide structure of claim 36, wherein an alignment of the peak in the magnitude of the second order nonlinear coefficient with the phase walk-off of an odd multiple of $\pi/2$ radians is within $\pi/4$ radians.

38. The optical waveguide structure of claim 32, wherein the phase walk-off is one of a relative phase walk-off and a cumulative phase walk-off.

39. A method for propagating a light through an optical waveguide structure, the method comprising:
inputting the light at a pump wavelength into the optical waveguide structure comprising a nonlinear optical material having a second order nonlinear coefficient that changes with a direction of light propagation;
propagating the light at the pump wavelength along a path in the optical waveguide structure from a first location in a first portion of a nonlinear optical waveguide having a first sign of the second order nonlinear coefficient for a nonlinear optical interaction of the light with the nonlinear optical material in the first portion of the nonlinear optical waveguide; and
propagating the light at the pump wavelength along the path in the optical waveguide structure to a second location in a second portion of the nonlinear optical waveguide having a second sign of the second order nonlinear coefficient for the nonlinear optical interaction of the light with the nonlinear optical material in the second portion of the nonlinear optical waveguide, wherein the light generated in the first location in the nonlinear optical interaction occurring in the first portion of the nonlinear optical waveguide propagates to the second location in the second portion of the nonlinear optical waveguide and has a phase walk-off for the nonlinear optical interaction occurring in the second location in the second portion of the nonlinear optical waveguide that is an odd multiple of 180 degrees.

40. The method of claim 39 further comprising:
generating at least one of a signal light or an idler light at the first location such that the light in the nonlinear optical interaction of the light with the nonlinear optical material in the second portion of the nonlinear optical waveguide comprises a pump light and at least one of the signal light or the idler light at the second location.

41. The method of claim 39 further comprising:
outputting a portion of the light from the nonlinear optical waveguide to an output optical waveguide, wherein the portion of the light comprises at least one of a signal light or an idler light.

* * * * *